US 6,600,779 B1

(12) United States Patent
Sawada et al.

(10) Patent No.: US 6,600,779 B1
(45) Date of Patent: Jul. 29, 2003

(54) SIGNAL PROCESSOR HAVING FEEDBACK LOOP CONTROL FOR DECISION FEEDBACK EQUALIZER

(75) Inventors: Masaru Sawada, Kasugai (JP);
Tsuyoshi Tomita, Kasugai (JP);
Yoshitaka Nakata, Kasugai (JP);
Tsunehiko Moriuchi, Kasugai (JP);
Kenichi Yamakura, Kasugai (JP);
Hideaki Tanishima, Kasugai (JP);
Fumiaki Uematsu, Kasugai (JP); Koji Horibe, Kasugai (JP); Manabu Nakano, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/274,350

(22) Filed: Mar. 23, 1999

(30) Foreign Application Priority Data

Apr. 15, 1998 (JP) .......................... 10-104729
May 26, 1998 (JP) .......................... 10-144204
Dec. 14, 1998 (JP) .......................... 10-354462

(51) Int. Cl.[7] .......................... H03H 7/30; H03H 7/40; H03K 5/159
(52) U.S. Cl. .......................... 375/233; 708/323
(58) Field of Search .......................... 375/233, 229, 375/232; 708/322, 323; 333/18, 28 R

(56) References Cited

U.S. PATENT DOCUMENTS 5,050,186 A * 9/1991 Gurcan et al. ............ 375/233
5,490,169 A * 2/1996 Blackwell et al. ......... 375/232
5,822,143 A * 10/1998 Cloke et al. ............... 360/65
5,917,855 A * 6/1999 Kim ........................... 375/229
6,104,766 A * 8/2000 Coker et al. ............... 375/341

FOREIGN PATENT DOCUMENTS

JP          2-189034         7/1990

OTHER PUBLICATIONS

V. Yu, et al., "Error Propagation Evaluation for RLL–Constrained DFE Read Channels, IEEE Transactions on Magnetics", vol. 34, No. 1, Jan. 1998.

* cited by examiner

Primary Examiner—Phuong Phu
(74) Attorney, Agent, or Firm—Armstrong, Westerman & Hattori, LLP

(57) ABSTRACT

A signal processor used to process an analog read signal representing data stored on a magnetic disk allows for a faster read operation without requiring an increase in its circuit area or buffer memory space. The signal processor includes a decision feedback equalizer which selectively provides a feedback signal added to a read signal in reproducing data read from a storage medium. The signal processor also performs error correction. In performing error correction, the load of the error correcting process is detected and the processing speed is altered depending upon the detected load.

25 Claims, 59 Drawing Sheets

Fig.20

| Input | | | | | | | | | Output | | After decoding of 1-7 | | | |
|---|---|---|---|---|---|---|---|---|---|---|---|---|---|---|
| Ad8 | Ad7 | Ad6 | Ad5 | Ad4 | Ad3 | Ad2 | Ad1 | Ad0 | Error detection | Error transmission | | | | |
| – | 0 | 0 | 1 | 0 | 0 | 1 | 0 | 0 | 0 | 0 | 10 | 10 | 10 | |
| – | 0 | 0 | 1 | 0 | 0 | 0 | 1 | 0 | 0 | 0 | 10 | 10 | 01 | |
| – | 0 | 0 | 1 | 0 | 0 | 1 | 0 | 1 | 0 | 0 | 10 | 10 | 11 | |
| – | 0 | 0 | 1 | 0 | 0 | 1 | 0 | 0 | 0 | 0 | 10 | 10 | 00 | (10or01) |
| – | 0 | 0 | 1 | 0 | 0 | 0 | 1 | 0 | 0 | 0 | 10 | 10 | 00 | (11or00) |
| 0 | 1 | 0 | 1 | 0 | 0 | 1 | 0 | 0 | 0 | 0 | 01 | 10 | 10 | |
| 0 | 1 | 0 | 1 | 0 | 0 | 0 | 1 | 0 | 0 | 0 | 01 | 10 | 01 | |
| 0 | 1 | 0 | 1 | 0 | 0 | 1 | 0 | 1 | 0 | 0 | 01 | 10 | 11 | |
| 0 | 1 | 0 | 1 | 0 | 0 | 1 | 0 | 0 | 0 | 0 | 01 | 10 | 00 | (10or01) |
| 0 | 1 | 0 | 1 | 0 | 0 | 0 | 1 | 0 | 0 | 0 | 01 | 10 | 00 | (11or00) |
| – | 0 | 1 | 0 | 0 | 0 | 1 | 0 | 0 | 0 | 0 | 11 | 10 | 10 | |
| – | 0 | 1 | 0 | 0 | 0 | 0 | 1 | 0 | 0 | 0 | 11 | 10 | 01 | |
| – | 0 | 1 | 0 | 0 | 0 | 1 | 0 | 1 | 0 | 0 | 11 | 10 | 11 | |
| – | 0 | 1 | 0 | 0 | 0 | 1 | 0 | 0 | 0 | 0 | 11 | 10 | 00 | (10or01) |
| – | 0 | 1 | 0 | 0 | 0 | 0 | 1 | 0 | 0 | 0 | 11 | 10 | 00 | (11or00) |
| – | 0 | 0 | 0 | 0 | 1 | 1 | 0 | 0 | 0 | 0 | 00 | 10 | 10 | |
| – | 0 | 0 | 0 | 0 | 1 | 0 | 1 | 0 | 0 | 0 | 00 | 10 | 01 | |
| – | 0 | 0 | 0 | 0 | 1 | 0 | 0 | 1 | 0 | 0 | 00 | 10 | 11 | |
| – | 0 | 0 | 0 | 0 | 1 | 0 | 0 | 0 | 0 | 0 | 00 | 10 | 00 | (10or01) |
| – | 0 | 0 | 0 | 0 | 1 | 0 | 1 | 0 | 0 | 0 | 00 | 10 | 00 | (11or00) |

Fig.21

| Input | | | | | | | | | Output | | After decoding of 1-7 | | |
|---|---|---|---|---|---|---|---|---|---|---|---|---|---|
| Ad8 | Ad7 | Ad6 | Ad5 | Ad4 | Ad3 | Ad2 | Ad1 | Ad0 | Error detection | Error transmission | | | |
| − | 0 | 0 | 0 | 1 | 0 | 1 | 0 | 0 | 0 | 0 | 10 | 01 | 10 |
| − | 0 | 0 | 0 | 1 | 0 | 0 | 1 | 0 | 0 | 0 | 10 | 01 | 01 |
| − | 0 | 0 | 0 | 1 | 0 | 1 | 0 | 1 | 0 | 0 | 10 | 01 | 11 |
| − | 0 | 0 | 0 | 1 | 0 | 1 | 0 | 0 | 0 | 0 | 10 | 01 | 00 (10or01) |
| − | 0 | 0 | 0 | 1 | 0 | 0 | 1 | 0 | 0 | 0 | 10 | 01 | 00 (11or00) |
| 0 | 1 | 0 | 0 | 1 | 0 | 1 | 0 | 0 | 0 | 0 | 01 | 01 | 10 |
| 0 | 1 | 0 | 0 | 1 | 0 | 0 | 1 | 0 | 0 | 0 | 01 | 01 | 01 |
| 0 | 1 | 0 | 0 | 1 | 0 | 1 | 0 | 1 | 0 | 0 | 01 | 01 | 11 |
| 0 | 1 | 0 | 0 | 1 | 0 | 1 | 0 | 0 | 0 | 0 | 01 | 01 | 00 (10or01) |
| 0 | 1 | 0 | 0 | 1 | 0 | 0 | 1 | 0 | 0 | 0 | 01 | 01 | 00 (11or00) |
| − | 0 | 1 | 0 | 1 | 0 | 1 | 0 | 0 | 0 | 0 | 11 | 01 | 10 |
| − | 0 | 1 | 0 | 1 | 0 | 0 | 1 | 0 | 0 | 0 | 11 | 01 | 01 |
| − | 0 | 1 | 0 | 1 | 0 | 1 | 0 | 1 | 0 | 0 | 11 | 01 | 11 |
| − | 0 | 1 | 0 | 1 | 0 | 1 | 0 | 0 | 0 | 0 | 11 | 01 | 00 (10or01) |
| − | 0 | 1 | 0 | 1 | 0 | 0 | 1 | 0 | 0 | 0 | 11 | 01 | 00 (11or00) |
| − | 0 | 0 | 0 | 0 | 0 | 1 | 0 | 0 | 0 | 0 | 00 | 01 | 10 |
| − | 0 | 0 | 0 | 0 | 0 | 0 | 1 | 0 | 0 | 0 | 00 | 01 | 01 |
| − | 0 | 0 | 0 | 0 | 0 | 1 | 0 | 0 | 0 | 0 | 00 | 01 | 11 |
| − | 0 | 0 | 0 | 0 | 0 | 1 | 0 | 0 | 0 | 0 | 00 | 01 | 00 (10or01) |
| − | 0 | 0 | 0 | 0 | 0 | 0 | 1 | 0 | 0 | 0 | 00 | 01 | 00 (11or00) |

Fig.22

| Input | | | | | | | | | Output | | After decoding of 1-7 | | |
|---|---|---|---|---|---|---|---|---|---|---|---|---|---|
| Ad8 | Ad7 | Ad6 | Ad5 | Ad4 | Ad3 | Ad2 | Ad1 | Ad0 | Error detection | Error transmission | | | |
| - | 0 | 0 | 1 | 0 | 1 | 0 | 0 | 0 | 0 | 0 | 10 | 11 | 10 |
| - | 0 | 0 | 1 | 0 | 1 | 0 | 1 | 0 | 0 | 0 | 10 | 11 | 01 |
| - | 0 | 0 | 1 | 0 | 1 | 0 | 0 | 1 | 0 | 0 | 10 | 11 | 11 |
| - | 0 | 0 | 1 | 0 | 1 | 0 | 0 | 0 | 0 | 0 | 10 | 11 | 00 (10or01) |
| - | 0 | 0 | 1 | 0 | 1 | 0 | 1 | 0 | 0 | 0 | 10 | 11 | 00 (11or00) |
| 0 | 1 | 0 | 1 | 0 | 1 | 0 | 0 | 0 | 0 | 0 | 01 | 11 | 10 |
| 0 | 1 | 0 | 1 | 0 | 1 | 0 | 1 | 0 | 0 | 0 | 01 | 11 | 01 |
| 0 | 1 | 0 | 1 | 0 | 1 | 0 | 0 | 1 | 0 | 0 | 01 | 11 | 11 |
| 0 | 1 | 0 | 1 | 0 | 1 | 0 | 0 | 0 | 0 | 0 | 01 | 11 | 00 (10or01) |
| 0 | 1 | 0 | 1 | 0 | 1 | 0 | 1 | 0 | 0 | 0 | 01 | 11 | 00 (11or00) |
| - | 0 | 1 | 0 | 0 | 1 | 0 | 0 | 0 | 0 | 0 | 11 | 11 | 10 |
| - | 0 | 1 | 0 | 0 | 1 | 0 | 1 | 0 | 0 | 0 | 11 | 11 | 01 |
| - | 0 | 1 | 0 | 0 | 1 | 0 | 0 | 1 | 0 | 0 | 11 | 11 | 11 |
| - | 0 | 1 | 0 | 0 | 1 | 0 | 0 | 0 | 0 | 0 | 11 | 11 | 00 (10or01) |
| - | 0 | 1 | 0 | 0 | 1 | 0 | 1 | 0 | 0 | 0 | 11 | 11 | 00 (11or00) |
| - | 0 | 0 | 1 | 0 | 1 | 0 | 0 | 0 | 0 | 0 | 00 | 11 | 10 |
| - | 0 | 0 | 1 | 0 | 1 | 0 | 1 | 0 | 0 | 0 | 00 | 11 | 01 |
| - | 0 | 0 | 1 | 0 | 1 | 0 | 0 | 1 | 0 | 0 | 00 | 11 | 11 |
| - | 0 | 0 | 1 | 0 | 1 | 0 | 0 | 0 | 0 | 0 | 00 | 11 | 00 (10or01) |
| - | 0 | 0 | 1 | 0 | 1 | 0 | 1 | 0 | 0 | 0 | 00 | 11 | 00 (11or00) |

Fig.23

| Input | | | | | | | | | Output | | After decoding of 1-7 | | |
|---|---|---|---|---|---|---|---|---|---|---|---|---|---|
| Ad8 | Ad7 | Ad6 | Ad5 | Ad4 | Ad3 | Ad2 | Ad1 | Ad0 | Error detection | Error transmission | | | |
| – | 0 | 0 | 1 | 0 | 0 | 0 | 0 | 1 | 0 | 0 | 10 | 00 | 10 |
| – | 0 | 0 | 1 | 0 | 0 | 0 | 0 | 0 | 0 | 0 | 10 | 00 | 01 |
| – | 0 | 0 | 0 | 1 | 0 | 0 | 0 | 1 | 0 | 0 | 10 | 00 | 11 |
| – | 0 | 0 | 0 | 1 | 0 | 0 | 0 | 0 | 0 | 0 | 10 | 00 | 00 |
| 0 | 1 | 0 | 1 | 0 | 0 | 0 | 0 | 1 | 0 | 0 | 01 | 00 | 10 |
| 0 | 1 | 0 | 1 | 0 | 0 | 0 | 0 | 0 | 0 | 0 | 01 | 00 | 01 |
| 0 | 1 | 0 | 0 | 1 | 0 | 0 | 0 | 1 | 0 | 0 | 01 | 00 | 11 |
| 0 | 1 | 0 | 0 | 1 | 0 | 0 | 0 | 0 | 0 | 0 | 01 | 00 | 00 |
| – | 0 | 1 | 0 | 0 | 0 | 0 | 0 | 1 | 0 | 0 | 11 | 00 | 10 |
| – | 0 | 1 | 0 | 0 | 0 | 0 | 0 | 0 | 0 | 0 | 11 | 00 | 01 |
| – | 0 | 1 | 0 | 1 | 0 | 0 | 0 | 1 | 0 | 0 | 11 | 00 | 11 |
| – | 0 | 1 | 0 | 1 | 0 | 0 | 0 | 0 | 0 | 0 | 11 | 00 | 00 |
| 0 | 0 | 0 | 0 | 1 | 0 | 0 | 0 | 0 | 0 | 0 | 00 | 00 | 00 |
| | | | | | | | | | | | | | |
| 0 | 0 | 0 | 0 | 0 | 0 | 0 | 0 | 0 | 1 | 1 | | | |
| | | | | | | | | | | | | | |
| – | – | 1 | 1 | – | – | – | – | – | 1 | 0 | Pattern including consecutive "1" | | |

|  | CNTL1 | CNTL0 | A | B | x |
|---|---|---|---|---|---|
| x1 | 0 | 0 | a | b | x=a+b |
| x½ | 1 | 0 | a | b | x=½·a+b |
| x(−1) | 0 | 1 | a | b | x=−a+b |
| x(−½) | 1 | 1 | a | b | x=−½·a+b |

| | SGN | Low id | Mid id | High id | Phase P3 | Phase P2 | Phase P1 | Phase Z | Phase N1 | Phase N2 |
|---|---|---|---|---|---|---|---|---|---|---|
| P3 | 0 | 1 | 1 | 1 | 1 | 0 | 0 | 0 | 0 | 0 |
| P2 | 0 | 1 | 1 | 0 | 0 | 1 | 0 | 0 | 0 | 0 |
| P1 | 0 | 1 | 0 | 0 | 0 | 0 | 1 | 0 | 0 | 0 |
| Z | - | 0 | 0 | 0 | 0 | 0 | 0 | 1 | 0 | 0 |
| N1 | 1 | 1 | 0 | 0 | 0 | 0 | 0 | 0 | 1 | 0 |
| N2 | 1 | 1 | 1 | 0 | 0 | 0 | 0 | 0 | 0 | 1 |
| N3 (P3) | 1 | 1 | 1 | 1 | 1 | 0 | 0 | 0 | 0 | 0 |

Data write mode

Data read mode

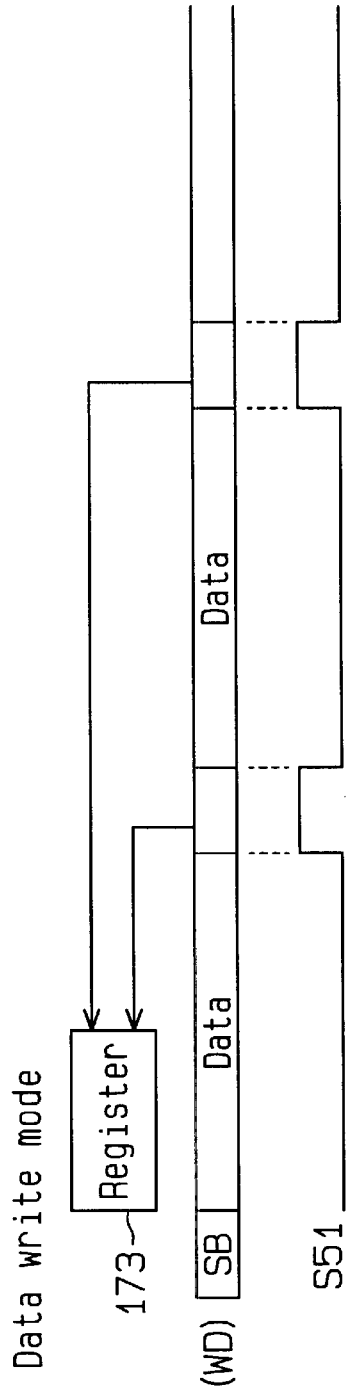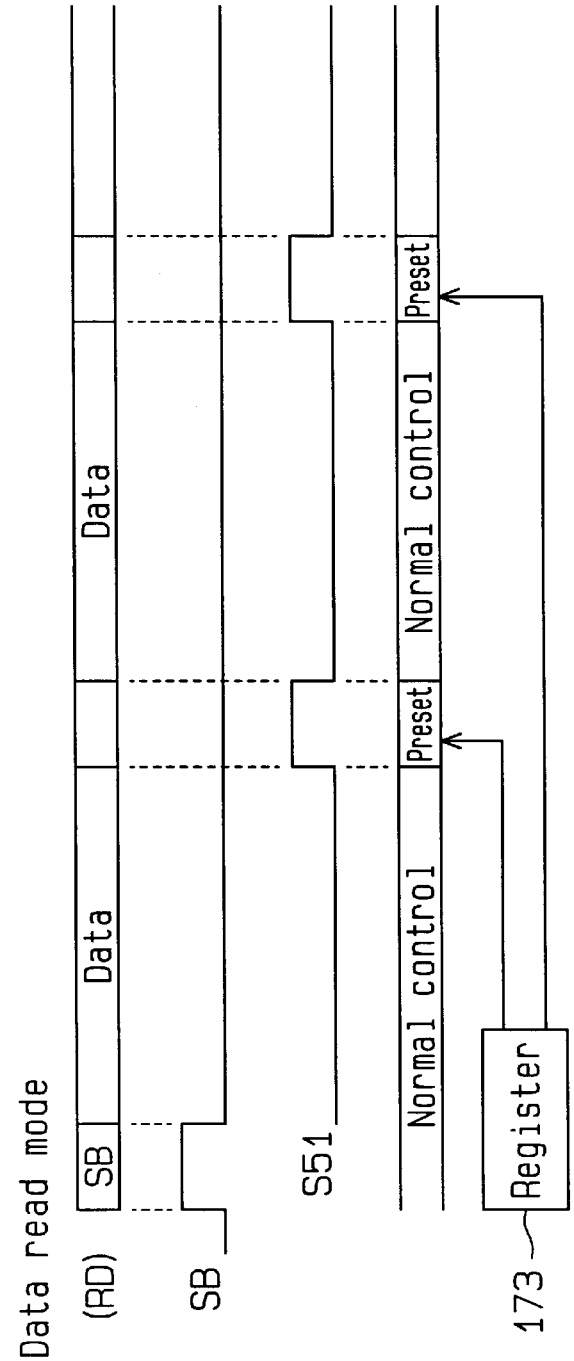

SIGNAL PROCESSOR HAVING FEEDBACK LOOP CONTROL FOR DECISION FEEDBACK EQUALIZER

BACKGROUND OF THE INVENTION

The present invention relates to a signal processor for processing a read signal, and, more particularly, to improvements on feedback loop control for decision feedback equalizers, which are used in a read channel IC for a hard disk device and fast data communication devices, and in circuits for correcting errors in read data.

A read channel IC in a hard disk device receives an analog signal, read from a hard disk by a read head. A waveform equalizer in the read channel IC converts the analog signal to a digital signal. The read channel IC decodes the digital signal and converts the decoded digital signal to a parallel signal.

There are two types of waveform equalizers: a PRML (Partial Response and Maximum-Likelihood decoding) type waveform equalizer and a decision feedback equalizer (DFE). The PRML type waveform equalizer needs a high-precision digital filter and equalizer filter, which stands in the way of increasing processing speed and circuit miniaturization. The DFE has a relatively simple circuit structure, which makes it a good candidate for improving the speed of reading out recorded data and reducing the size of the equalizer.

FIG. 1 is a schematic block diagram of a first conventional decision feedback equalizer (DFE) 11. The DFE 11 has a prefilter (feed-forward filter) 12, an adder 13, a decision unit 14, a shift register 15, and a feedback filter 16. The prefilter 12 supplies a filtered analog signal to the adder 13. The adder 13 adds the filtered analog signal and the output signal of the feedback filter 16, and sends the added output to the decision unit 14. The decision unit 14 compares the output voltage of the adder 13 with a predetermined reference voltage, and sends a decision signal S1 of "1" or "0" to the shift register 15. That is, the decision unit 14 converts the output signal of the adder 13 to a digital signal.

The shift register 15 includes registers 15a whose quantity corresponds to the number of the taps of the feedback filter 16 (eight in this example). The individual registers 15a store the decision signal S1 from the decision unit 14 one after another in synchronism with a clock signal CLK. Accordingly, sampled, old data is stored in the shift register 15.

The feedback filter 16, which is preferably an FIR (Finite Impulse Response) filter, includes multipliers 17 corresponding in number to the taps, an adder 18, and a digital-analog converter (DAC) 19. The multipliers 17 receive 8-bit data from the shift register 15 and perform multiplication on the 8-bit data using predetermined filter coefficients $\omega 7$ to $\omega 0$. The adder 18 adds the operational results from the multipliers 17. The DAC 19 converts the added result from the adder 18 to an analog signal and supplies the analog signal to the adder 13. In this manner, the feedback filter 16 computes the feedback response (the analog amount of the signal to be supplied to the adder 13 (feedback amount)) using the data stored in the shift register 15. The feedback loop, which is formed by the adder 13, the decision unit 14, the shift register 15 and the feedback filter 16, eliminates interference between codes (symbols) included in a digital signal. The digital signal (reproduced signal) which is then free of code interference is output from one register 15a in the shift register 15.

The time the multipliers 17 and the adder 18 in the DFE 11 needs to compute the feedback response restricts the speed of the reading operation. In other words, the speed of the DFE 11 is limited by the speed of the multipliers 17 and the adder 18.

FIG. 2 is a schematic block diagram of a second conventional decision feedback equalizer (DFE) 21. In FIG. 2, the same reference numerals as given to the elements of the DFE 11 in FIG. 1 are used for corresponding elements. The DFE 21 comprises a prefilter 12, an adder 13, a decision unit 14, a shift register 15 and a feedback filter 22. The feedback filter 22 includes an address decoder 23, a memory (RAM) 24 and a DAC 25. The DFE 21 which uses the RAM 24 is called RAM-DFE.

The RAM 24 has a plurality of areas 24a for storing feedback response data, which is generated by using 8-bit pattern data output from the shift register 15. The feedback response data is acquired by performing an operation on the 8-bit pattern data using predetermined filter coefficients $\omega 7$ to $\omega 0$.

The decoder 23 receives the 8-bit pattern data from the shift register 15 and supplies the RAM 24 with an address signal for selecting the area 24a where the feedback response data corresponding to the received pattern data is stored. The feedback response data is read from the area 24a that has been selected according to the address signal, and is supplied to the DAC 25. The DAC 25 converts the feedback response data to an analog signal and sends the analog signal to the adder 13.

The time needed for the operation of the feedback filter 22 is the decoding time of the decoder 23 plus the reading time of the feedback response data. This time is shorter than the operation time of the feedback filter 16 in FIG. 1. The use of the DFE 21 therefore has an improved reading speed.

The level of a read signal (Lorentz pulse) at a point of a magnetic variation, read by a hard disk device, may drop depending on the state of a recording medium or the read head. Further, a read signal having a level necessary for decision may not be obtained due to noise. In such a case, the decision unit 14 makes a decision error, causing erroneous data to be stored in the shift register 15. The erroneous data is supplied to the adder 13, resulting in divergence of the feedback loop. At this time, the DFE 21 continuously outputs reproduced signals of one state ("0" or "1"). That is, the feedback loop is temporarily stabilized to a fixed state, and will only return to the normal state after a considerable time. While the DFE 21 is outputting an erroneous reproduced signal, the hard disk device repeats the read operation on the same area of the magnetic disk. This elongates the data reading time.

When the frequency of the read signal changes according to the position of the read data on the magnetic disk, it is necessary to quickly change the feedback response data stored in the RAM 24 in accordance with the frequency. Rewriting all the feedback response data however takes time. The rewriting time interferes with speeding up the read operation.

More specifically, a hard disk device manages data in accordance with tracks formed concentrically on a magnetic disk and sectors which are radial segments of the recording surface. The same amount of data is recorded on the individual sectors. The closer to the center of the magnetic disk a sector is located, therefore, the higher the recording density becomes. When such a magnetic disk is rotated at a constant velocity, the symbol rate (the number of bits per unit time) of a signal read from the magnetic disk increases as the reading sector gets closer to the center of the magnetic disk. The frequency of the read signal therefore changes in accordance with the position of the reading sector.

FIG. 3 is a schematic block diagram of a conventional signal processor 213. A head unit 212, such as an MR (Magneto Resistive) head reads data recorded on a magnetic disk 211, and sends a read signal RD having a voltage waveform (reproduced waveform from the magnetic disk) according to the status (1 or 0) of the read data to the signal processor 213. A variable gain amplifier (VGA) 214 amplifies the read signal RD and sends the resultant signal having a predetermined amplitude to a decision feedback equalizer (DFE) 215.

As shown in FIG. 4, the DFE 215 includes a prefilter 216, an adder 217, a decision unit 218, a shift register 219 and a feedback filter 220. An A/D converter (ADC) 222 in a timing clock reproduction PLL circuit 221 receives the output signal of the adder 217, and converts this signal to a digital signal. A timing recovery PLL circuit (TR-PLL) 223 receives the digital signal from the ADC 222 and carries out phase comparison to generate a clock signal CLK synchronous with the read signal RD. The ADC 222 produces a digital signal from the read signal in accordance with the clock signal CLK generated by the TR-PLL 223. The shift register 219 in the DFE 215 samples the output signal of the decision unit 218 in accordance with the clock signal CLK (the bit transfer rate of the read signal RD) and temporarily stores a decision signal corresponding to the recorded data.

Returning to FIG. 3, a serial-parallel converter (S/P converter) 224 receives the reproduced digital signal from the DFE 215 and converts the signal to a parallel signal. A decoder 225 decodes the parallel signal according to a predetermined algorithm, and supplies the decoded data to a descrambler 226. The descrambler 226 rearranges the bits of the decoded data, yielding reproduced data. The reproduced data is sent via an interface circuit 227 to a hard disk controller (HDC) 231.

A sync byte (SB) detector 228 receives the parallel data from the S/P converter 224 and detects a sync byte (SB) included in the parallel data. The SB detector 228 compares data stored in a register 228a with the reproduced data, and supplies a sync byte detection signal SB2 to the HDC 231 when both data match. After the read operation by the signal processor 213 starts, the HDC 231 treats the reproduced data following the sync byte as recorded data in accordance with the sync byte detection signal SB2.

FIG. 5 shows the recording format of the magnetic disk (recording medium) 211. Each sector 235 on the magnetic disk 211 includes a preamble (PR) area 235a, a sync byte (SB) area 235b and a data area 235c.

A preamble code (PR code) is recorded in the PR area 235a. The PR code is control data used to set the amplification factor of the VGA 214 and generate the clock signal CLK synchronous with the read signal RD in the TR-PLL 223. The PR code is, for example, bit data "111000". The read signal RD of the PR code has a sinusoidal wave. Recorded in the SB area 235b is a sync byte (SB) code, which is mainly used to detect the start of the data area 235c.

When the frequency of occurrence of bit errors in reproduced signals increases due to increased speed of reading information from the magnetic disk 211, a bit error is likely to occur in the SB data. In this case, data stored in the register 228a does not coincide with the SB data, so that the SB detector 228 does not output a detection signal. When the HDC 31 does not receive the detection signal for a predetermined time since the beginning of the read operation, the HDC 31 determines that detection of the sync byte has failed, and sends a signal indicating a reading failure to a microprocessor (MPU). In response to this signal, the MPU restarts the read operation. Thus, the MPU needs to repeatedly restart of the read operation until the sync byte is detected. This increases the load on the MPU and increases the time for data transfer to the MPU. That is, the time for reading information from the magnetic disk 211 increases.

Increasing the recording density of a magnetic disk shortens the period for reading preamble data. When the phase of the read signal RD significantly differs from that of the clock signal CLK, the TR-PLL 223 does not have sufficient time to generate the clock signal CLK that is synchronous with the read signal RD. This makes the operation of the feedback loop of the DFE 215 unstable. That is, when the clock signal CLK is not synchronized with the read signal RD, the shift register 219 samples erroneous data. The erroneous data results in a decision error of the DFE 215 or divergence of the feedback loop.

The error correction process influences the data reading speed. A conventional error correcting apparatus performs error correction using an error correcting code (ECC) in digital read data produced by a data storage control apparatus, and supplies error-corrected data to an external device via an external interface. When there are lot of errors in data read from a recording medium like an optical disk, the processing time of the error correcting apparatus becomes longer. As a result, data before error correction remains uncorrected. When the amount of errors in the read data is small, on the other hand, the processing time of the error correcting apparatus becomes shorter. Consequently, error-corrected data waits to be sent to the external device.

The data storage control apparatus therefore has a buffer memory which has first and second data areas. Data before error correction is temporarily recorded in the first data area. The error correcting apparatus reads data from the first data area, implements error correction on that data, and stores the error-corrected data in the second data area. The external interface reads the error-corrected data from the second data area and supplies it to the external device.

The capacity of the first data area of the buffer memory is determined on the assumption that the amount of errors in the data before error correction is the maximum (the longest error correction time). The capacity of the second data area is determined on the assumption of the minimum amount of errors (the shortest error correction time). Setting the memory capacity this way not only increases the area of the buffer memory but also is redundant. One therefore wants to reduce the area of the buffer memory. However, the frequency of occurrence of overflow increases in accordance with the reduction in the area of the buffer memory. When an overflow occurs in the first or second data area, data stored there is overwritten with new data. This requires that data is read again from the recording medium. In this case, it is necessary to control the driving system of the recording medium, making the reading time longer.

Accordingly, it is a first object of the present invention to provide a signal processor which improves the data reading speed.

It is a second object of the present invention to provide an error correcting apparatus having an improved the data reading speed and a reduced buffer memory size.

SUMMARY OF THE INVENTION

In a first aspect of the present invention, a method is provided that controls a decision feedback equalizer. First, an operation signal is generated using an input signal and a feedback signal, and the operation signal is analyzed in accordance with a predetermined criterion to generate a decision signal. The decision signal is stored in a shift register. The feedback signal is generated using the decision signal. Then, a content of the shift register, including the decision signal is monitored.

In a second aspect of the present invention, a method is provided that controls a decision feedback equalizer. First, an operation signal is generated using an input signal and a feedback signal, and the operation signal is analyzed in accordance with a predetermined criterion to generate a decision signal. The decision signal is stored in a shift register, and the feedback signal is generated using the decision signal. Then, an initial value of the feedback signal is computed using the input signal, and the shift register is preset using the initial value.

In a third aspect of the present invention, a decision feedback equalizer is provided that includes a prefilter for receiving an input signal and filtering the input signal to generate a filtered input signal. An adder receives a feedback signal and the filtered input signal and adds the filtered input signal and the feedback signal to generate an added signal. A decision unit receives the added signal and analyzes the added signal in accordance with predetermined criterion to generate a decision signal. A shift register stores the decision signal. A feedback signal generator generates the feedback signal using the decision signal. A monitor circuit monitors a content of the shift register, including the decision signal.

In a fourth aspect of the present invention, a signal processor is provided that includes a decision feedback equalizer for waveform-equalizing a read signal read from a recording medium and generating a waveform-equalized read signal, the decision feedback equalizer including. A prefilter filters the read signal and generates a filtered read signal. An adder adds a feedback signal and the filtered read signal and generates an added signal. A decision unit receives the added signal, analyzes the added signal in accordance with predetermined criterion, and generates a decision signal. A shift register samples the decision signal in accordance with a reference clock signal and stores sampling data. The waveform-equalized read signal is output from the shift register. A feedback filter receives the sampling data stored in the shift register and generates the feedback signal using the sampling data. A changeover switch receives the filtered read signal and the added signal and selects one of the filtered read signal and the added signal. An A/D converter converts the selected one of the filtered read signal and the added signal to a digital signal in accordance with the reference clock signal. A digital operation circuit receives the digital signal from the A/D converter, generates initial sampling data using the digital signal, and prestores the initial sampling data in the shift register.

In a fifth aspect of the present invention, a decision feedback equalizer is provided that includes a prefilter for filtering an input signal and generating a filtered input signal. An adder adds a feedback signal and the filtered input signal and generates an added signal. A decision unit analyzes the added signal in accordance with predetermined criterion and generates a decision signal. A shift register samples the decision signal in accordance with a reference clock signal and stores sampling data. A feedback filter receives the sampling data stored in the shift register and generates the feedback signal using the sampling data. An abnormality detector detects an abnormality in the input signal and supplying an abnormality detection signal to the feedback filter. The feedback filter stops generating the feedback signal in response to the abnormality detection signal.

In a sixth aspect of the present invention, a signal processor is provided that includes a variable gain amplifier amplifies a read signal from a recording medium which includes a preamble signal, and generates an amplified read signal. A decision feedback equalizer waveform-equalizes the amplified read signal in accordance with a reference clock signal, and generates a waveform-equalized read signal, the decision feedback equalizer adding the amplified read signal and a feedback signal together to generate an added signal, analyzes the added signal in accordance with predetermined criterion to generate a decision signal, and generates the feedback signal using the decision signal. An error computing circuit computes an error between the added signal and the decision signal and generates an error signal. An auto gain control receives the error signal from the error computing circuit and generates a gain control signal based on the error signal. The gain control signal controls the gain of the VGA. A PLL circuit receives the error signal from the error computing circuit and generates the reference clock signal using the error signal. An abnormality detector receives the amplified read signal from the VGA, detects an abnormality in the amplified read signal, and controls the decision feedback equalizer, the AGC and the PLL circuit based on a detection result.

In a seventh aspect of the present invention, a signal processor is provided that includes a decision feedback equalizer for receiving a read signal read from a recording medium, waveform-equalizing the read signal in accordance with a reference clock signal, and generating a waveform-equalized read signal. The decision feedback equalizer includes a prefilter for filtering the read signal and generating a filtered read signal. An adder adds a feedback signal and the filtered read signal and generates an added signal. A decision unit analyzes the added signal in accordance with predetermined criterion, and generates a decision signal. A shift register samples the decision signal from the decision unit in accordance with a reference clock signal and stores sampling data. The waveform-equalized read signal is output from the shift register. A feedback filter receives the sampling data stored in the shift register and generates the feedback signal using the sampling data. A controller presets predetermined sampling data in the feedback filter at predetermined intervals.

In an eighth aspect of the present invention, a decision feedback equalizer is provided that includes a prefilter (12) for filtering an input signal and generating a filtered input signal. An adder adds a feedback signal and the filtered input signal and generates an added signal. A decision unit receives the added signal, analyzes the added signal in accordance with predetermined criterion, and generates a decision signal. A shift register samples the decision signal in accordance with a reference clock signal and stores sampling data. A memory circuit stores plural pieces of the sampling data. One of the plural pieces of the sampling data which corresponds to the sampling data stored in the shift register is read from the memory circuit. A circuit generates the feedback signal using the read sampling data. A rewriting circuit rewrites the plural pieces of sampling data stored in the memory circuit.

In a ninth aspect of the present invention, a method for reading data is provided. First, a read signal including a preamble signal and a sync byte signal are read from a recording medium. A clock signal is generated synchronous with the preamble signal using the preamble signal, and the read signal is sampled using the clock signal to generates a reproduced signal. Then, the sync byte signal is compared with the clock signal to generate a new clock signal synchronous with the sync byte signal.

In a tenth aspect of the present invention, a data reading apparatus is provided that includes a waveform equalizer for sampling a read signal read from a recording medium in accordance with a clock signal. The read signal includes a preamble signal and a sync byte signal. A PLL circuit generates a clock signal synchronous with the preamble signal using the preamble signal. The PLL circuit compares the sync byte signal with the clock signal and generates a new clock signal synchronous with the sync byte signal based on a sync byte comparison signal.

In an eleventh aspect of the present invention, a method for controlling an error correcting apparatus is provided. First, data is corrected at a predetermined processing speed. Then, a load of the error correcting apparatus is detected during error correction, and the predetermined processing speed is changed in accordance with the detected load.

In a twelfth aspect of the present invention, a method for controlling an error correcting apparatus is provided. First, uncorrected data is read from a first memory device, and the uncorrected data is corrected at a predetermined processing speed. The corrected data is stored in one of the first memory device and a second memory device. Then, a load of the error correcting apparatus is detected during error correction, and the predetermined processing speed is changed in accordance with the detected load.

In a thirteenth aspect of the present invention, a method for controlling an error correcting apparatus is provided. First, uncorrected data is read from a first memory device, and the uncorrected data is corrected. The corrected data is stored in one of the first memory device and a second memory device. The corrected data is read from one of the first memory device and the second memory device at a predetermined reading speed. Then, a load of the error correcting apparatus is detected during error correction, and the predetermined reading speed is changed in accordance with the detected load.

In a fourteen aspect of the present invention, an error correcting apparatus is provided that includes an error correcting circuit performs error correction on the uncorrected data at a predetermined processing speed and stores the corrected data in one of the first memory device and a second memory device. A controller detects a load of the error correcting circuit and generates a control signal for controlling the predetermined processing speed in accordance with the detected load.

In a fifteenth aspect of the present invention, an error correcting apparatus is provided that includes an error correcting circuit for receiving uncorrected data read from a first memory device, performing error correction on the uncorrected data and storing the data corrected in one of the first memory device and a second memory device. An interface circuit reads the corrected data from one of the first and second memory devices at a predetermined reading speed. A controller detects a load of the error correcting circuit, and generates a control signal for controlling the predetermined reading speed in accordance with the detected load.

In a sixteenth aspect of the present invention, control circuit is provided that controls an error correcting performance of an error correcting apparatus performing error correction at a predetermined processing speed. The control circuit includes a load detector, connected to the error correcting apparatus, for detecting a load of the error correcting apparatus during error correction. A performance controller generates a control signal for controlling the predetermined processing speed in accordance with the detected load.

In a seventeenth aspect of the present invention, a control circuit is provided that controls an error correcting performance of an error correcting apparatus receiving uncorrected data read from a first memory device, correcting the uncorrected data, and storing the data corrected in one of the first memory device and a second memory device. The corrected data, stored in one of the first and second memory device is read at a predetermined reading speed. The control circuit includes a load detector, connected to the error correcting apparatus, for detecting a load of the error correcting apparatus during error correction. A performance controller generates a control signal for controlling the predetermined reading speed in accordance with the detected load.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 20 is a first diagram depicting input/output data of an error detector of the DFE of FIG. 17;

FIG. 21 is a second diagram depicting input/output data of the error detector of the DFE of FIG. 17;

FIG. 22 is a third diagram depicting input/output data of the error detector of the DFE of FIG. 17;

FIG. 23 is a fourth diagram depicting input/output data of the error detector of the DFE of FIG. 17;

FIG. 56A and 56B are signal waveform diagrams showing the operation of a timing controller of the signal processor of FIG. 55;

DETAILED DESCRIPTION OF THE PREFERRED EMBODIMENTS

Figure 1:
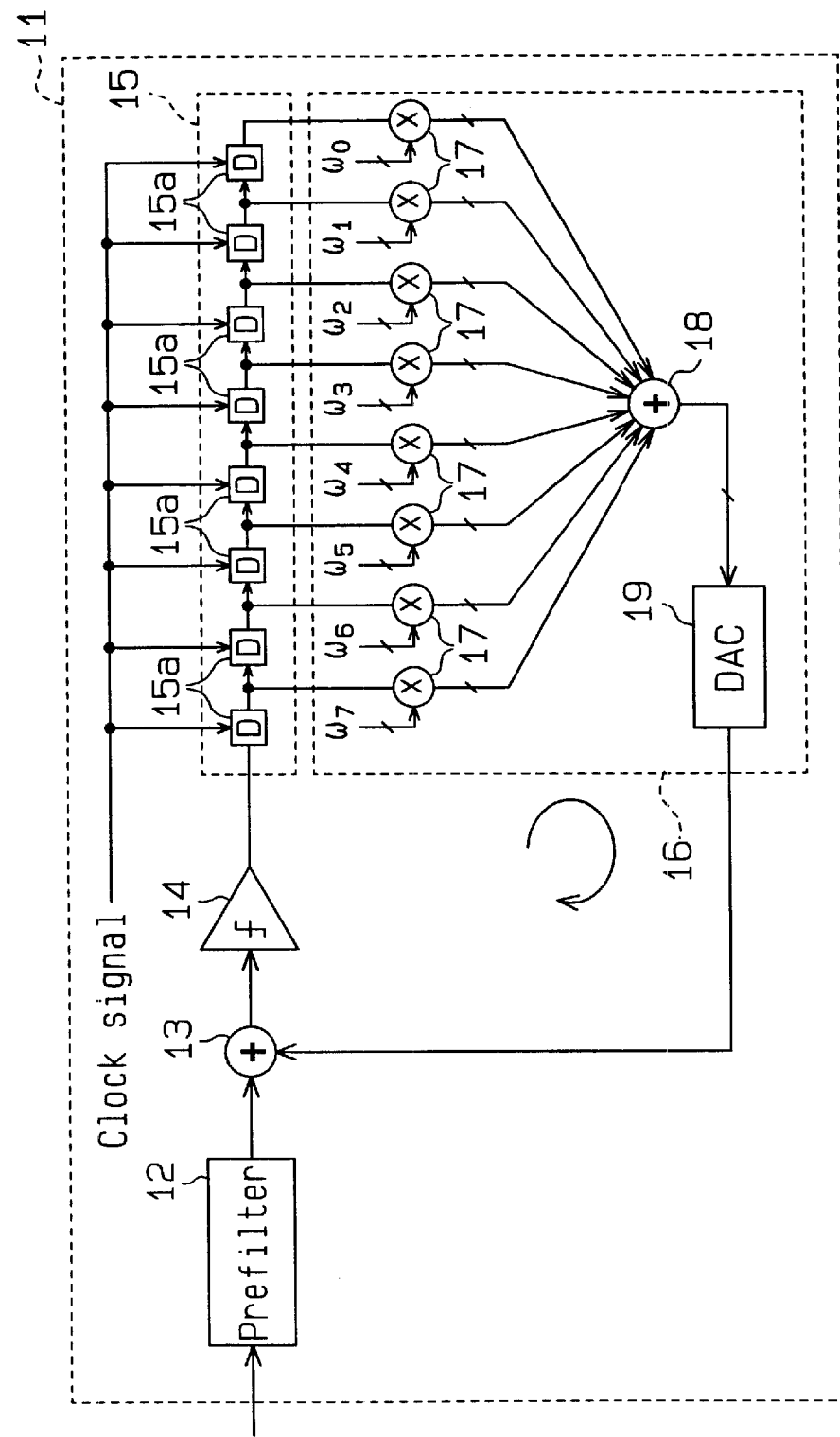
FIG. 1 is a schematic block diagram of a first conventional decision feedback equalizer (DFE)

In the drawings, like numerals are used for like elements throughout.

First Embodiment

Figure 6:
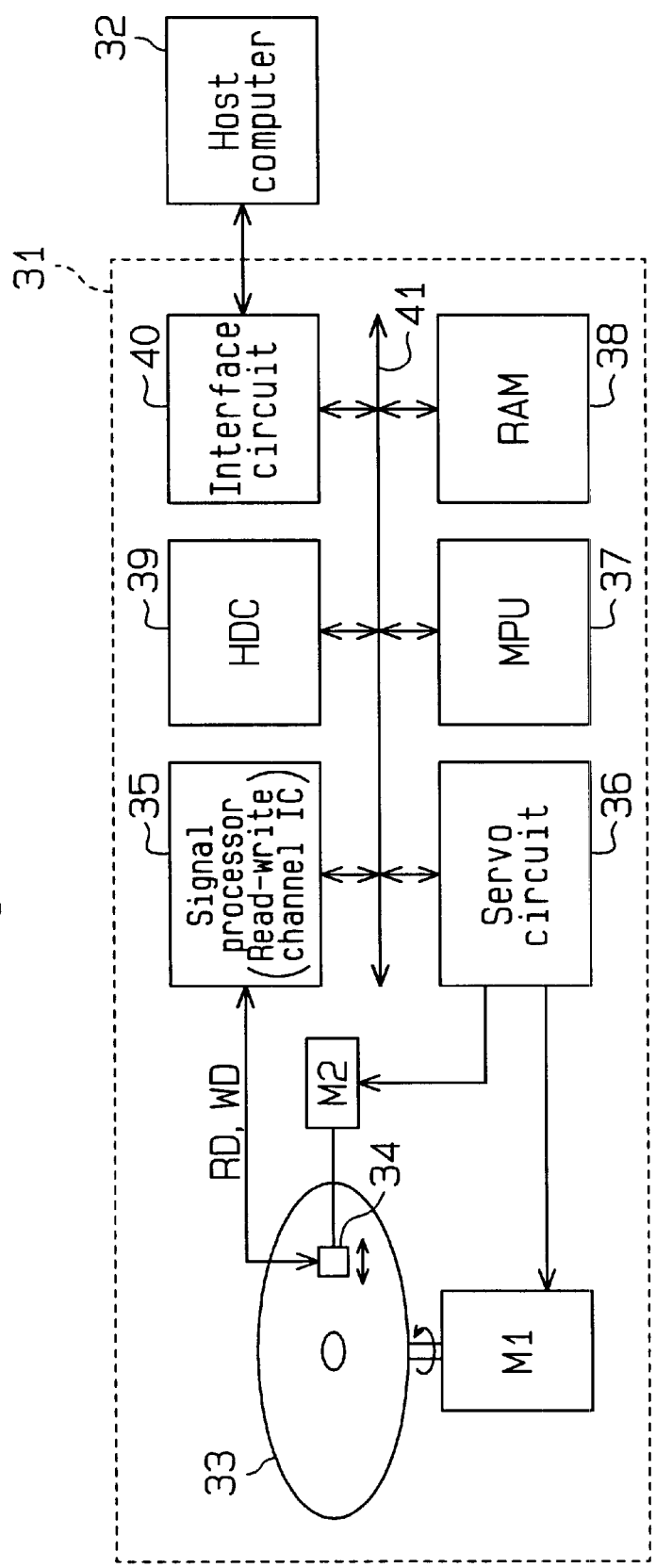
FIG. 6 is a schematic block diagram of a hard disk device.

FIG. 6 is a schematic block diagram of a hard disk device. The hard disk device 31 receives data from a host computer 32 and records the data on a magnetic disk 33 in accordance with a write request from the host computer 32. The hard disk device 31 reads data from the magnetic disk 33 and supplies the data to the host computer 32 in accordance with a read request therefrom.

The hard disk device 31 comprises the magnetic disk 33, first and second motors M1 and M2, a head unit 34, a signal processor 35, a servo circuit 36, a microprocessor unit (MPU) 37, a memory (RAM) 38, a hard disk controller (HDC) 39 and an interface circuit 40, all connected to a bus 41.

The magnetic disk 33 is rotated at a constant velocity by the first motor M1. The head unit 34 is moved in the radial direction of the magnetic disk 33 by the second motor M2. The head unit 34 reads information, recorded on the magnetic disk 33, and supplies an analog read signal RD to the signal processor 35.

The signal processor (read/write channel IC) 35 converts the read signal RD to a digital signal through sampling which is synchronous with the read signal RD. The signal processor 35 decodes the digital signal, generating decoded data.

The servo circuit 36 controls the first motor M1 for rotating the magnetic disk 33 at a constant velocity. The servo circuit 36 receives the decoded data from the signal processor 35 and controls the second motor M2 for tracking a target track in accordance with servo information included in the decoded data.

The MPU 37 analyzes a command for a write/read process, etc. from the host computer 32 in accordance with a program stored in the RAM 38, and outputs a control signal. The HDC 39 receives the control signal from the MPU 37, and controls the signal processor 35 and the servo circuit 36. The HDC 39 also receives the digital signal from the signal processor 35 and generates sector data having a predetermined number of bytes. The HDC 39 further performs, preferably, ECC (Error Correcting Code) based error correction sector by sector, and supplies error-corrected data to the interface circuit 40 via the bus 41. The interface circuit 40 converts the output data of the HDC 39 to data according to a predetermined protocol, and supplies the read data to the host computer 32.

The HDC 39 receives write data from the host computer 32 via the interface circuit 40 and affixes the error-corrected data to the write data. The signal processor 35 writes the output data of the HDC 39 on the magnetic disk 33 via the head unit 34.

Figure 7:
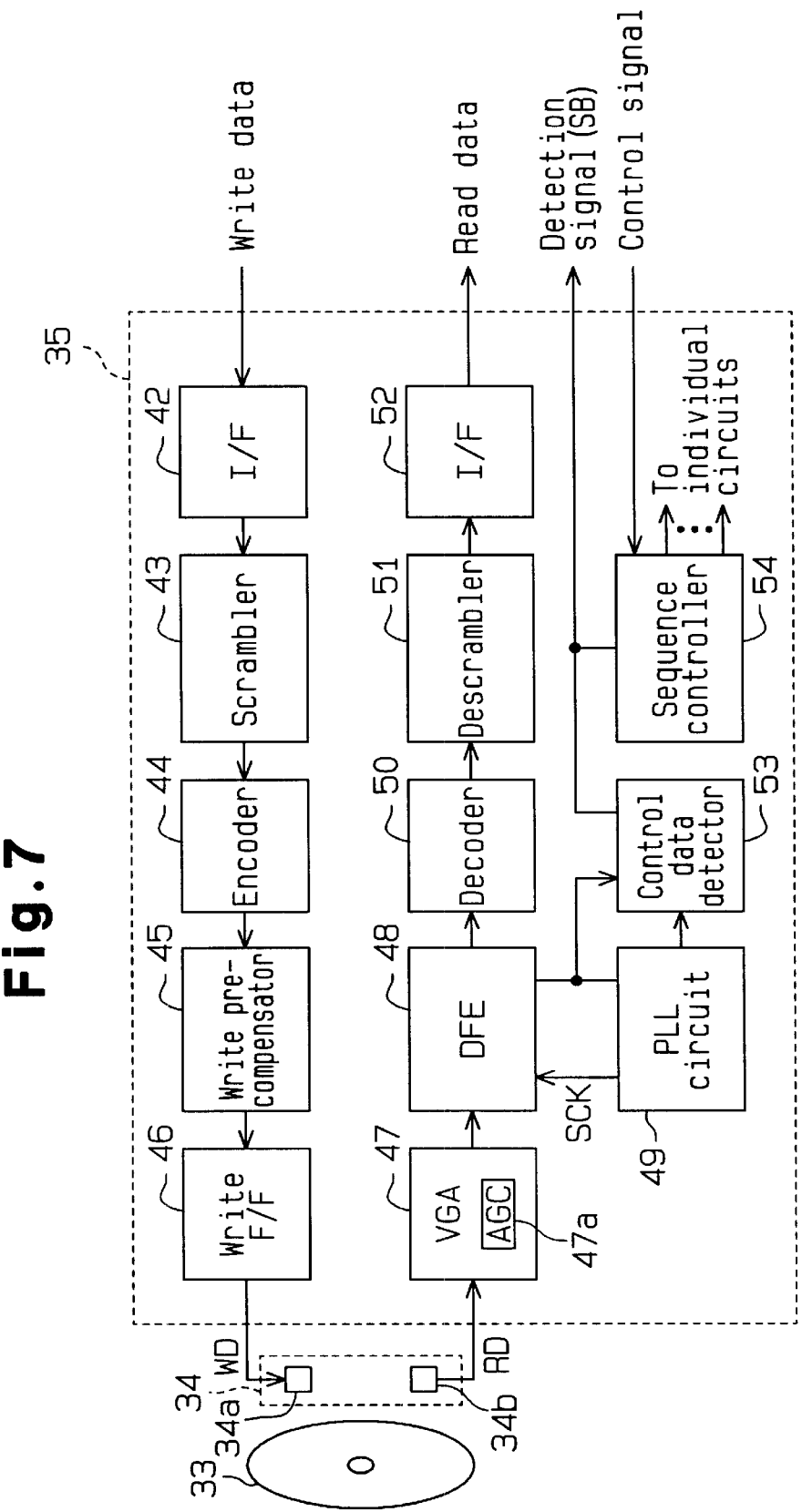
FIG. 7 is a schematic block diagram of a signal processor of the hard disk device of FIG. 6.

FIG. 7 is a schematic block diagram of the signal processor 35.

Write Operation

A scrambler 43 receives the write data from the MPU 37 through an interface circuit 42, and changes the order of the bits of the write data in accordance with a predetermined protocol, thereby generating scrambled data. An encoder 44 encodes the scrambled data preferably in accordance with an RLL code (Run-Length Limited code: specifically, RLL (1, 7) code), and affixes control data including preamble data for controlling the read operation of the coded data. A write pre-compensator 45 compensates for the timing for writing data on the magnetic disk 33 and supplies compensated data to a write flip-flop (F/F) 46 in accordance with an NRZI system. The timing compensation is executed to prevent write information from being changed due to the influence of adjoining magnetic poles (which correspond to "0" or "1"). The write F/F 46 supplies write coded data (write signal WD) from the write pre-compensator 45 to a write head 34a of the head unit 34. That is, the write F/F 46 supplies a current corresponding to the write data to the write head 34a, which is a coil. The write head 34a forms magnetic poles according to the current on the magnetic disk 33, thereby recording the write data, which includes data, a preamble and a sync byte on the magnetic disk 33.

Read Operation

A read head 34b of the head unit 34 is preferably an MR (Magneto Resistive) head. The read head 34b supplies a variable gain amplifier (VGA) 47 with a read signal RD which has a level according to a change in the magnetic pole of the magnetic disk 33. The VGA 47 amplifies the read signal RD and supplies the amplified read signal to a decision feedback equalizer (DFE) 48. An auto gain controller (AGC) 47a of the VGA 47 controls the gain of the VGA 47 according to the frequency of the read signal in such a way that the amplitude of the output read signal of the VGA 47 is kept at a predetermined amplitude. The VGA 47 and the AGC 47a form a control loop which controls the amplitude of the analog signal.

A PLL circuit 49 receives an analog output signal from the DFE 48, and generates a clock signal SCK which is synchronous with the read signal RD. The DFE 48 wave-equalizes the amplified read signal from the VGA 47 in accordance with the clock signal SCK, thereby producing a digital signal. A decoder 50 decodes the digital signal from the DFE 48 in accordance with the RLL code, and supplies the decoded data to a descrambler 51. The descrambler 51 resorts the bits of the decoded data in accordance with a predetermined protocol, generating read data. This read data is supplied via an interface circuit 52 to the MPU 37.

A control data detector 53 receives the digital signal from the DFE 48, and detects a read control signal (preamble and sync byte) and servo information (servo mark) included in the digital signal. The detector 53 sends a detection signal corresponding to the detected signal and information to a sequence controller 54 and the MPU 37. The sequence controller 54 receives the detection signal from the detector 53 and a write/read control signal from the MPU 37, and controls the individual circuits 42 to 53 in accordance with a predetermined write/read sequence. The MPU 37 instructs the signal processor 35 to start a read operation. Thereafter, when receiving the sync byte detection signal, the MPU 37 handles the read data following the sync byte as recorded data and processes this recorded data.

Figure 8:
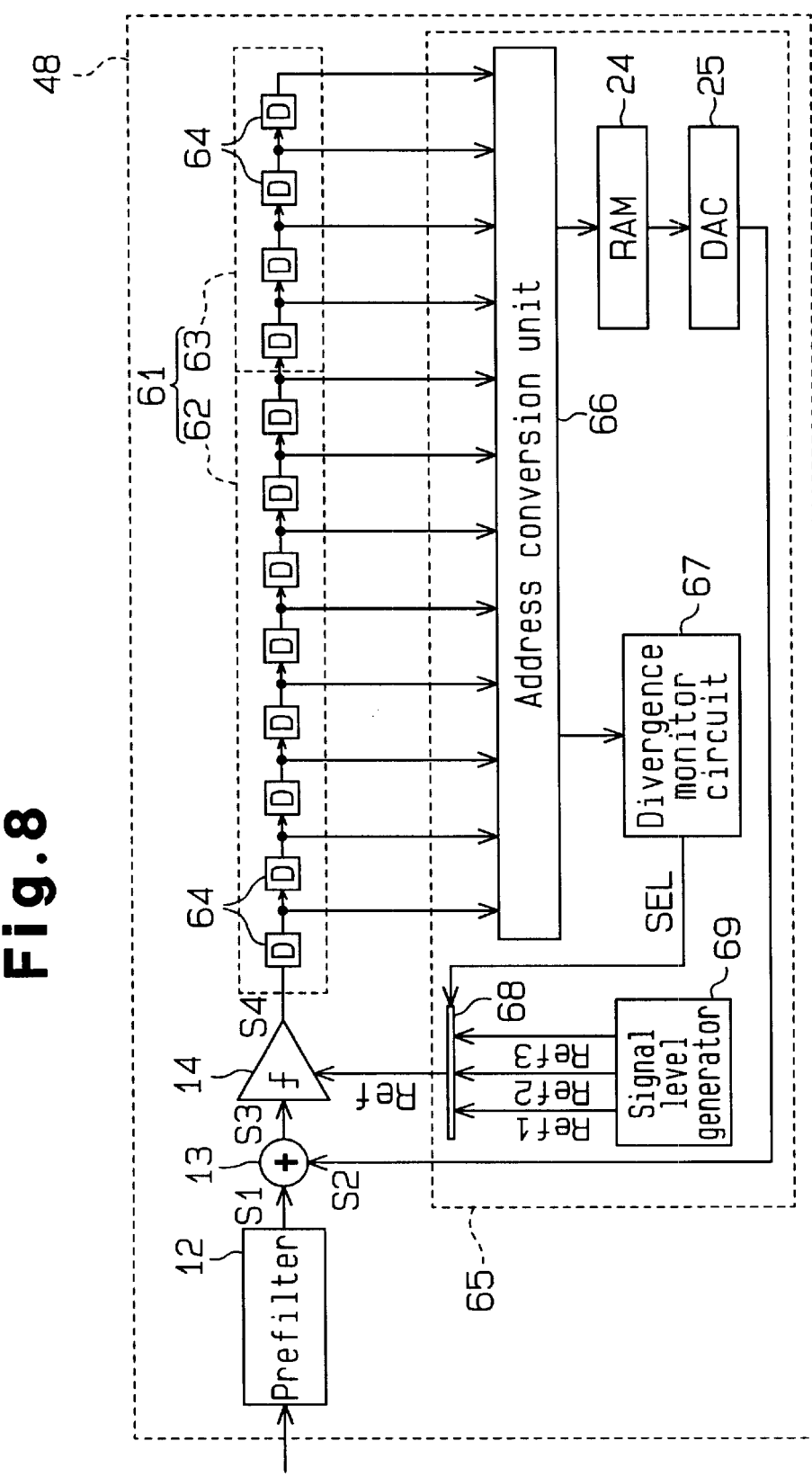
FIG. 8 is a schematic block diagram of a DFE according to a first embodiment of the present invention, which is provided in the signal processor of FIG. 7.

FIG. 8 is a schematic block diagram of the DFE 48 according to a first embodiment of the present invention. The DFE 48 comprises a prefilter 12, an adder 13, a decision unit 14, a shift register 61, and a feedback (FB) filter 65. The adder 13, decision unit 14, shift register 61 and FB filter 65 form a decision circuit.

The prefilter 12 receives the amplified read signal from the VGA 47 (FIG. 7) and filters the read signal to maximize the S/N ratio of the read signal. The adder 13 adds the filtered read signal S1 from the prefilter 12 and a feedback signal S2 from the FB filter 65, and sends a resultant signal S3 to the decision unit 14.

The decision unit 14 compares the voltage of the signal S3 from the adder 13 with a reference voltage Ref and supplies a decision signal S4 of "1" or "0" to the shift register 61. In this manner, the decision unit 14 converts the output signal S3 of the adder 13 to a digital signal.

The shift register 61 includes first and second register sections 62 and 63 each having a plurality of registers 64 for storing sampling data. The number of pieces of data stored in the shift register 61. (i.e., the total number of the registers 64) is determined based on a transfer code rule used in the encoder 44 and the decoder 50. More specifically, the number of the registers 64 in the first register section 62 corresponds to the number of taps of the FB filter 65 (eight in this case). The number of the registers 64 in the second register section 63 is four. Thus, 12 bits of sampled digital data of are stored in the twelve registers 64.

The FB filter 65 includes an address conversion unit 66, a memory (RAM) 24, a digital-analog converter (DAC) 25, a divergence monitor circuit 67, a selector 68 and a signal level generator 69. The address conversion unit 66 decodes 8-bit data from the first register section 62 and sends the decoding result as an address signal to the RAM 24. The address conversion unit 66 supplies the 12-bit data from the first and second register sections 62 and 63 to the divergence monitor circuit 67.

Figure 2:
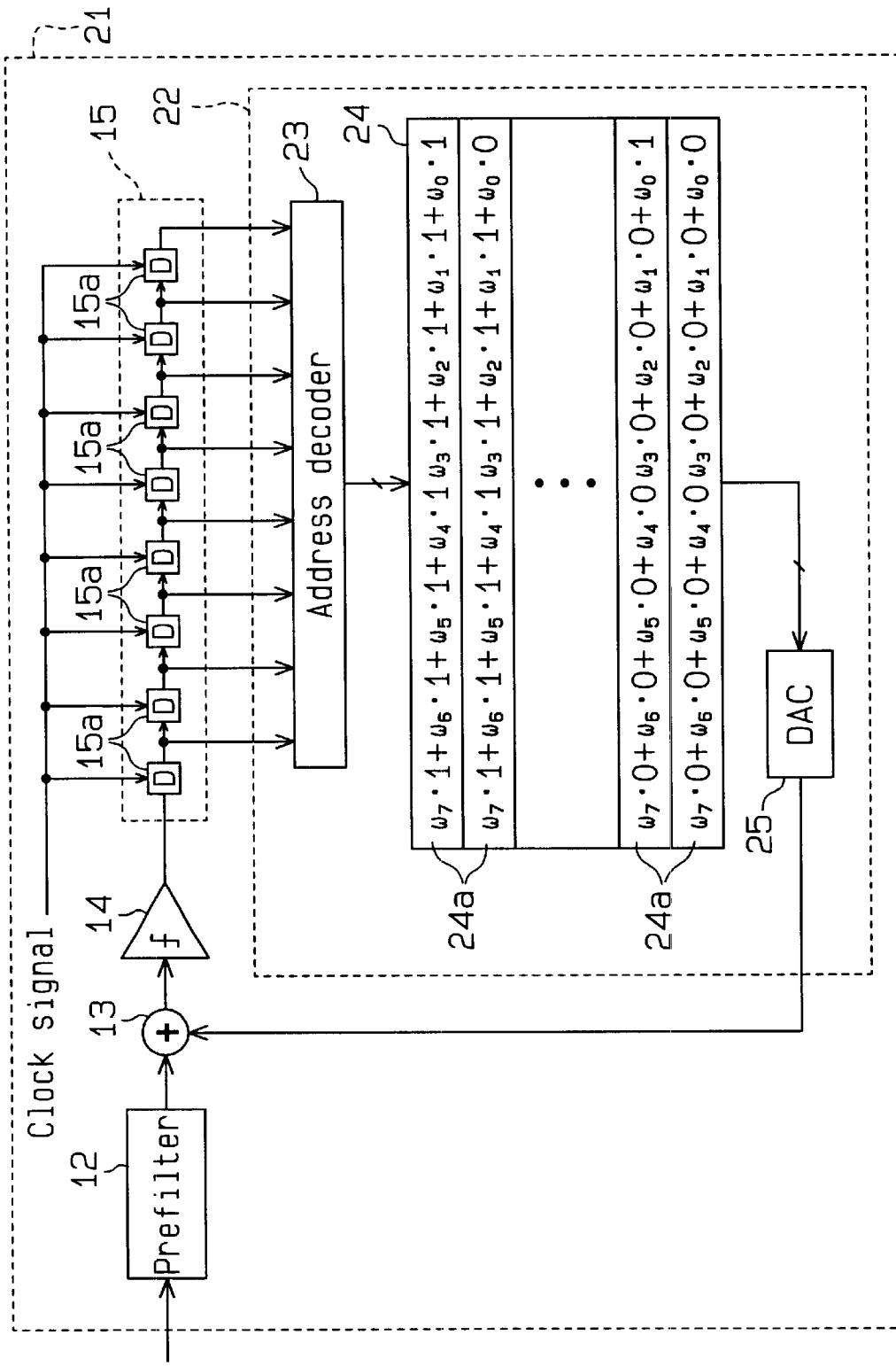
FIG. 2 is a schematic block diagram of a second conventional DFE.
Figure 3:
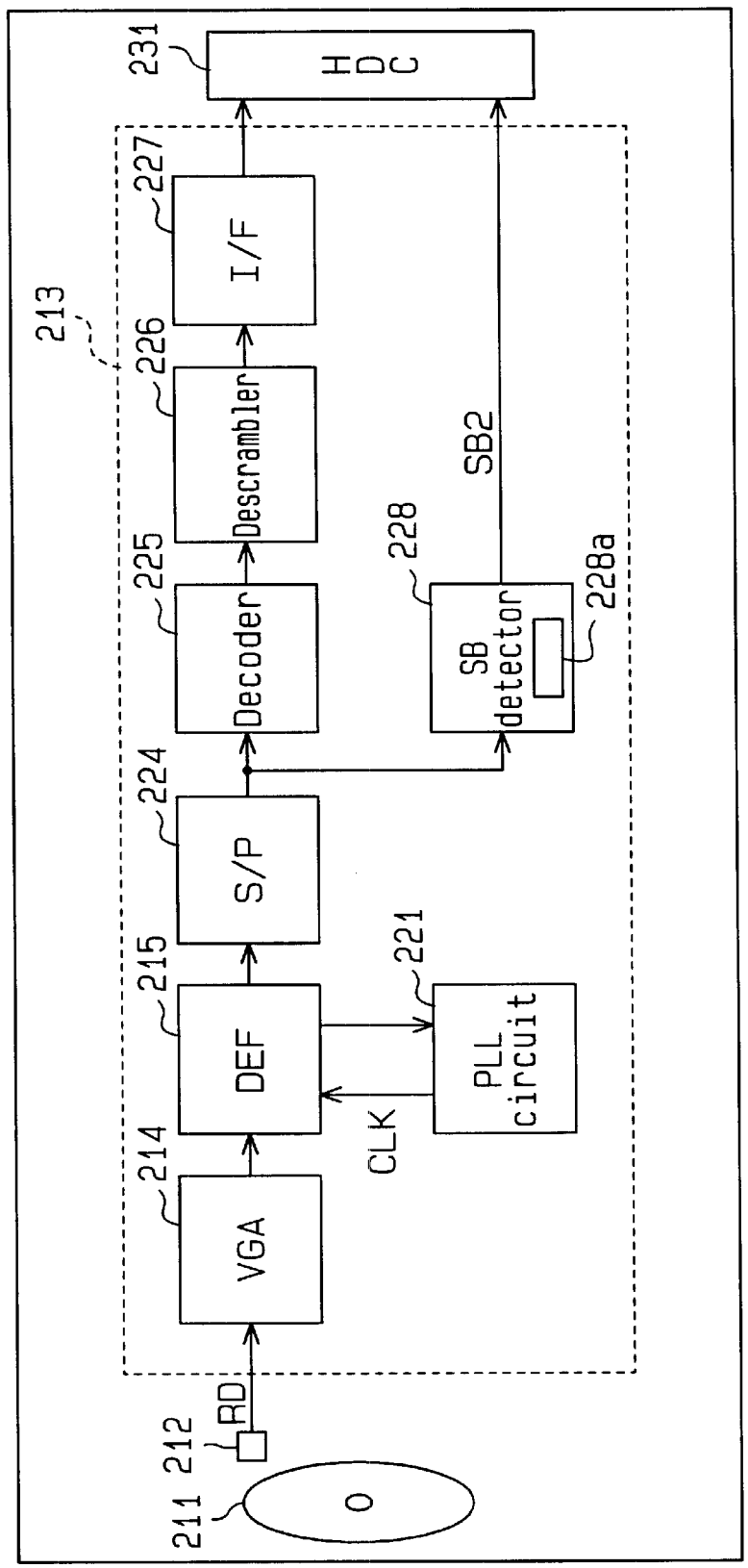
FIG. 3 is a schematic block diagram of a conventional signal processor.
Figure 4:
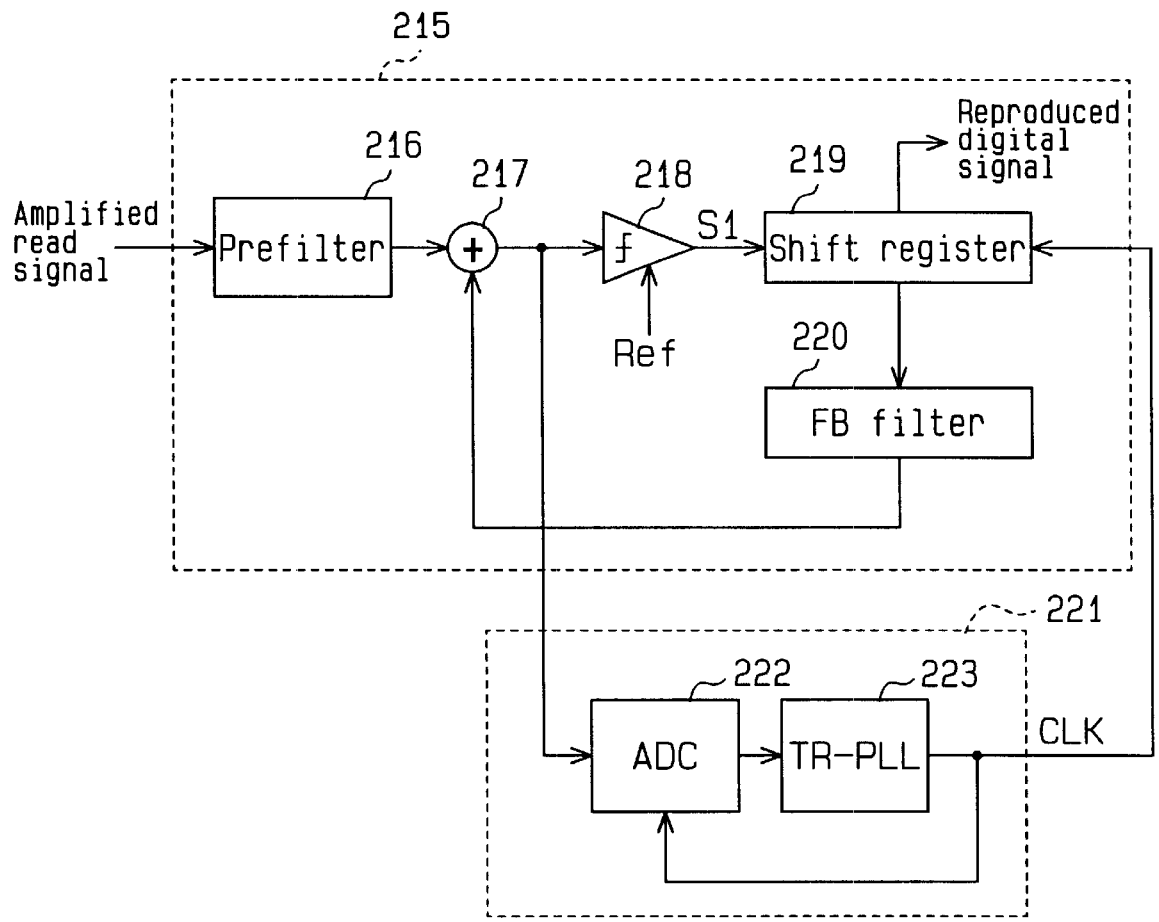
FIG. 4 is a schematic block diagram of a DFE and a PLL circuit of the signal processor of FIG. 3.
Figure 5:
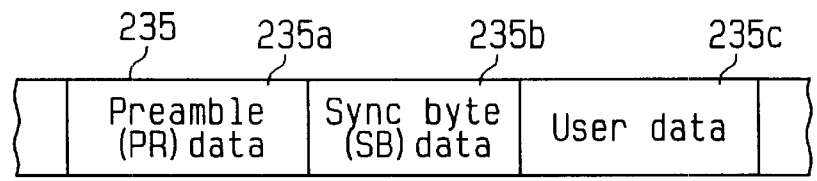
FIG. 5 shows a conventional recording format of the sectors on a recording medium.

The RAM 24 has the same structure as the RAM 24 of FIG. 2. In accordance with the address signal from the address conversion unit 66, feedback response data is read from one area 24a (see FIG. 2) in the RAM 24. The DAC 25 converts the feedback response data to an analog signal and sends the analog signal as the feedback signal S2 to the adder 13. The adder 13, the decision unit 14, the shift register 61, the address conversion unit 66, the RAM 24 and the DAC 25 form a feedback (FB) loop.

The divergence monitor circuit 67 determines if the FB loop is diverging, based on the 12-bit data from the address conversion unit 66. More specifically, the divergence monitor circuit 67 determines divergence of the FB loop by checking if the 12-bit data includes a sequence of bits which does not match with the transfer code rule. Data encoded by the encoder 44 based on the RLL (1, 7) code can take any one of the values from (101) to (100000001). That is, the coded data has a series of one "0" to seven "0's". When data having a sequence of eight or more "0's" is stored in the shift register 61, therefore, that data contains an error.

When the divergence monitor circuit 67 determines that the FB loop is not diverging, the divergence monitor circuit 67 supplies a select signal SEL having a value "0" to the selector 68. When the divergence monitor circuit 67 determines that the FB loop is diverging and the decision signal S4 from the decision unit 14 is fixed to a value "1", the divergence monitor circuit 67 outputs the select signal SEL having a value "1". When the divergence monitor circuit 67 determines that the FB loop is diverging and the decision signal S4 from the decision unit 14 is fixed to a value "0", the divergence monitor circuit 67 outputs the select signal SEL having a value "2".

The selector 68 receives a plurality of (three in this case) different reference voltages Ref1, Ref2 and Ref3 from the signal level generator 69. Because the decision unit 14 uses a reference voltage, the signal level generator 69 generates a plurality of reference voltages. If the decision unit 14 uses a reference current instead, the signal level generator 69 may produce a plurality of reference currents. The first reference voltage Ref1 is an intermediate voltage ((maximum voltage+minimum voltage)/2) of the input signal to the decision unit 14. The second reference voltage Ref2 is higher than the first reference voltage Ref1, and the third reference voltage Ref3 is lower than the first reference voltage Ref1.

In accordance with the select signal SEL having a value "0", the selector 68 selects the first reference voltage Ref1 and supplies this reference voltage Ref1 to the decision unit 14. In accordance with the select signal SEL having a value "1", the selector 68 selects the second reference voltage Ref2. In accordance with the select signal SEL having a value "2", the selector 68 selects the third reference voltage Ref3.

The decision unit 14 compares the reference voltage Ref with the voltage of the input signal S3, and outputs the decision signal S4 of "1" or "0" based on the comparison result. The reference voltage Ref (i.e., the criterion of the decision unit 14) is altered on the basis of the result of monitoring the FB loop of the FB filter 65.

Figure 9:
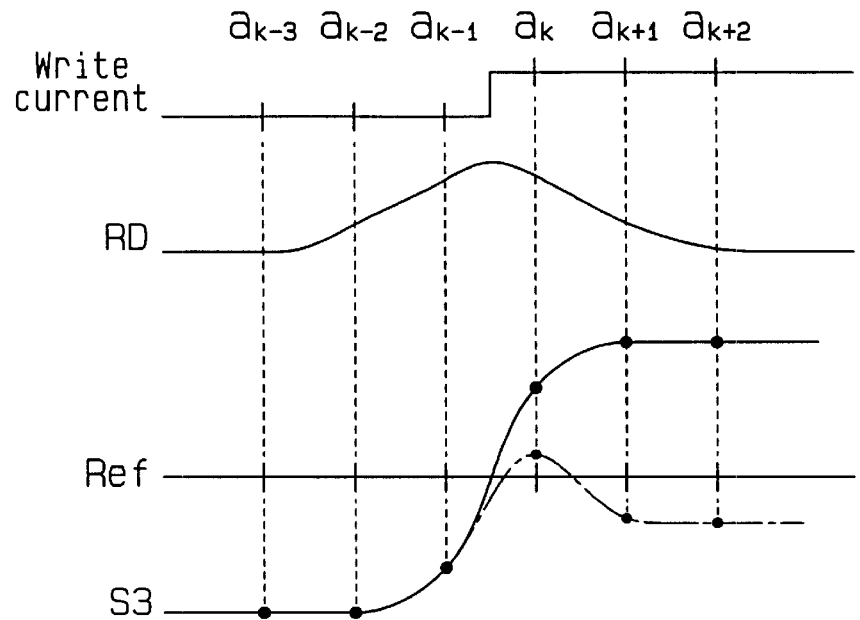
FIG. 9 is a signal waveform diagram explaining the divergence of the feedback loop of the DFE of FIG. 8.

FIG. 9 is a waveform diagram illustrating the divergent state of the FB loop. This waveform diagram shows the waveforms of a write current, the read signal RD and the output signal S3 of the adder 13. The read signal RD, which is a Lorentz pulse having the maximum value at a transition point of the write signal (between sampling points a(k−1) and a(k)), is supplied to the prefilter 12. The decision unit 14 compares the output signal S3 of the adder 13 with the reference voltage Ref at the individual sampling points a(k−3) to a(k+2).

Transmission of an error in the FB loop causes the output signal S3 of the adder 13 to drop as indicated by the alternate long and short line in FIG. 9, so that the output signal S3 becomes stable at a lower voltage than the reference voltage Ref at the sampling points a(k+1) and a(k+2).

Consequently, the decision unit 14 outputs the decision signal S4 of "0" at the sampling points a(k+1) and a(k+2), causing divergence of the FB loop.

The operation of the DFE 48 will now be described referring to FIGS. 10 to 15.

Figure 10:
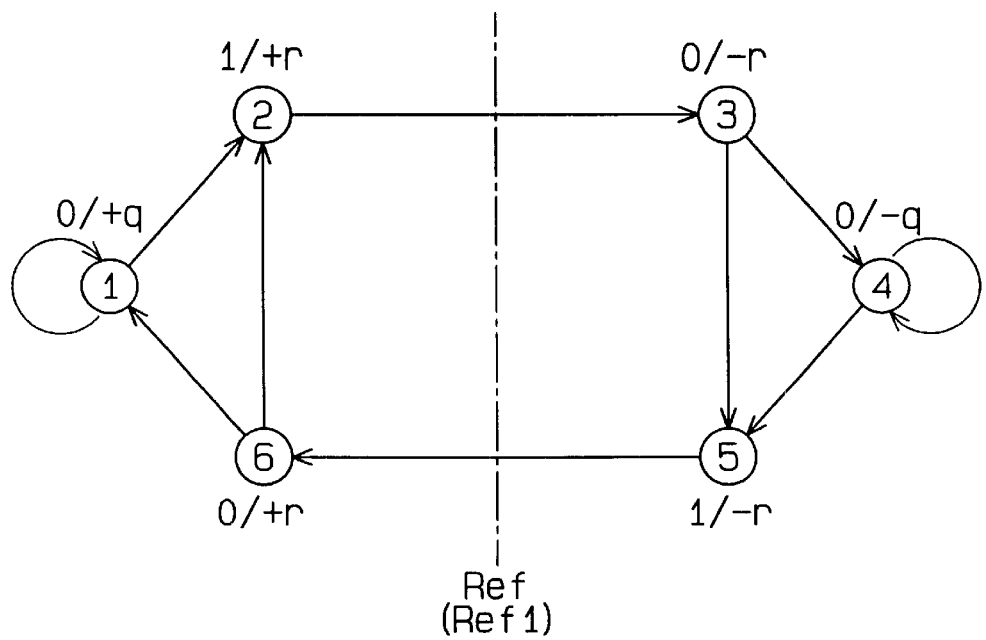
FIG. 10 is a first diagram showing the state transition of the DFE of FIG. 8.
Figure 12:
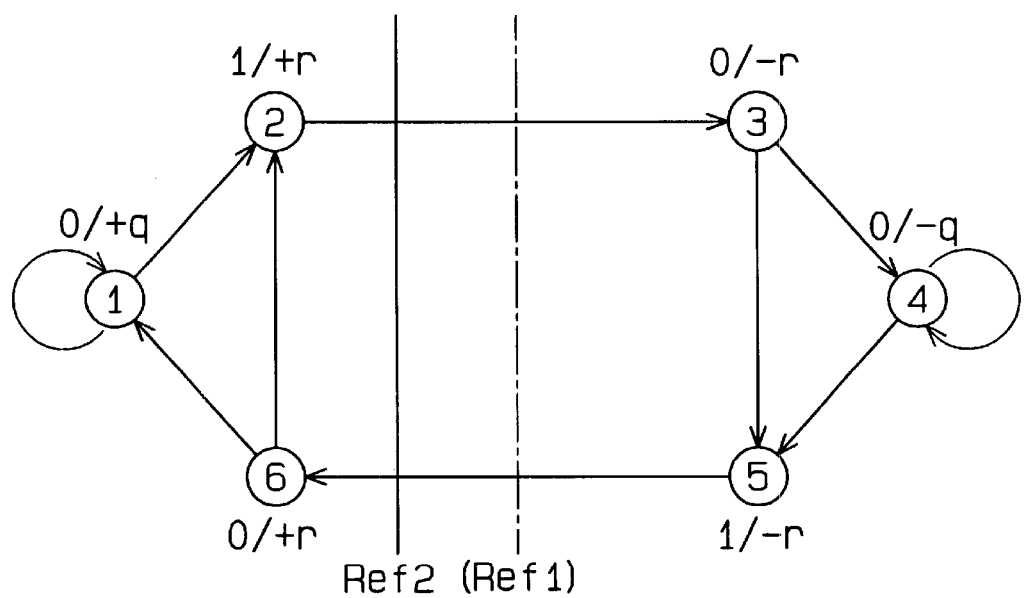
FIG. 12 is a second diagram showing the state transition of tide DFE of FIG. 8.

FIGS. 10 and 12 are diagrams showing the transition of the state of the DFE 48.

The DFE 48 changes its state from state 1 to state 6 in accordance with the value of the output signal S3 of the adder 13. "+q", "+r", "−r" and "−q" shown in FIG. 10 indicate the logic values of the output signal S3. Further, "0" and "1" are the outputs of the DFE 48 which follow the NRZI system. In other words, "0" and "1" are values obtained by the exclusive OR operation of the results of the operation "1+D" in the FB filter 65 with respect to the decision signal S4 from the decision unit 14. The operation "1+D" is the addition of the current decision result and the next decision result.

When the output signal S3 is the lowest (Ref−q or in the vicinity thereof), the DFE 48 is at state 4. At this time, the decision unit 14 outputs the decision signal S4 of "0". When the output signal S3 increases (Ref−r), the DFE 48 changes state from state 4 to state 5. At this time, the decision unit 14 outputs the decision signal S4 of "0" of state 4. Therefore, the DFE 48 outputs "0" which is the result of the EOR operation on the decision signal S4 of "0" of state 4 and the decision signal S4 of "0" of state 5.

Figure 11:
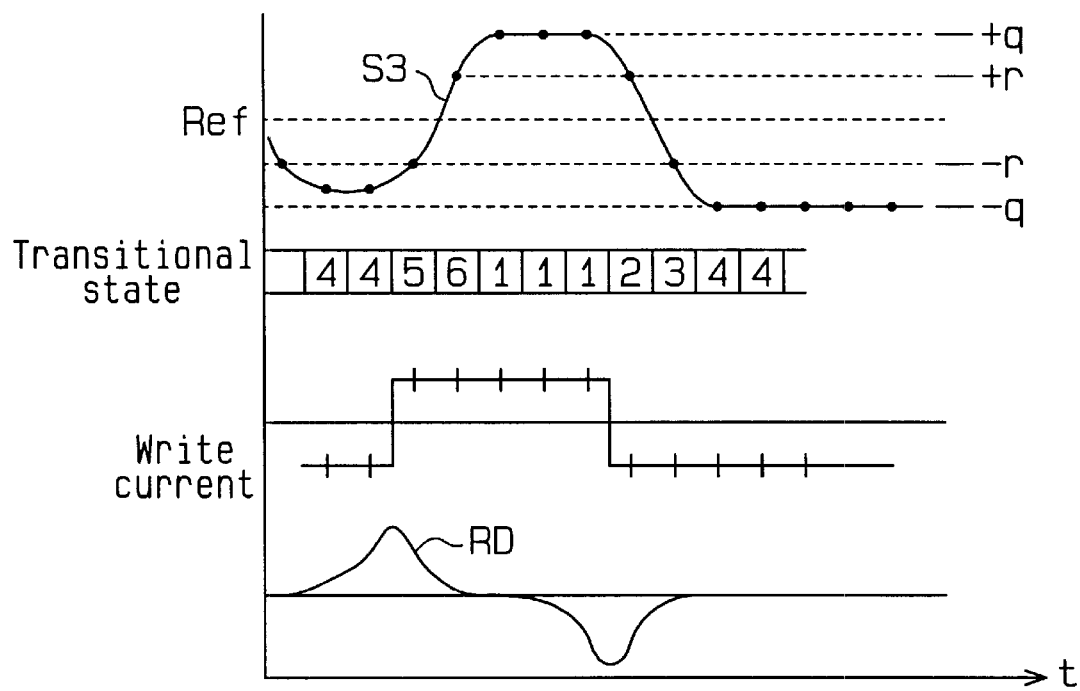
FIG. 11 is a first signal waveform diagram explaining the operation of the DFE of FIG. 8.

When the output signal S3 is higher than the reference voltage Ref (Ref+r), the DFE 48 changes its state from state 5 to state 6, as shown in FIG. 11. At this time, the decision unit 14 outputs the decision signal S4 of "1" and the DFE 48 outputs "1" or the result of the EOR operation on the decision signal S4 of "0" of state 5 and the decision signal S4 of "1" of state 6.

When the output signal S3 increases (Ref+q), the DFE 48 changes state from state 6 to state 1. At this time, the decision unit 14 outputs the decision signal S4 of "1" and the DFE 48 outputs "0" or the result of the EOR operation on the decision signal S4 of "1" of state 6 and the decision signal S4 of "1" of state 1. When the output signal S3 decreases to (Ref+r), the DFE 48 changes state from state 1 to state 2. At this time, the decision unit 14 outputs the decision signal S4 of "1" and the DFE 48 outputs "0" or the result of the EOR operation on the decision signal S4 of "1" of state 1 and the decision signal S4 of "1" of state 2.

When the output signal S3 is lower than the reference voltage Ref (Ref−r), the DFE 48 changes state from state 2 to state 3 (see FIG. 11). At this time, the decision unit 14 outputs the decision signal S4 of "0" and the DFE 48 outputs 11111 or the result of the EOR operation on the decision signal S4 of "1" of state 2 and the decision signal S4 of "0" of state 3. When the output signal S3 decreases to (Ref−q), the DFE 48 changes state from state 3 to state 4. At this time, the decision unit 14 outputs the decision signal S4 of "0" and the DFE 48 outputs "0" or the result of the EOR operation on the decision signal S4 of "1" of state 3 and the decision signal S4 of "0" of state 4.

When the output signal S3 is kept at (Ref+r), not (Ref+q) at state 6, the DFE 48 changes state from state 6 to state 2. When the output signal S3 is held at (Ref−r), not (Ref−q) at state 3, the DFE 48 changes state from state 3 to state 5.

When error transmission occurs, a change in the output signal 83 becomes smaller. In this case, transition from state 2 to state 3 is disabled and the output signal S3 is held at state 1. At this time, the decision unit 14 continuously outputs the decision signal S4 of "1". Further, transition from state 5 to state 6 is disabled and the output signal S3 is held at state 4. At this time, the decision unit 14 continuously outputs the decision signal S4 of "0".

Figure 13:
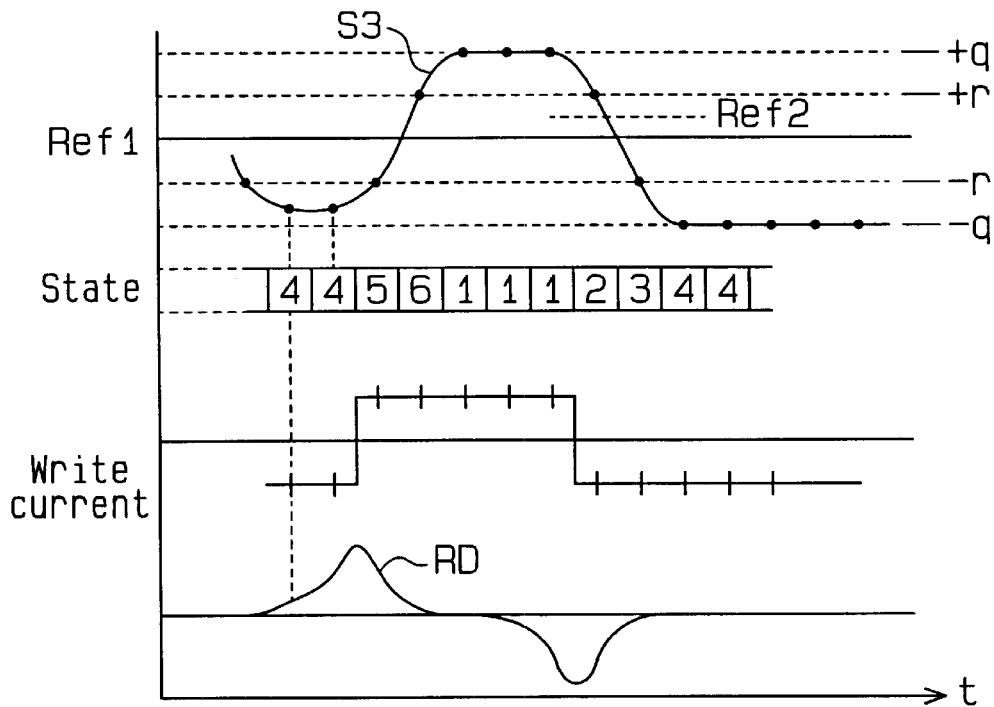
FIG. 13 is a second signal waveform diagram explaining the operation of the DFE of FIG. 8.

When the divergence monitor circuit 67 detects the continuous output of the decision signal S4 of "1", the divergence monitor circuit 67 determines that the FB loop is diverging and outputs the select signal SEL having a value of "1". The selector 68 supplies the second reference voltage Ref2 to the decision unit 14 in accordance with the select signal SEL having a value of "1". As a result, the criterion becomes higher than the normal one, and the threshold value of the state transition is shifted toward state 2 as shown in FIG. 12. Accordingly, the decision unit 14 determines that the read signal RD equal to or lower than the second reference voltage Ref2 is negative even if the read signal RD is positive, and outputs the decision signal S4 of "0". As a result, the likelihood of transition to state 3 from state 2 increases as shown in FIG. 13. This prevents divergence of the FB loop which originated from the fixing of the value of the decision signal S4. In other words, the divergence monitor circuit 67 improves the sensitivity of the decision unit 14 with respect to a negative signal.

Figure 14:
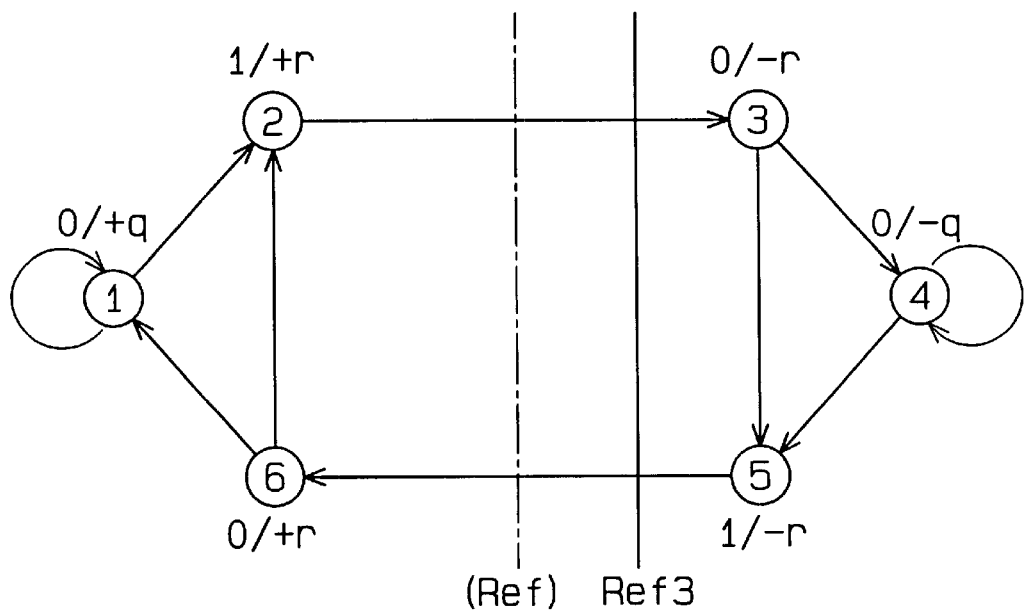
FIG. 14 is a third diagram showing the state transition of the DFE of FIG. 8.
Figure 15:
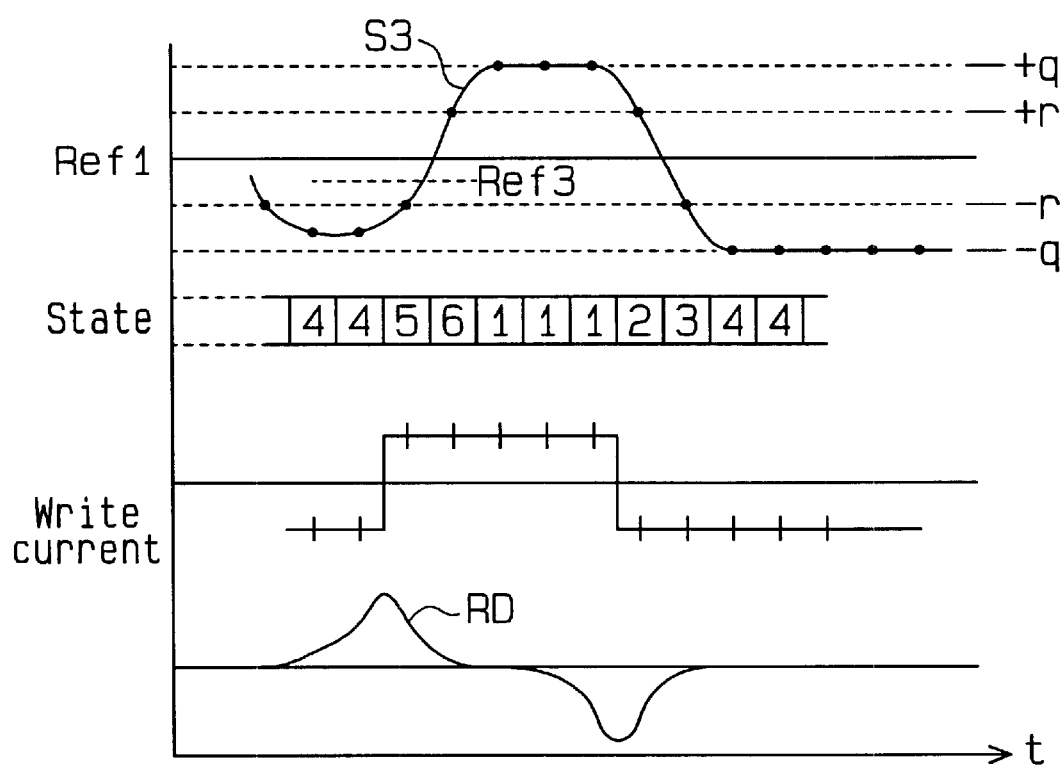
FIG. 15 is a third signal waveform diagram explaining the operation of the DFE of FIG. 8.

When transition to state 6 from state 5 is disabled, as another example, due to the occurrence of error transmission, the circulation of states 5, 3 and 4 takes place. At this time, the decision unit 14 continuously outputs the decision signal S4 of "0". When the divergence monitor circuit 67 detects the continuous output of the decision signal S4 of "0", the divergence monitor circuit 67 determines that the FB loop is diverging and outputs the select signal SEL having a value of "2". The selector 68 supplies the third reference voltage Ref3 to the decision unit 14 in accordance with the select signal SEL having a value of "2". As a result, the criterion becomes lower than the normal one, and the threshold value of the state transition is shifted toward state 5 as shown in FIG. 14. Accordingly, the decision unit 14 determines that the read signal RD equal to or greater than the third reference voltage Ref3 is positive even if the read signal RD is negative, and outputs the decision signal S4 of "1". This prevents divergence of the FB loop which originated from the fixing of the value of the decision signal S4. That is, the divergence monitor circuit 67 improves the sensitivity of the decision unit 14 with respect to a positive signal.

Second Embodiment

Figure 16:
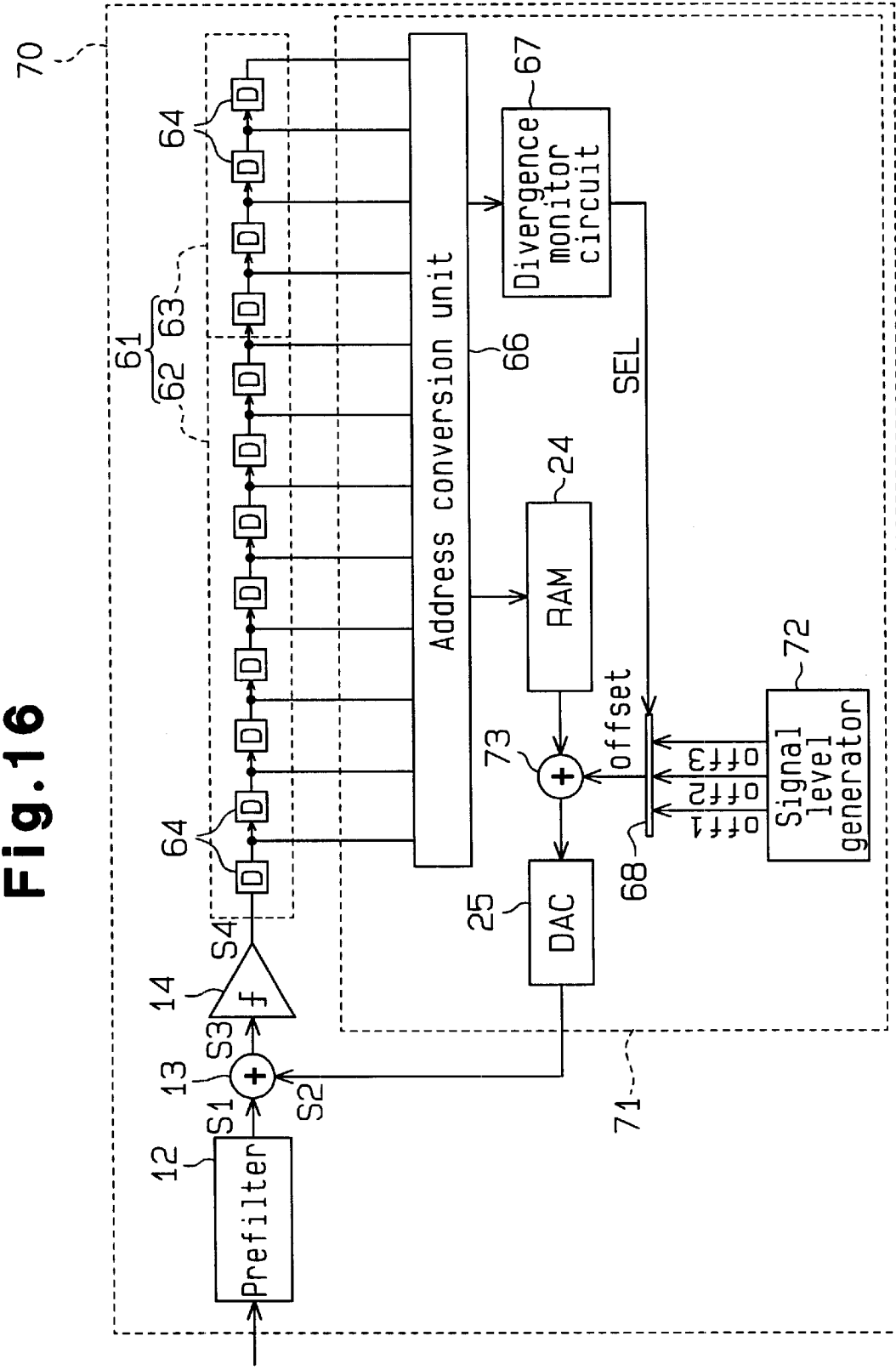
FIG. 16 is a schematic block diagram of a DFE according to a second embodiment of the present invention.

FIG. 16 is a schematic block diagram of a decision feedback equalizer (DFE) 70 according to the second embodiment of the present invention. The DFE 70 comprises a prefilter 12, an adder 13, a decision unit 14, a shift register 61, and a feedback (FB) filter 71. The FB filter 71 includes an address conversion unit 66, a memory (RAM) 24, a digital-analog converter (DAC) 25, a divergence monitor circuit 67, a selector 68, a signal level generator 72 and an adder 73.

The signal level generator 72 generates first to third offset signals Off1, Off2 and Off3 which respectively have predetermined voltages. When the decision unit 14 uses a current level as a reference level, the signal level generator 72 may generate signals having predetermined currents. In the second embodiment, the first offset signal Off1 has a value of "0". The third offset signal Off3 has a larger value than the first offset signal Off1. The second offset signal Off2 has a smaller value (negative value) than the first offset signal Off1. The second and third offset signals Off2 and Off3 preferably have the same absolute value.

The selector 68 selects the first offset signal Off1 in accordance with a select signal SEL having a value of "0". Further, the selector 68 selects the second offset signal Off2 in accordance with a select signal SEL having a value of "1" and selects the third offset signal Off3 in accordance with a select signal SEL having a value of "2".

The adder 73 receives the output signal (feedback response data) from the RAM 24 and the offset signal off from the selector 68 and adds both signals together. As a result, the feedback response data (feedback signal S2) to which one of the first to third offset signals Off1-Off3 has been added is supplied to the adder 13.

When the FB loop is not diverging, the divergence monitor circuit 67 supplies the select signal SEL of "0" to the selector 68. The selector 68 selects the first offset signal Off1, and the adder 73 adds the first offset signal Off1 of "0" to the feedback response data from the RAM 24. Therefore, the feedback response data from the RAM 24 is directly fed back to the adder 13.

When the FB loop is fixed to "1", the divergence monitor circuit 67 supplies the select signal SEL of "1" to the selector 68. The selector 68 selects the second offset signal Off2, and the adder 73 adds the second offset signal Off2 having a negative value to the feedback response data from the RAM 24. Therefore, the feedback response data whose value is smaller by the value of the second offset signal Off2 is fed back to the adder 13. That is, the analog signal of the feedback response data is offset in the negative direction. This offset is equivalent to increasing the reference voltage of the decision unit 14 in the first embodiment. This facilitates the output of the decision signal S4 of "0" from the decision unit 14. In other words, the divergence monitor circuit 67 improves the sensitivity of the decision unit 14 with respect to a negative signal. This prevents divergence of the FB loop which originated from the fixing of the value of the decision signal S4.

When the FB loop is fixed to "0", the divergence monitor circuit 67 supplies the select signal SEL of "2" to the selector 68. The selector 68 selects the third offset signal Off3, and the adder 73 adds the third offset signal Off3 having a positive value to the feedback response data from the RAM 24. Therefore, the feedback response data whose value is greater by the value of the third offset signal Off3 is fed back to the adder 13. That is, the analog signal of the feedback response data is offset in the positive direction. This offset is equivalent to decreasing the reference voltage of the decision unit 14 in the first embodiment. This facilitates the output of the decision signal S4 of "1" from the decision unit 14. In other words, the divergence monitor circuit 67 improves the sensitivity of the decision unit 14 with respect to a positive signal. This prevents divergence of the FB loop which originated from the fixing of the value of the decision signal S4.

In the second embodiment, as the feedback response data is offset using the adder 73, the structure for changing the criterion of the decision unit is simple.

In the second embodiment, the DAC 25 receives the monitoring result from the divergence monitor circuit 67 and supplies feedback response data having a given value to the adder 13 based on the monitoring result. Such supply of the feedback response data can reduce errors included in the decision result and restores the divergent state of the FB loop to the normal state earlier.

In the second embodiment, when the decision unit 14 determines that erroneous data is locally present in sampling data stored in the shift register 61, the divergence monitor circuit 67 corrects the erroneous data according to the transfer code rule. In this case, feedback response data corresponding to the sampling data corrected by the divergence monitor circuit 67 is read from an associated area in the RAM 24. The read feedback response data is supplied to the DAC 25. This correction of errors locally present in sampling data prevents divergence of the FB loop.

Third Embodiment

Figure 17:
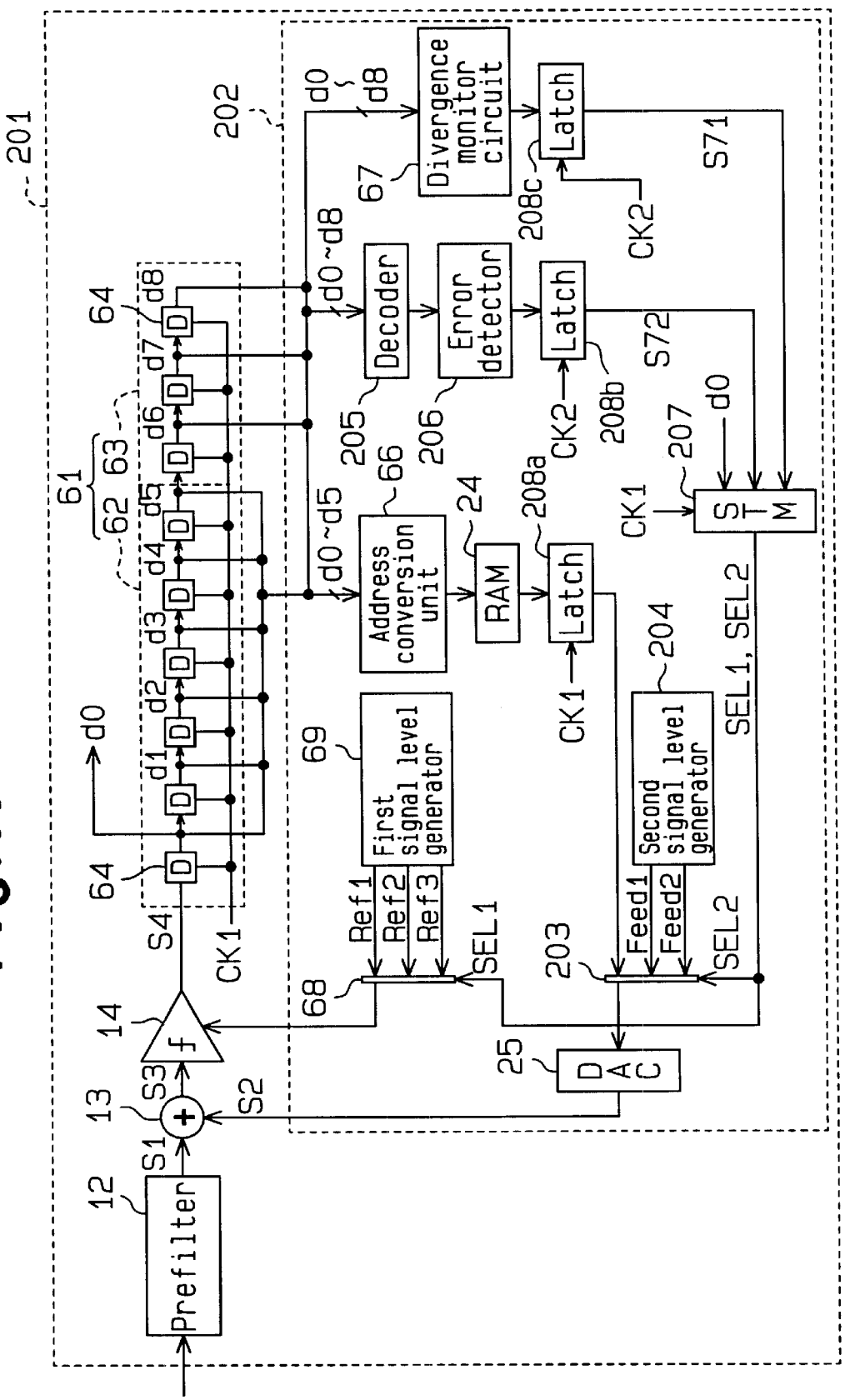
FIG. 17 is a schematic block diagram of a DFE according to a third embodiment of the present invention.

FIG. 17 is a schematic block diagram of a decision feedback equalizer (DFE) 201 according to the third embodiment of the present invention. The DFE 201 comprises a prefilter 12, an adder 13, a decision unit 14, a shift register 61, and a feedback (FB) filter 202.

The shift register 61 has a first register section 62 including six registers 64 corresponding to the number of taps of the FB filter 202 and a second register section 63 including three registers 64. Therefore, the shift register 61 stores 9-bits of sampled digital data d0 to d8.

The FB filter 202 includes a memory (RAM) 24, a digital-analog converter (DAC) 25, an address conversion unit 66, a divergence monitor circuit 67, first and second selectors 68 and 203, first and second signal level generators (first and second generators) 69 and 204, a decoder 205, an error detector 206, a state machine (STM) 207 and latches 208a to 208c.

The address conversion unit 66 receives 6-bit data d0–d5 from the first register section 62 and converts the 6-bit data to an address signal. Feedback response data is read from one area in the RAM 24 which has been selected in accordance with the address signal, and is supplied to the DAC 25 via the latch 208a.

The divergence monitor circuit 67 receives 9-bit data d0–d8 stored in the shift register 61, and determines if the FB loop is diverging, by checking if the 9-bit data d0–d8 contains a sequence of bits which-does not match with the transfer code rule. The divergence monitor circuit 67 supplies a signal S71 indicative of the decision result to the STM 207 via the latch 208c. When the FB loop is not diverging, the signal S71 having a value of "0" is output. When the FB loop is diverging and the decision signal S4 has a value "1", the signal S71 having a value of "1" is output. When the FB loop is diverging and the decision signal S4 has a value "0", the signal S71 having a value of "2" is output.

Figure 19:
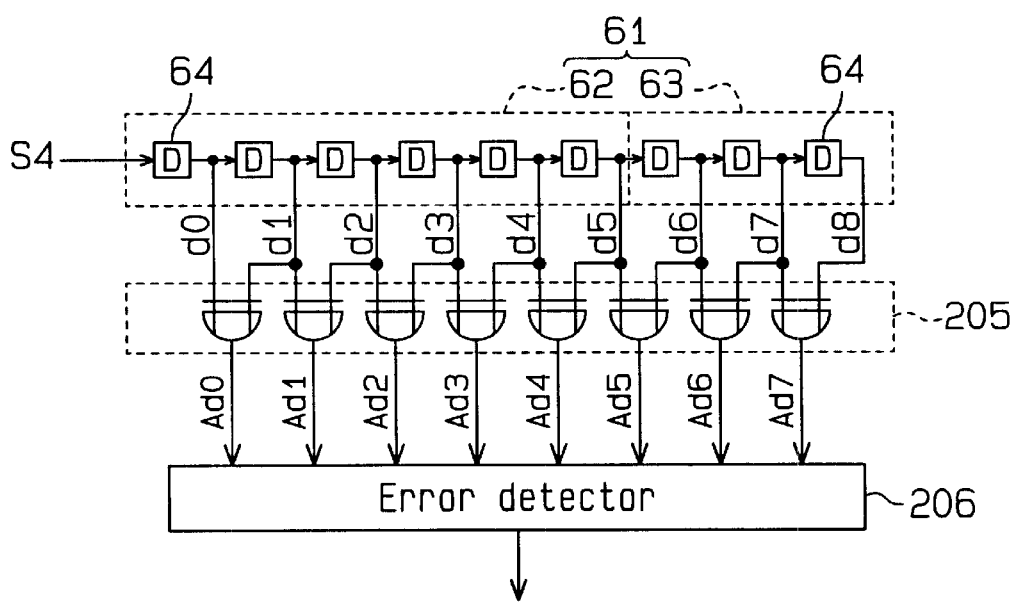
FIG. 19 is a circuit diagram of a decoder of the DFE of FIG. 17.

The decoder 205 preferably includes eight exclusive OR (EOR) gates 205a as shown in FIG. 19, and performs an operation "1+D" on the 9-bit data d0–d8 stored in the shift register 61. Each EOR gate 205a receives consecutive 2-bit data, performs an exclusive OR operation on the 2-bit data and sends the operation result (associated one of signals Ad0 to Ad7) to the error detector 206. The error detector 206 decodes the input signals Ad0–Ad7 in accordance with the RLL (run-length limited) code, specifically RLL (1,7) code, as shown in FIGS. 20 to 23. The error detector 206 further detects if there is a local error in the input signals Ad0–Ad7 or error transmission, and supplies a signal S72 representing the detection result to the STM 207 via the latch 208b. When a local error is detected, for example, the signal S72 having a value of "2" ("10" in the binary notation) is output. When error transmission is detected, the signal S72 having a value of "3" ("11" in the binary notation) is output.

A local error occurs when two or more consecutive "1's" are included in the signals Ad0–Ad7. That is, since the decision unit 14 outputs the decision signal S4 of "1" when the level of the input signal S3 exceeds the reference level Ref, the decision signal S4 of "1" should not be output consecutively when the operation of the DFE 201 is normal.

Error transmission occurs when the signals Ad0–Ad7 are all "0" or "1". That is, as the data d0–d8 in the shift register 61 are any one of "101" to "100000001", there are no data d0–d8 which are all "0" or "1" when the operation of the DFE 201 is normal.

Figure 18:
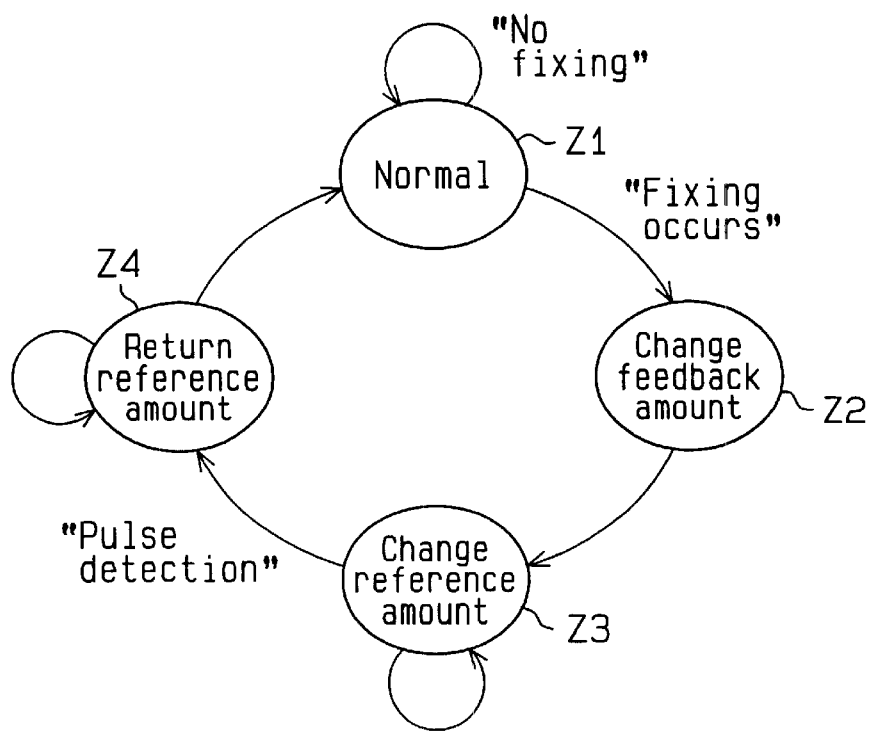
FIG. 18 is a diagram showing the state transition of a state machine of the DFE of FIG. 17.

The STM 207 receives the signal d0 from the shift register 61 and the signals S71 and S72, and alters the self operational state based on those signals. The signal d0 is the output signal of the DFE 201. As shown in FIG. 18, the STM 207 can take any one of states Z1 to Z4. When the FB loop is not fixed and the DFE 201 is operating normally, the STM 207 has state Z1 and supplies the first and second select signals SEL1 and SEL2 of "0" to the first and second selectors 68 and 203, respectively.

Returning to FIG. 17, the first generator 69 generates first to third reference voltages Ref1, Ref2 and Ref3. The first reference voltage Ref1 is an intermediate voltage ((maximum voltage+minimum voltage)/2) of the input signal of the decision unit 14. The second reference voltage Ref2 is higher than the first reference voltage Ref1, and the third reference voltage Ref3 is lower than the first reference voltage Ref1. In accordance with the first select signal SEL1 having a value "0", the first selector 68 selects the first reference voltage Ref1. The first selector 68 selects the second reference voltage Ref2 in accordance with the first select signal SELL having a value "1", and selects the third reference voltage Ref3 in accordance with the first select signal SEL1 having a value "2".

The second generator 204 generates first and second feedback (FB) signals Feed1 and Feed2. The first FB signal Feed1 has a higher voltage (Ref1+r) than the first reference voltage Ref1, and the second FB signal Feed2 has a lower voltage (Ref1−r) than the first reference voltage Ref1 (Feed1>Ref1>Feed2). The value "r" is a logic value the signal S3 can take, as shown in FIG. 10.

The second selector 203 selects feedback response data from the RAM 24 in accordance with the second select signal SEL2 having a value of "0". The second selector 203 selects the first FB signal Feed1 in accordance with the second select signal SEL2 having a value of "1" and selects the second FB signal Feed2 in accordance with the second select signal SEL2 having a value of "2". The DAC 25 converts the select signal from the second selector 203 to an analog signal (feedback response data) S2, and sends the analog signal S2 to the adder 13.

More specifically, when the FB loop is not diverging, the STM 207 outputs the second select signal SEL2 having a value of "0" so that the feedback response data from the RAM 24 is supplied to the adder 13.

When the decision signal S4 is fixed to a certain value, the STM 207 changes state to state Z2 from state Z1 in response to the signal S71 from the divergence monitor circuit 67, and sends the signal S71 as the second select signal SEL2 to the second selector 203. At state Z2, the STM 207 operates to change the feedback amount of the FB loop.

When the decision signal S4 is set to "1", for example, the second select signal SEL2 having a value of "1" is output, causing the second selector 203 to select the first FB signal Feed1. As a result, the first FB signal Feed1 is sent as feedback response data to the adder 13. The level of this feedback response data is smaller than the level of the feedback response data that is supplied to the adder 13 via the DMC 25 from the RAM 24 when the decision signal S4 is set to "1". Thus, the amount of feedback is smaller, forcing the DFE 201 to change state to state 2 from state 1 (see FIG. 10). This is equivalent to increasing the reference voltage of the decision unit 14 in the first embodiment and offsetting the feedback amount in the negative direction in the second embodiment. Consequently, the sensitivity of the decision unit 14 with respect to a negative signal gets higher. Accordingly, the DFE 201 easily goes to state 3 and the decision unit 14 outputs the decision signal S4 of "0".

When the decision signal S4 is set to "0", the second select signal SEL2 having a value of "2" is output, causing the second selector 203 to select the second FB signal Feed2. As a result, the second FB signal Feed2 is sent as feedback response data to the adder 13. The level of this feedback response data is greater than the level of the feedback response data that is supplied to the adder 13 via the DMC 25 from the RAM 24 when the decision signal S4 is set to "0". Thus, the amount of feedback becomes larger, forcibly causing transition of state of the DFE 201 to state 5 from state 4. This is equivalent to decreasing the reference voltage of the decision unit 14 in the first embodiment and offsetting the feedback amount in the positive direction. Consequently, the sensitivity of the decision unit 14 with respect to a positive signal gets higher. Accordingly, the DFE 201 easily goes to state 6 and the decision unit 14 outputs the decision signal S4 of "1".

After completing alteration of the feedback amount, the STM 207 goes to state Z3 from state Z2. At state Z3, the STM 207 changes the criterion of the decision unit 14. When the decision signal S4 is fixed, the STM 207 sends the signal S71 as the first select signal SEL1 to the first selector 68.

Figure 24:
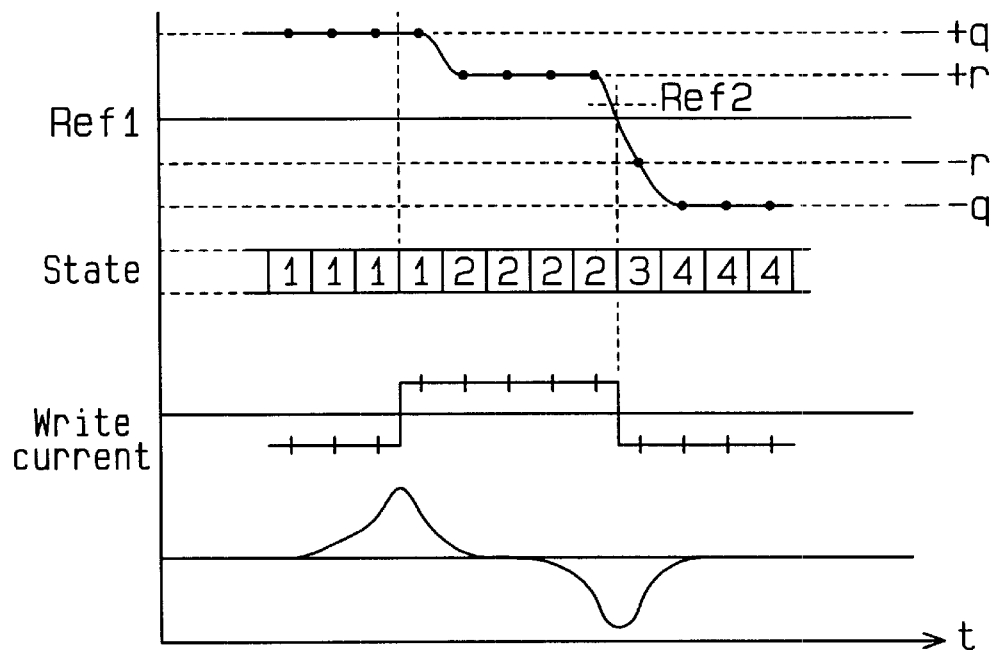
FIG. 24 is a first signal waveform diagram explaining the operation of the DFE of FIG. 17.

When the decision signal S4 is set to "1", for example, the first select signal SEL1 having a value of "1" is output, causing the first selector 68 to supply the second reference voltage Ref 2 to the decision unit 14. As shown in FIG. 24, the level of the second reference voltage Ref2 is higher than that of the first reference voltage Ref1. Therefore, the criterion of the decision unit 14 becomes higher, improving the sensitivity of the decision unit 14 with respect to a negative signal. Accordingly, the DFE 201 easily goes to state 3 and the decision unit 14 outputs the decision signal S4 of "0".

Figure 25:
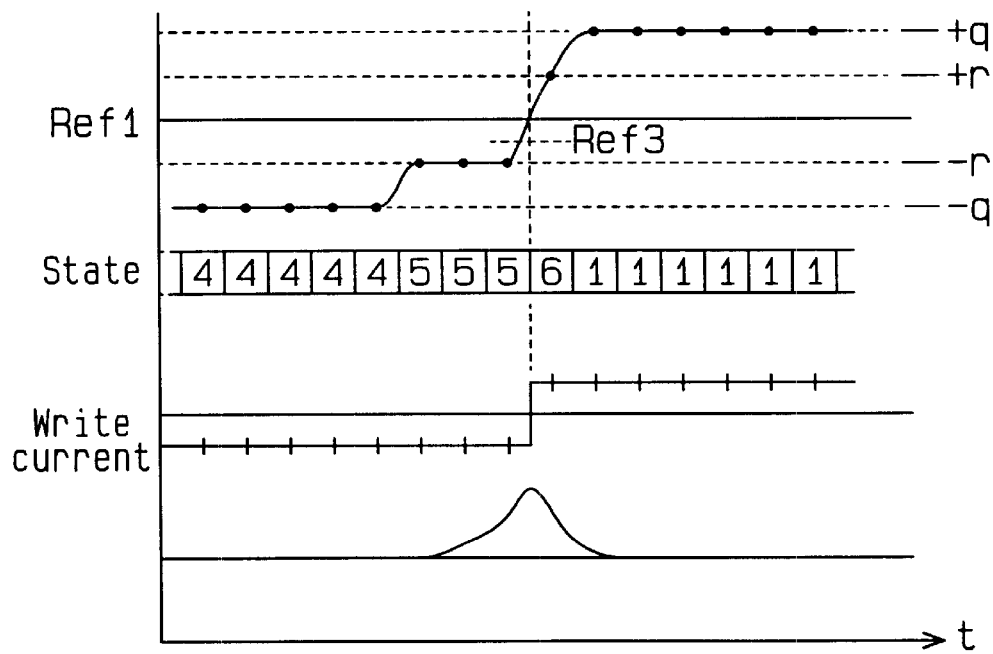
FIG. 25 is a second signal waveform diagram explaining the operation of the DFE of FIG. 17.

When the decision signal S4 is fixed to "0", the first select signal SEL1 having a value of "2" is output. The first selector 268 supplies the third reference voltage Ref 3 to the decision unit 14 in accordance with the first select signal SEL1 of "2". As shown in FIG. 25, the level of the third reference voltage Ref3 is lower than that of the first reference voltage Ref1. Therefore, the criterion of the decision unit 14 gets lower, improving the sensitivity of the decision unit 14 with respect to a positive signal. This causes the DFE 201 to easily go to state 6, allowing the decision unit 14 to output the decision signal S4 of "1".

After completing alteration of the criterion, the STM 207 remains at state Z3. When detecting the pulse of the signal d0 from the shift register 61, the STM 207 changes to state Z4 from state Z3. The pulse detection indicates that the decision signal S4 has changed, such as from 0 to 1 or from 1 to 0. At state Z4, therefore, the STM 207 returns to the original criterion and supplies the first select signal SEL1 of "0" to the first selector 68. Further, the STM 207 supplies the second select signal SEL2 of "0" to the second selector 203. As a result, the feedback response data from the RAM 24 is supplied to the adder 13. After a predetermined time (e.g., 10 ms) passes at state Z4, the STM 207 goes to state Z1 from state Z4.

As apparent from the above, the DFE 201 according to the third embodiment alters the criterion and the feedback amount in accordance with value of the decision signal S4, so that the DFE 201 quickly returns to the normal state.

Further, the error detector 206 detects a local error contained in the sampling data in the shift register 61. The DFE 201 therefore changes the criterion and feedback amount with respect to that error, and returns to the normal state.

In the third embodiment, the STM 207 may operate to change the criterion at state Z2 and to change the feedback amount at state Z3.

Fourth Embodiment

Figure 26:
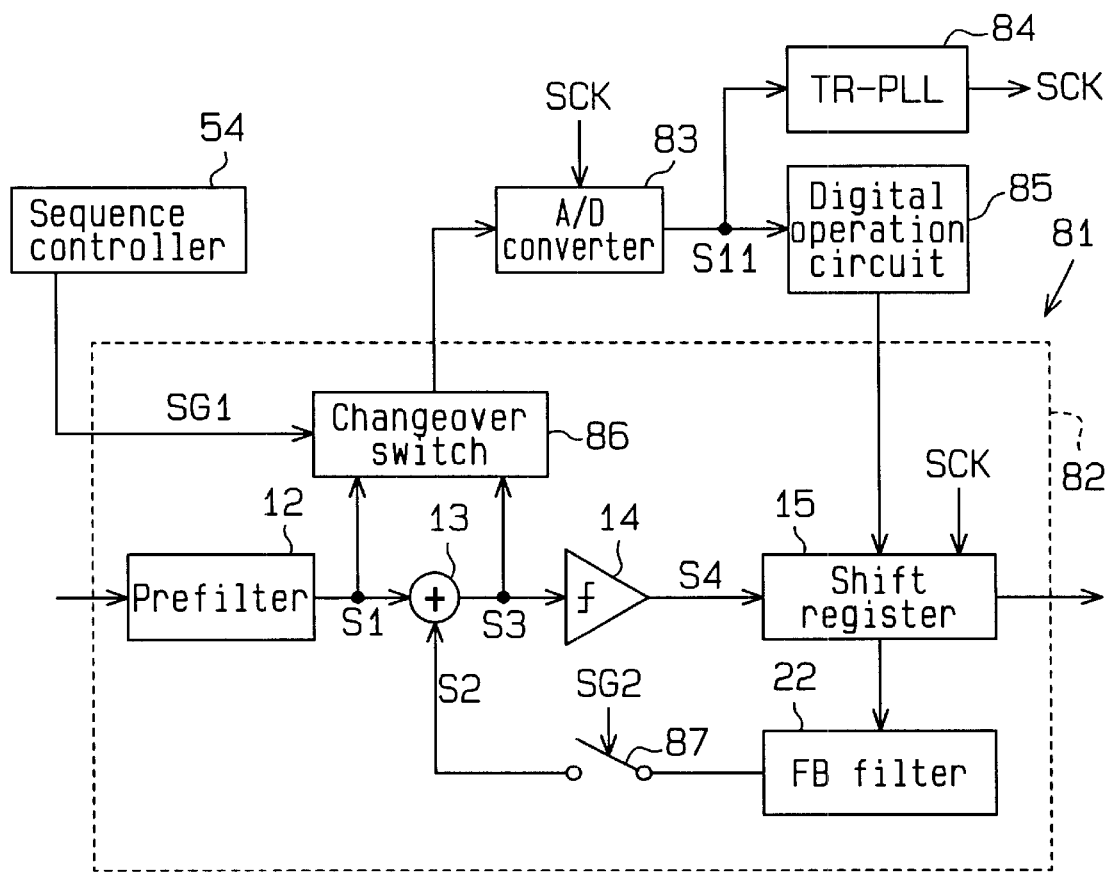
FIG. 26 is a schematic block diagram of a signal processor according to a fourth embodiment of the present invention.

FIG. 26 is a partial schematic block diagram of a signal processor 81 according to the fourth embodiment of the present invention. The signal processor 81 comprises a DFE 82, an A/D converter (ADC) 83, a timing recovery PLL circuit (TR-PLL) 84 and a digital operation circuit 85. The ADC 83 and the TR-PLL 84 form the timing clock reproduction PLL circuit 49 shown in FIG. 7. The DFE 82 includes a changeover switch (first switch) 86 and an open/close switch (second switch) 87.

The first switch 86 supplies the output signal S1 of the prefilter 12 to the ADC 83 in accordance with a control signal SG1 having an H level from the sequence controller 54 in FIG. 7, and supplies the output signal S3 of the adder 13 to the ADC 83 in accordance with the control signal SG1 having an L level.

The second switch 87, connected between the feedback (FB) filter 22 and the adder 13, is opened (OFF) in response to a control signal SG2 having an H level from the sequence controller 54, and is closed (ON) in response to the control signal SG2 having an L level. The open/close action of the second switch 87 opens or closes the FB loop of the DFE 82. The control signals SG1 and SG2 are produced by the sequence controller 54 based on information included in the read signal RD read from the magnetic disk 33.

When a read operation is initiated, the first and second control signals SG1 and SG2 of H levels are respectively supplied to the first and second switches 86 and 87. As a result, the output signal S1 of the prefilter 12 is supplied via the first switch 86 to the ADC 83, thus opening the FB loop.

The ADC 83 performs A/D conversion of the output signal S1, and supplies a digital signal S11 to the digital operation circuit 85. The operation circuit 85 receives the digital signal S11 from the ADC 83, generates the initial value of the FB filter 22 and detects preamble data. When detecting preamble data, the digital operation circuit 85 stores the initial value in a shift register 15. The FB filter 22 produces feedback response data using the initial value stored in the shift register 15. Accordingly, the content of the shift register 15 is preset by the initial value generated by the digital operation circuit 85.

When further detecting preamble data, the digital operation circuit 85 supplies the detection signal to the sequence controller 54. In response to the detection signal, the sequence controller 54 supplies the control signals SG1 and SG2 having L levels to the first and second switches 86 and 87. Consequently, the output signal S3 of the adder 13 is supplied via the first switch 86 to the ADC 83 and the FB loop is closed.

The ADC 83 implements A/D conversion of the output signal S3 of the adder 13, and supplies the resultant digital signal to the TR-PLL 84. The TR-PLL 84 receives the digital signal from the ADC 83, and generates a reference clock signal SCK synchronous with the preamble signal. The FB filter 22 supplies feedback response data to the adder 13 via the second switch 87 using the initial value stored in the shift register 15. In this way, feedback starts from the feedback response data, which was produced using the initial value.

In the fourth embodiment, the FB loop is opened when a read operation starts, and the initial value generated by the digital operation circuit 85 is stored in the shift register 15. Then, the FB loop is closed, and starts from the feedback response data that was produced using the initial value. At the beginning of a read operation, therefore, feedback using data sampled in accordance with the reference clock signal SCK which is not sufficiently synchronized with the read signal RD is avoided, thus preventing divergence of the FB loop. Further, presetting the initial value of the FB filter 22 in the shift register 15 shortens the time needed for the stable operation of the FB loop.

Figure 27:
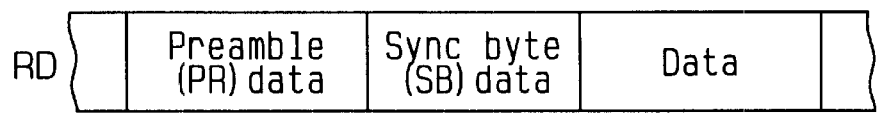
FIG. 27 is a diagram illustrating the data format of a read signal.

As shown in FIG. 27, at the beginning of the read operation, preamble data and a sync byte, which are a period pattern, are read before the data. However, the TR-PLL 84 may not be able to generate the reference clock signal SCK which is synchronous with the read signal RD of the preamble data. In this case, the sync byte (SB) and the data, which are to be read following the preamble data may not be sampled correctly. That is, the shift register 15 may not correctly sample the decision signal S4 in accordance with the reference clock signal SCK. Consequently, erroneous data will be stored in the shift register 15. This erroneous data will cause divergence of the FB loop. According to the fourth embodiment, as described above, feedback starts using the initial value at the beginning of the read operation, thus preventing divergence of the FB loop.

Fifth Embodiment

Figure 28:
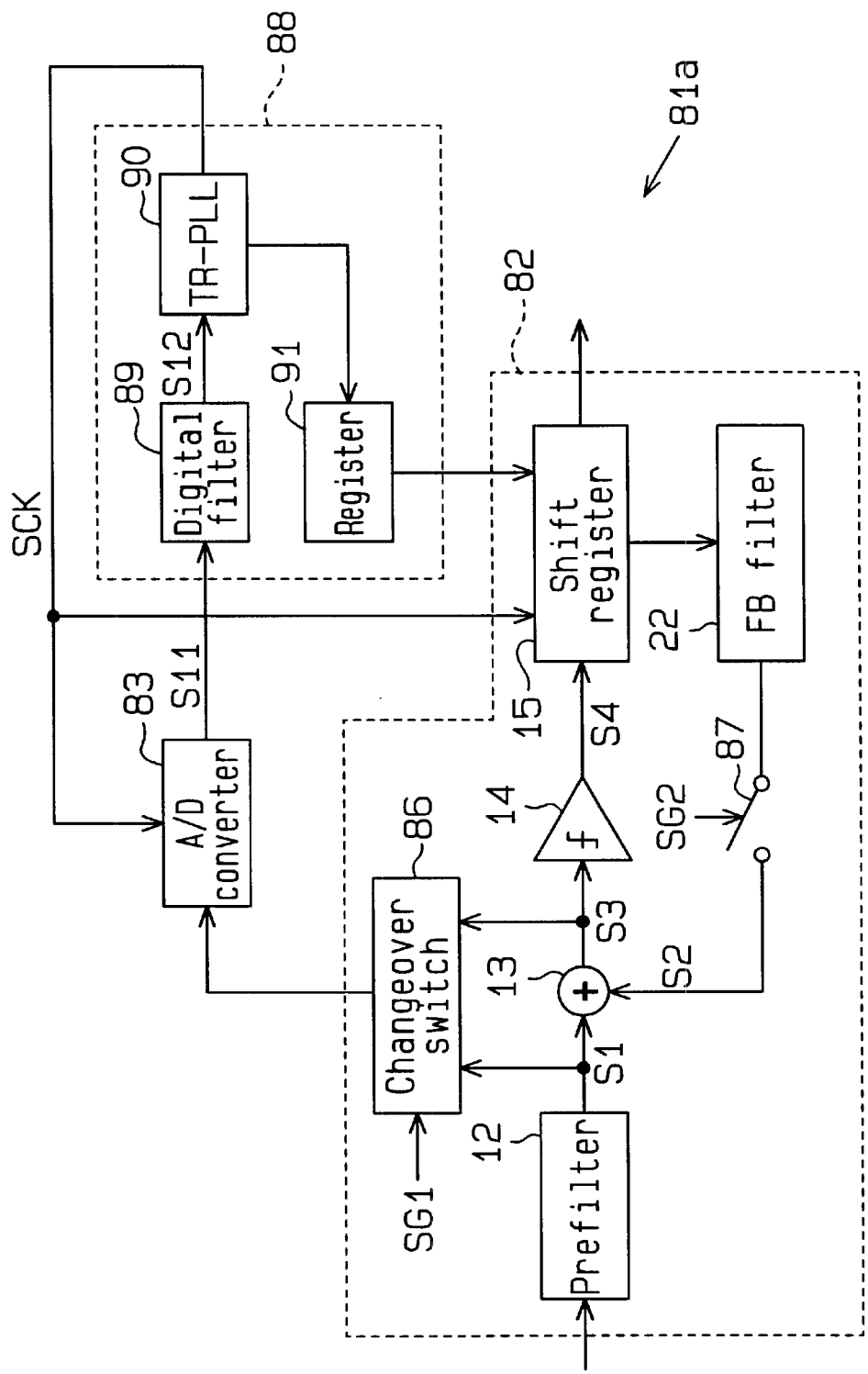
FIG. 28 is a schematic block diagram of a signal processor according to a fifth embodiment of the present invention.

FIG. 28 is a partial schematic block diagram of a signal processor 81a according to the fifth embodiment of the present invention. The signal processor 81a has a DFE 82, an ADC 83, and a digital operation circuit 88. The operation circuit 88 includes a digital filter 89, a timing recovery PLL circuit (TR-PLL) 90 and a register 91.

The digital filter 89 executes the optimal waveform equalization on the preamble signal from the ADC 83, and sends a filtered signal to the TR-PLL 90. The TR-PLL 90 receives the filtered signal from the digital filter 89 and generates a reference clock signal SCK whose frequency and phase substantially match those of the filtered signal (or preamble signal).

A period pattern (e.g., "111000") corresponding to the preamble has been stored in advance in a register (not shown) in the TR-PLL 90. When the pattern of the filtered signal S12 is "111" or "000", the TR-PLL 90 detects the preamble. That is, the preamble of a 6T pattern has "111" and "000" alternately and cyclically appearing.

After detection of the preamble, the TR-PLL 90 executes frequency matching. After frequency matching is completed, phase matching is carried out. Accordingly, the reference clock signal SCK whose frequency and phase substantially match those of the preamble is produced. This reference clock signal SCK is supplied to the ADC 83 and the shift register 15. The TR-PLL 90 supplies the register 91 with a signal representing the end of frequency and phase matching of the reference clock signal SCK.

Stored in the register 91 is the initial value of the FB filter 22 which was previously computed based on the preamble. In response to the end signal from the TR-PLL 90, the initial value stored in the register 91 is transferred to the shift register 15.

In the fifth embodiment, the shift register 15 is preset using the initial value of the FB filter 22, stored in advance in the register 91. This eliminates the need for generating the initial value through an arithmetic operation. As the optimal waveform equalization is performed on the preamble signal using the digital filter 89, the reference clock signal SCK whose frequency and phase substantially match those of the preamble is easily produced.

Sixth Embodiment

Figure 29:
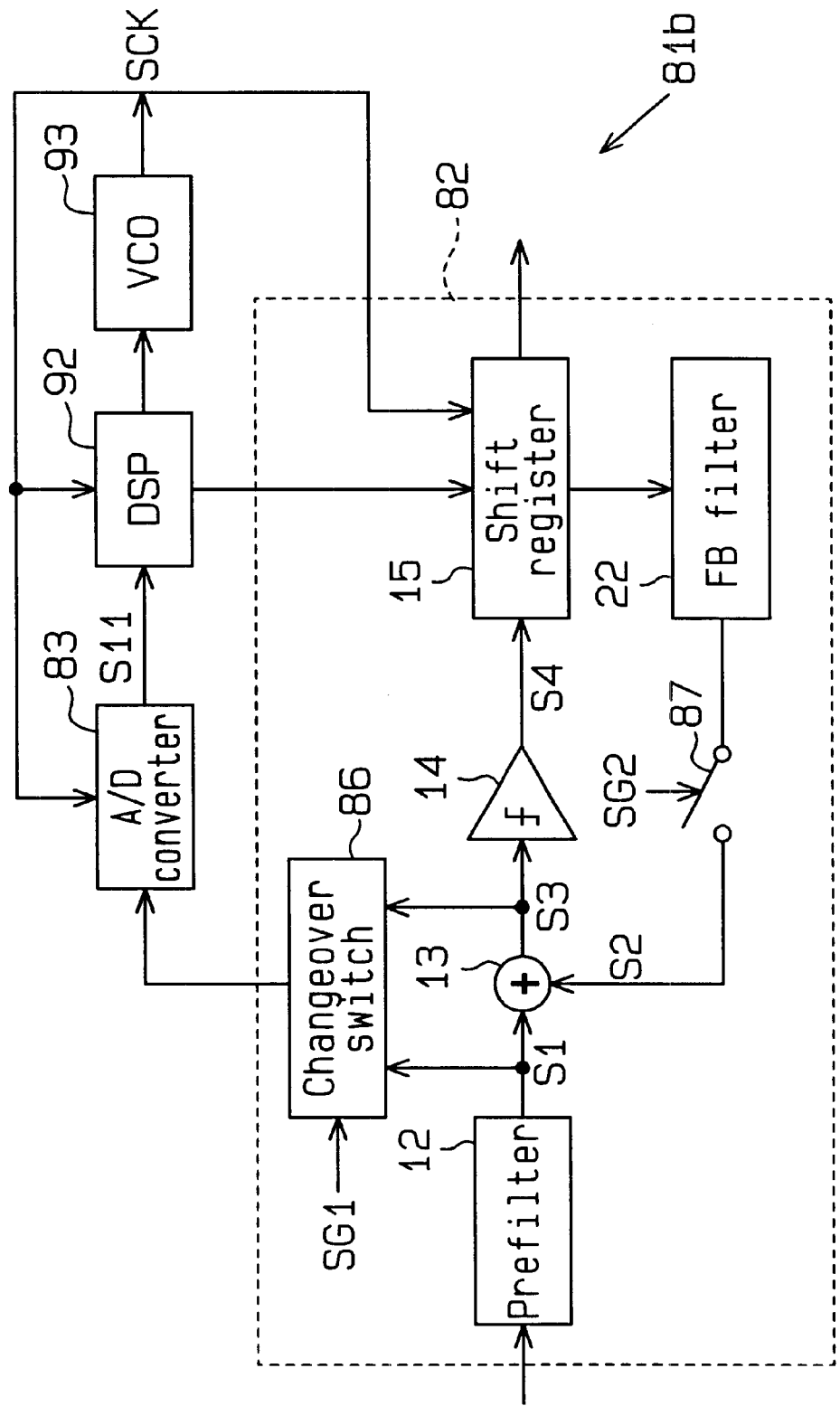
FIG. 29 is a schematic block diagram of a signal processor according to a sixth embodiment of the present invention.

FIG. 29 is a partial schematic block diagram of a signal processor 81b according to the sixth embodiment of the present invention. The signal processor 81b includes a DFE 82, an ADC 83, a digital signal processor (DSP) 92, and a voltage controlled oscillator (VCO) 93.

The DSP 92 performs the optimal waveform equalization on the preamble signal from the ADC 83, and detects a frequency difference and a phase difference between a filtered signal and the reference clock signal SCK output from the VCO 93. The VCO 93 receives detection signals on the frequency difference and phase difference from the DSP 92, and generates the reference clock signal SCK whose frequency and phase correspond to the detection signals.

The DSP 92 also generates the initial value of a FB filter 22, and stores the initial value in a shift register in the DFE 82. The FB filter 22 produces feedback response data of the FB loop which uses the initial value stored in the shift register 15.

In the sixth embodiment, the use of the DSP 92, which presets the shift register 15 and detects the frequency difference and phase difference that are necessary to generate the reference clock signal SCK, simplifies the signal processor 81b and reduces the area of the signal processor 81b.

Figure 30:
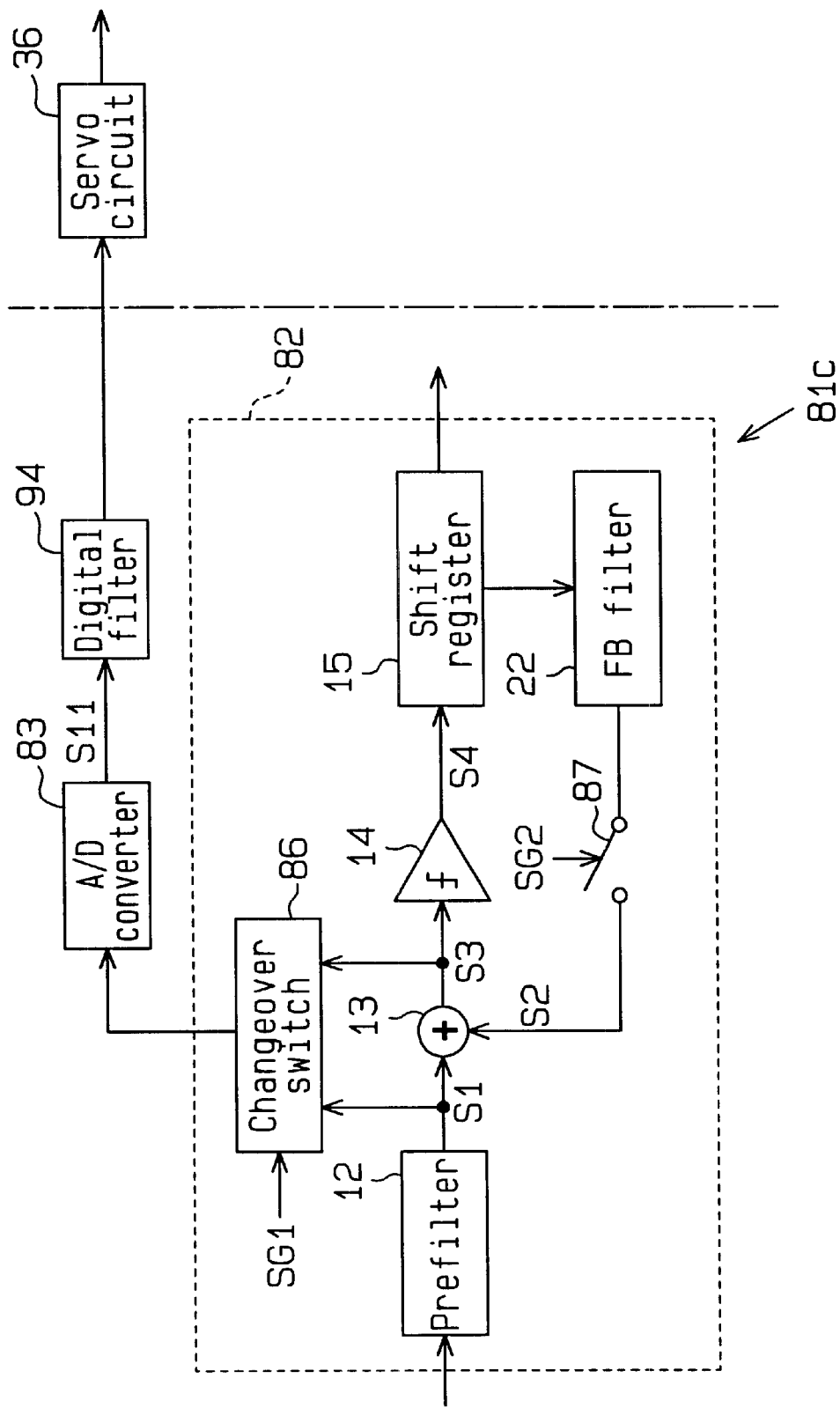
FIG. 30 is a schematic block diagram showing a signal processor according to a first modification of the fourth to sixth embodiments of the present invention.

FIG. 30 is a partial schematic block diagram showing a signal processor according to a modification of the fourth to sixth embodiments. A signal processor 81c performs the optimal waveform equalization on servo information, which is included in the output signal S11 of the ADC 83, and supplies the filtered signal to the servo circuit 36. The servo circuit 36 controls the second motor M2 in accordance with the filtered signal (servo information), permitting the ON-tracking of the head unit 34. It is therefore possible to mount both the signal processor 81c and the servo circuit 36 on a single semiconductor substrate. This simplifies the hard disk device 31.

Figure 31:
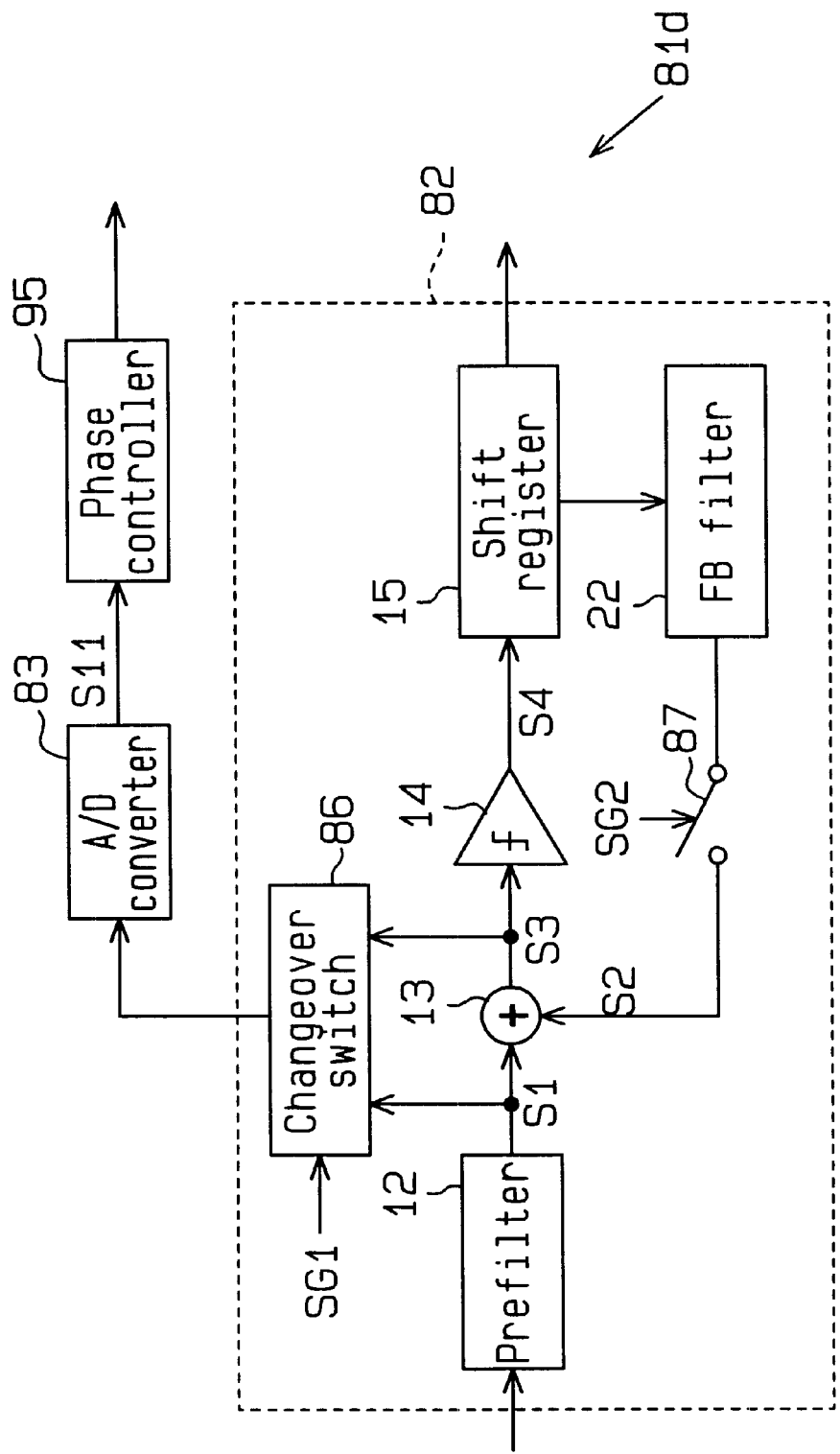
FIG. 31 is a schematic block diagram showing a signal processor according to a second modification of the fourth to sixth embodiments of the present invention.

The present invention may be embodied into a signal processor 81d having a phase controller 95, as shown in FIG. 31. In this case, phase control based on digital processing is possible.

Seventh Embodiment

Figure 32:
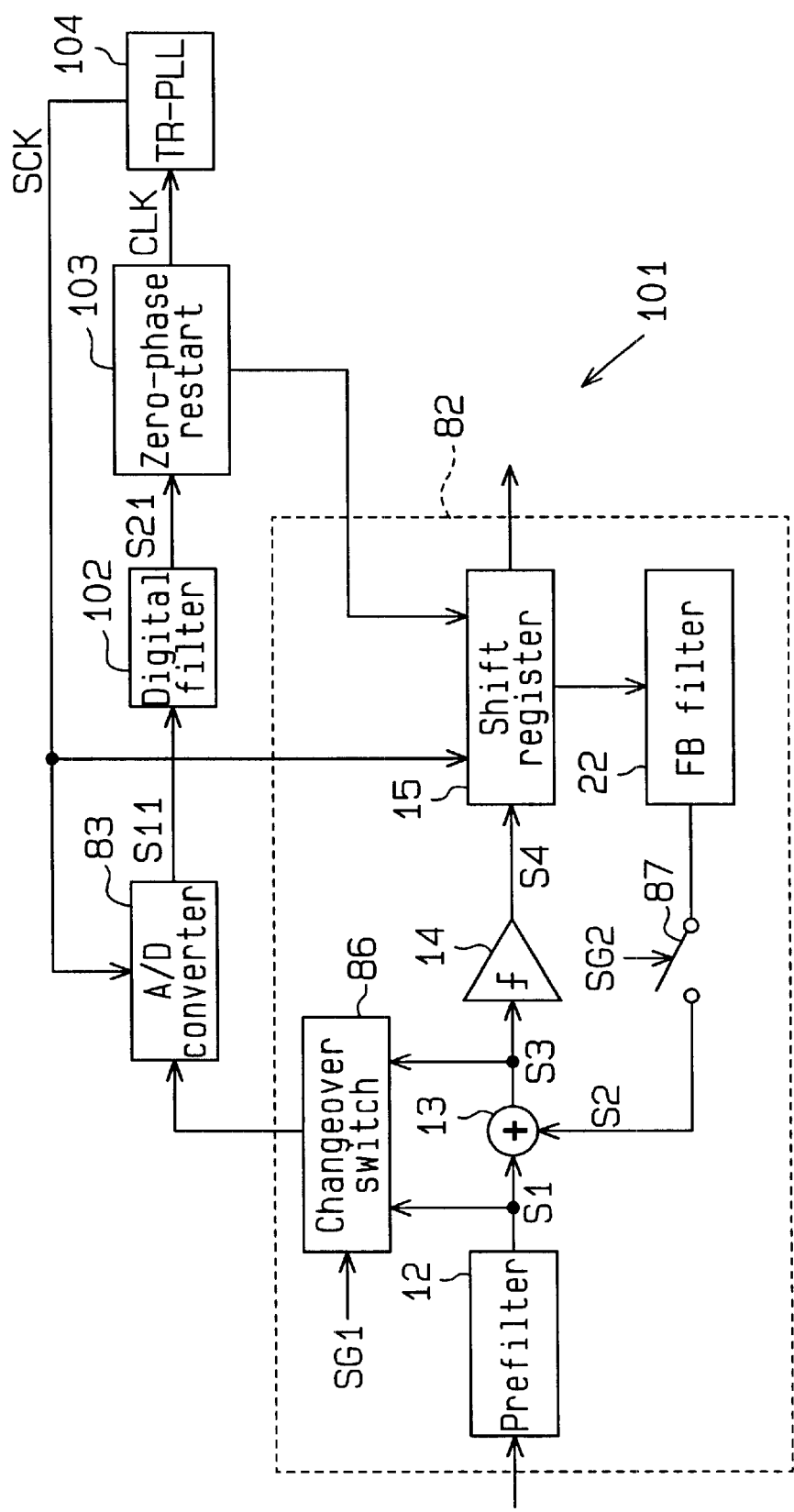
FIG. 32 is a schematic block diagram of a signal processor according to a seventh embodiment of the present invention.

FIG. 32 is a partial schematic block diagram of a signal processor 101 according to the seventh embodiment of the present invention. The signal processor 101 has a DFE 82, an ADC 83, a digital filter 102, a zero-phase restart circuit 103 and a timing recovery PLL circuit (TR-PLL) 104.

The digital filter 102 executes the optimal waveform equalization on the preamble signal from the ADC 83, and sends a filtered signal S21 to the zero-phase restart circuit 103. The zero-phase restart circuit 103 generates a reference clock signal SCK whose phase substantially matches with that of the read signal RD (or preamble signal) using the filtered signal S21, and supplies its initial clock signal CLK to the TR-PLL 104. The TR-PLL 104 generates the reference clock signal SCK whose phase substantially matches that of the initial clock signal CLK, and supplies the reference clock signal SCK to the ADC 83 and the shift register 15.

The generation of the initial clock signal CLK by the restart circuit 103 shortens the time required for generating the reference clock signal SCK of the TR-PLL 104. That is, the time needed to generate the reference clock signal SCK from the initial clock signal CLK is shorter than the time needed to generate the reference clock signal SCK from the output signal (read signal RD) of the ADC 83. In other words, the phase difference between the reference clock signal SCK and the initial clock signal CLK is smaller than the phase difference between the read signal RD and the system clock signal. When the phase difference between the reference clock signal SCK and the read signal RD is large, phase matching takes a longer time, which increases the data reading time. Further, there may be a case where the reference clock signal SCK in phase with the read signal RD cannot be produced. In this case, read data cannot be sampled accurately and the reading process will be carried out repeatedly.

At the time of generating the initial clock signal CLK, the restart circuit 103 samples the output signal S11 of the ADC 83 and stores plural pieces of data. The restart circuit 103 extracts the characteristic of the preamble signal using the stored data, and generates the reference clock signal SCK whose phase substantially matches that of the preamble signal based on the extracted characteristic. After generation of the initial clock signal CLK, the restart circuit 103 presets the shift register 15 using the stored data. According to the seventh embodiment, as apparent from the above, the DFE 82 is preset at the time the initial clock signal CLK is produced. This prevents divergence of the FB loop.

Figure 33A:
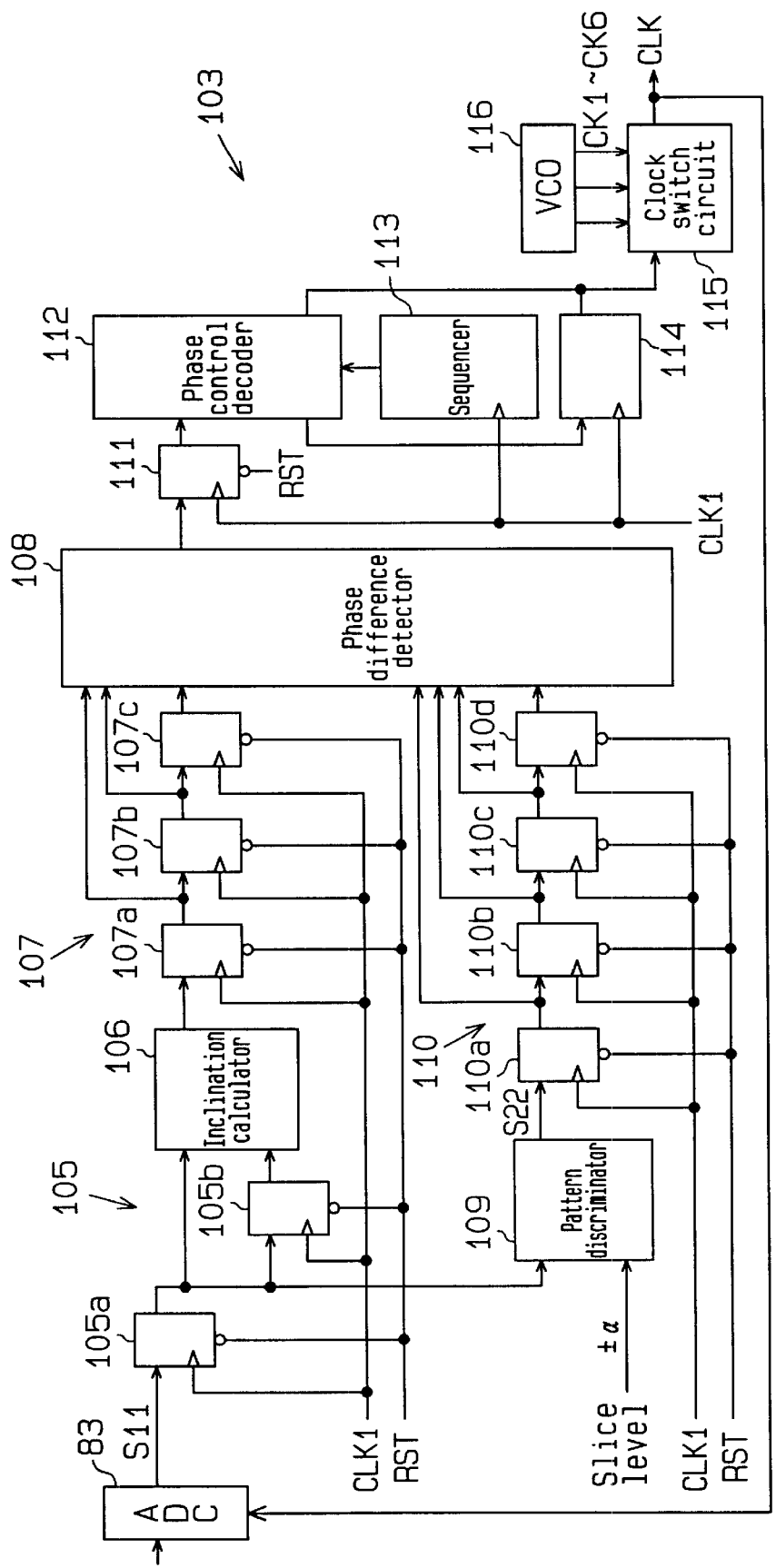
FIG. 33A is a schematic block diagram of a zero-phase restart circuit of the signal processor of FIG. 32.

FIG. 33A is a schematic block diagram of the restart circuit 103. The restart circuit 103 generates the initial clock signal CLK in accordance with the preamble signal of a 4T pattern. The digital filter 102 is omitted in FIG. 33A.

The restart circuit 103 includes first to third shift registers 105, 107 and 110, an inclination calculator 106, a phase difference detector 108, a pattern discriminator 109, a register 11, a phase control decoder 112, a sequencer 113, a phase holding register 114, a clock switch circuit 115 and a voltage controlled oscillator (VCO) 116.

The first shift register 105 includes first and second registers 105a and 105b each for storing data of a plurality of bits (the number of bits of the output signal of the ADC 83) in accordance with the clock signal CLK1. The clock signal CLK1 is generated by an unillustrated clock circuit using the reference clock signal SCK.

Figure 33B:
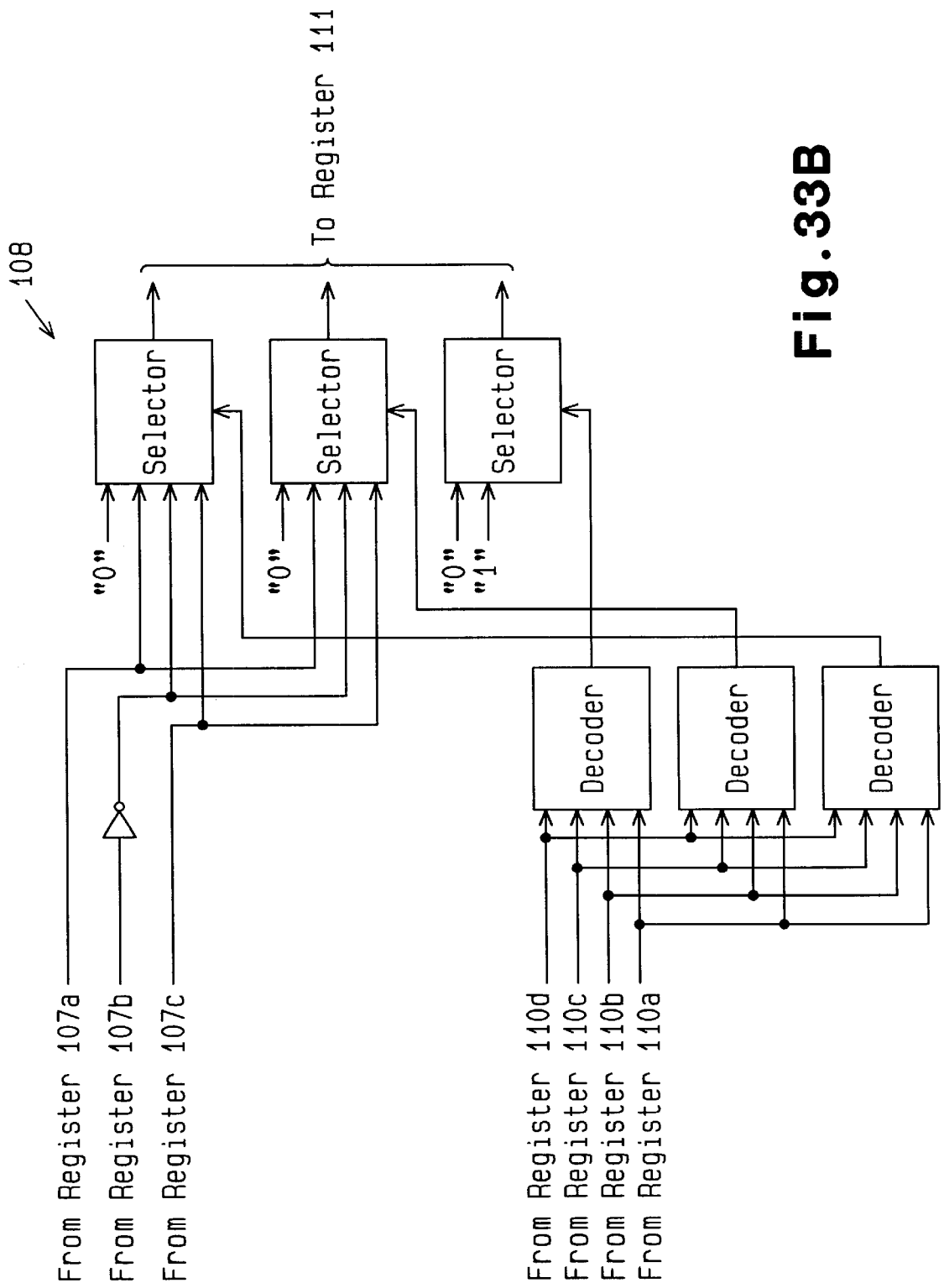
FIG. 33B is a schematic block diagram of a phase difference detector of the zero-phase restart circuit of FIG. 33A.
Figure 33C:
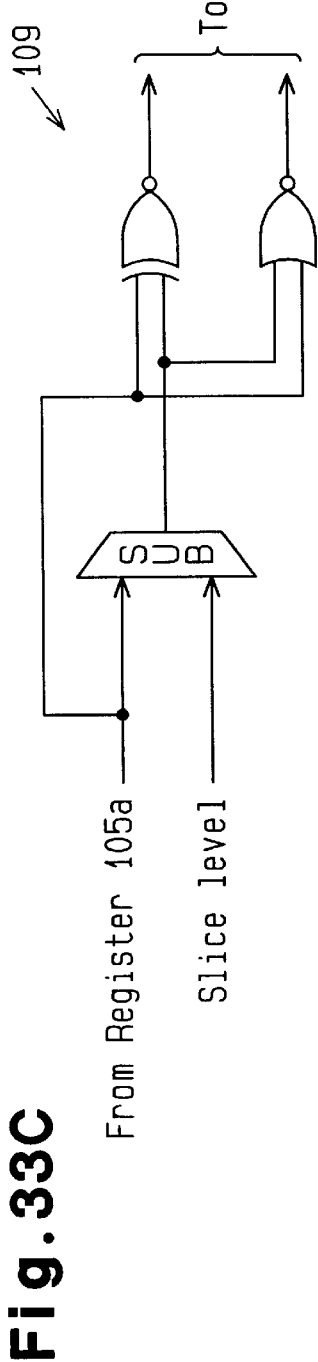
FIG. 33C is a schematic block diagram of a pattern discriminator of the zero-phase restart circuit of FIG. 33A.
Figure 33D:
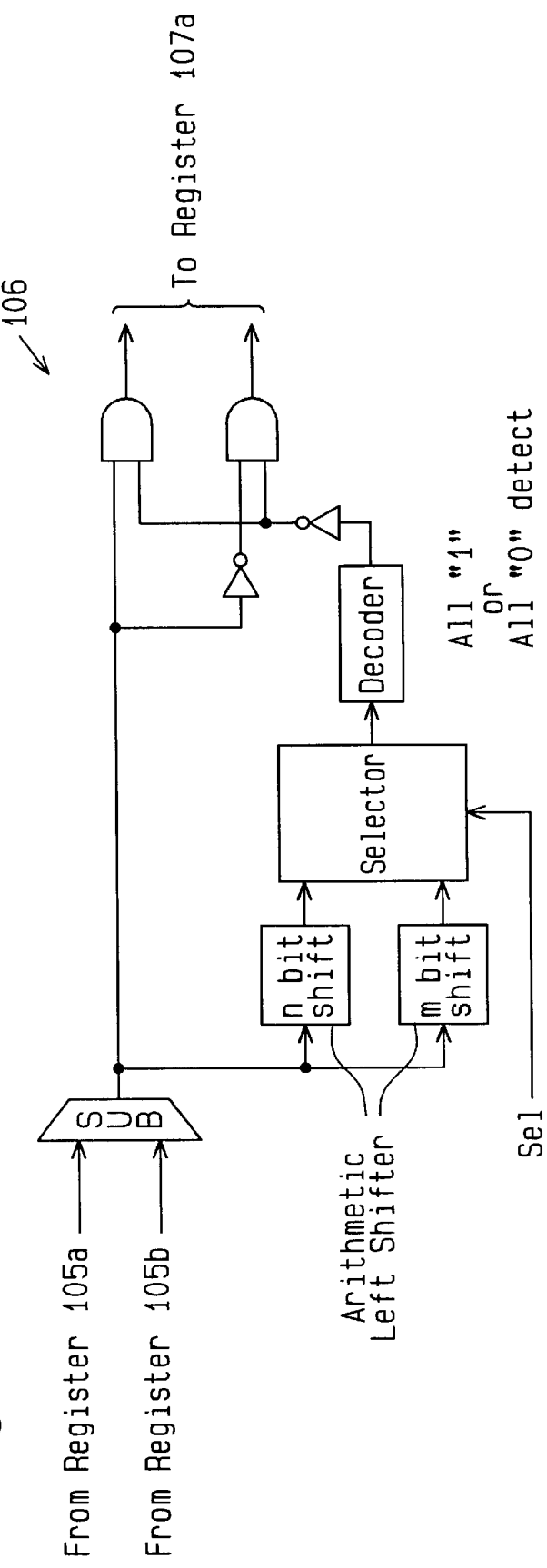
FIG. 33D is a schematic block diagram of an inclination calculator of the zero-phase restart circuit of FIG. 33A.

The inclination calculator 106 receives two pieces of data from the first shift register 105, computes the inclination of a line connecting the coordinates of the two data, and supplies inclination data to the second shift register 107, as shown in FIGS. 33A and 33D.

The second shift register 107 includes three registers 107a to 107c which respectively latch three pieces of inclination data according to the clock signal CLK1. The three inclination data are current inclination data supplied from the inclination calculator 106, and two pieces of inclination data that have been supplied prior to the current inclination data. Each of the inclination data has a value of inclination between two consecutive sampling points. Thus, the second shift register 107 latches three pieces of inclination data which have three inclination values between four consecutive sampling points.

The pattern discriminator 109 receives predetermined slice levels including first and second decision levels and latched data from the register 105a, compares the level of the latched data with the first and second decision levels to determine the level of the latched data, as shown in FIGS. 33A and 33C. The first decision level is greater than the second decision level. For instance, the first decision level is set to $+\alpha(v)$, and the second decision level to $-\alpha(v)$. A decision signal S22 of "1" is produced when the level of the latched data is greater than the first decision level, a decision signal S22 of "0" is produced when the level of the latched data lies between the first and second decision levels, and a decision signal S22 of "−1" is produced when the level of the latched data is smaller than the second decision level.

The third shift register 110 includes four registers 101a to 101d which respectively latch four decision signals S22 according to the clock signal CLK1. The four decision signals S22 are the current decision signal S22 supplied from the pattern discriminator 109, and three decision signals S22 that have been supplied prior to the current decision signal S22. Therefore, the third shift register 110 latches four decision signals S22 at four consecutive sampling points. Each decision signal S22 shows a pattern formed by four sampling points of the output signal S11 of the ADC 83.

The phase difference detector 108 receives three inclination data from the second shift register 107 and four decision signals from the third shift register 110, and selects one inclination data based on the four decision signals, as shown in FIGS. 33A and 33B. This selection permits the phase difference between the input signal (read signal RD) of the ADC 83 and the reference clock signal SCK to be detected. More specifically, the four decision signals latched in the third shift register 110 are data of four sampling points of the preamble signal. The difference between the phase of the output signal S11 of the ADC 83 and the phase of the reference clock signal SCK (sampling clock signal CLK1) appears as the inclination of the sampling points. That is, when both signals are in phase, the inclination is 0 (zero). As the phase difference increases, the inclination of the sampling points gets greater. A pattern indicated by the four decision signals corresponds to the preamble signal "1100" of a 4T pattern. Therefore, the phase difference between the preamble signal and the reference clock signal SCK is detected by checking the inclination of two sampling points at "11" or "00". Accordingly, the phase difference detector 108 receives the pattern of four consecutive sampling points latched in the third shift register 110 and the inclination (phase difference) at "11" or "00" stored in the second shift register 107.

The first register 111 receives the selected inclination data (phase difference) from the phase difference detector 108 and latches the inclination data in accordance with the clock signal CLK1. The second register (phase holding register) 114 latches control data based on sampling data, older by one, generated by the phase control decoder 112.

The phase control decoder 112 receives the inclination data latched in the first register 111 and the control data latched in the second register 114, and decodes both data under the control of the sequencer 113, thereby generating control data. That is, the phase control decoder 112 generates control data using the current inclination data latched in the first register 111 and the control data that has been generated before the current inclination data.

Figure 34:
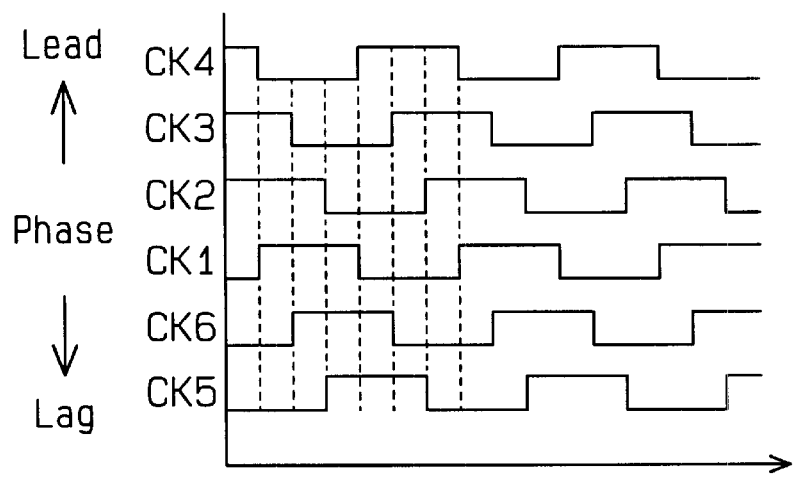
FIG. 34 is a signal waveform diagram of clock signals generated by a VCO of the zero-phase restart circuit of FIG. 33A.

The clock switch circuit 115 receives the control data, latched in the second register 114, and a plurality of (six in this case) clock signals CK1 to CK6, generated by the VCO 116, and selects one of the clock signals as the reference clock signal SCK based on the control data. The clock signals CK1–CK6 have the same frequency and difference phases as shown in FIG. 34. The VCO 116 equally divides one period of the first clock signal CK1 (into six segments), and generates five clock signals CK2–CK6 whose phases are shifted from one another by an equal segment of the period. The phases of the second to fourth clock signals CK2–CK4 are leading that of the first clock signal CK1, and the phases of the fifth and sixth clock signals CK5 and CK6 are lagging from that of the first clock signal CK1. Of the clock signals CK1–CK6, the clock signal CK4 is leading most, and the clock signal CK5 is lagging most.

Figure 35:
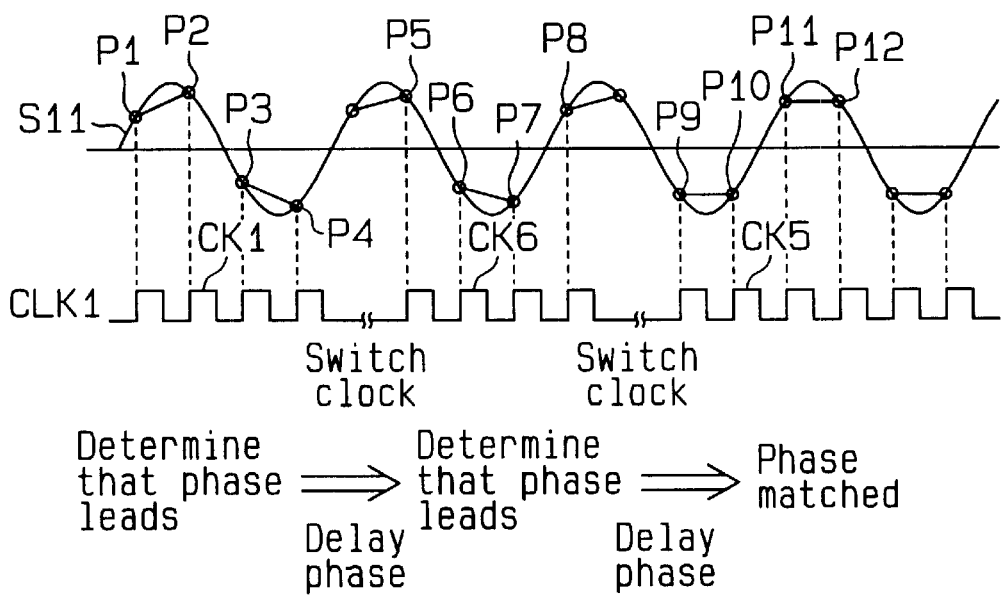
FIG. 35 is a signal waveform diagram explaining the operation of the zero-phase restart circuit of FIG. 33A.

The operation of the zero-phase restart circuit 103 will now be explained with reference to FIG. 35. It is assumed that the reference clock signal SCK is the first clock signal CK1, and the sampling clock signal CLK1 is produced from the first clock signal CK1. The restart circuit 103 samples the read signal S11 in accordance with the sampling clock CLK1. Based on sampling points P1 to P4, obtained by the sampling process, inclination data between points P1 and P2, P2 and P3, and P3 and P4, and the inclination data are stored in the second shift register 107. A pattern "1100" acquired by discrimination performed by the pattern discriminator 109 is stored in the third shift register 110.

The phase difference detector 108 selects the inclination data between the points P1 and P2 at "11" based on the pattern stored in the third shift register 110. The phase difference detector 108 may select the inclination data between the points P3 and P4 at "00". The phase control decoder 112 determines that the phase is leading, based on that inclination data and the control data older by one, and generates control data for delaying the phase of the reference clock signal SCK. The control data is supplied via the second register 114 to the clock switch circuit 115, which selects the sixth clock signal CK6 whose phase is lagging from that of the first clock signal CK1, as the reference clock signal SCK.

Then, the restart circuit 103 samples the read signal S11 in accordance with the sampling clock CLK1 (sixth clock signal CK6), and computes inclination data between points P5 and P6, P6 and P7, and P7 and P8 based on the acquired sampling points P5–P8. At this time, a pattern "0110" is stored in the third shift register 110.

The phase difference detector 108 selects the inclination data between the points P6 and P7 at "00". The phase control decoder 112 determines that the phase is leading, based on that inclination data, and generates control data for delaying the phase of the reference clock signal SCK. Based on the control data, the clock switch circuit 115 selects the fifth clock signal CK5 whose phase is lagging from that of the sixth clock signal CK6, as the reference clock signal SCK.

Then, the restart circuit 103 samples the read signal S11 in accordance with the sampling clock CLK1 (fifth clock signal CK5), and computes inclination data between points P9 and P10, P10 and P11, and P11 and P12 based on the acquired sampling points P9–P12. At this time, a pattern "0011" is stored in the third shift register 110.

The phase difference detector 108 selects the inclination data between the points P11 and P12 at "11". The phase control decoder 112 determines that both phases match, based on that inclination data, and supplies the decision result to the sequencer 113. In response to the decision result, the sequencer 113 stops the phase control decoder 112. At this time, the control data for selecting the fifth clock signal CK5 is latched in the second register 114. The restart circuit 103 therefore continuously outputs the fifth clock signal CK5 as the reference clock signal SCK.

Figure 36:
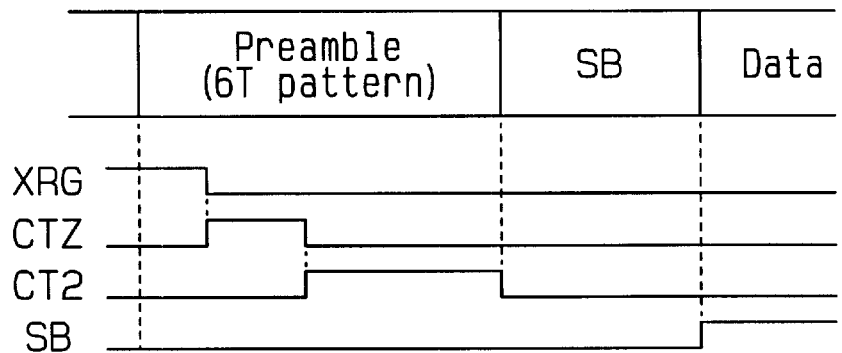
FIG. 36 is a first signal waveform diagram explaining the control timing of the zero-phase restart circuit and a TR-PLL of the signal processor of FIG. 32.

FIG. 36 is a signal waveform diagram explaining the timing of the sequence controller 54 used to control the restart circuit 103 and the TR-PLL 104. When reading the preamble starts, the sequence controller 54 receives a start signal XRG having an L level from the MPU 37. In response to the start signal XRG, the sequence controller 54 supplies a phase control signal CNZ having an H level to the restart circuit 103 and supplies the first and second control signals SG1 and SG2 to the DFE 82 to open the FB loop of the DFE 82. In response to the phase control signal CNZ, the restart circuit 103 receives the filtered signal S21 from the digital filter 102, and initiates phase matching of the initial clock signal CLK.

After phase matching is completed, the restart circuit 103 presets the shift register 15 in the DFE 82. When confirming the completion of presetting, the sequence controller 54 supplies the L-level phase control signal CNZ to the restart circuit 103 and the H-level frequency control signal CT2 to the TR-PLL 104. The sequence controller 54 also supplies the first and second control signals SG1 and SG2 to the DFE 82 to close the FB loop of the DFE 82. In response to the H-level control signal CT2, the TR-PLL 104 receives the initial clock signal CLK originated from the output signal S3 of the adder 13, and starts frequency matching of the reference clock signal SCK.

When confirming the end of reading the preamble, the sequence controller 54 supplies the L-level frequency control signal CT2 to the TR-PLL 104. Thereafter, upon detection of the sync byte, the control data detector 53 sends the sync byte detection signal SB to the MPU 37. The MPU 37 processes data following the sync byte, in accordance with the sync byte detection signal SB.

Figure 37:
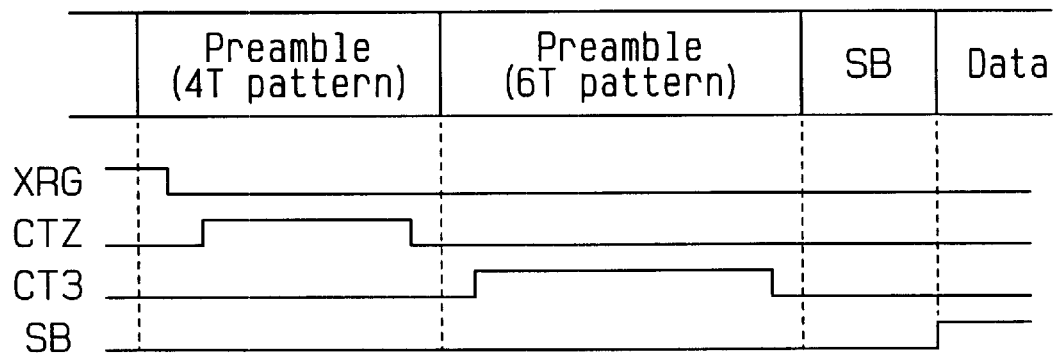
FIG. 37 is a second signal waveform diagram explaining the control timing of the zero-phase restart circuit and the TR-PLL of the signal processor of FIG. 32.

The sequence controller 54 may control the restart circuit 103 and TR-PLL 104 in accordance with two kinds of preamble signals as shown in FIG. 37. The two kinds of preambles are the preamble of the 4T pattern and the preamble is of the 6T pattern following the former preamble. In response to the start signal XRG, the sequence controller 54 supplies the H-level phase control signal CNZ to the restart circuit 103. In response to the phase control signal CNZ, the restart circuit 103 commences phase matching using the preamble signal of the 4T pattern. When confirming the end of phase matching, the sequence controller 54 supplies the L-level phase control signal CNZ to the restart circuit 103. When the preamble of the 6T pattern is read, the sequence controller 54 sends the H-level frequency control signal CT2 to the TR-PLL 104. In response to the H-level control signal CT2, the TR-PLL 104 commences frequency matching using the preamble signal of the 6T pattern.

Eighth Embodiment

Figure 38:
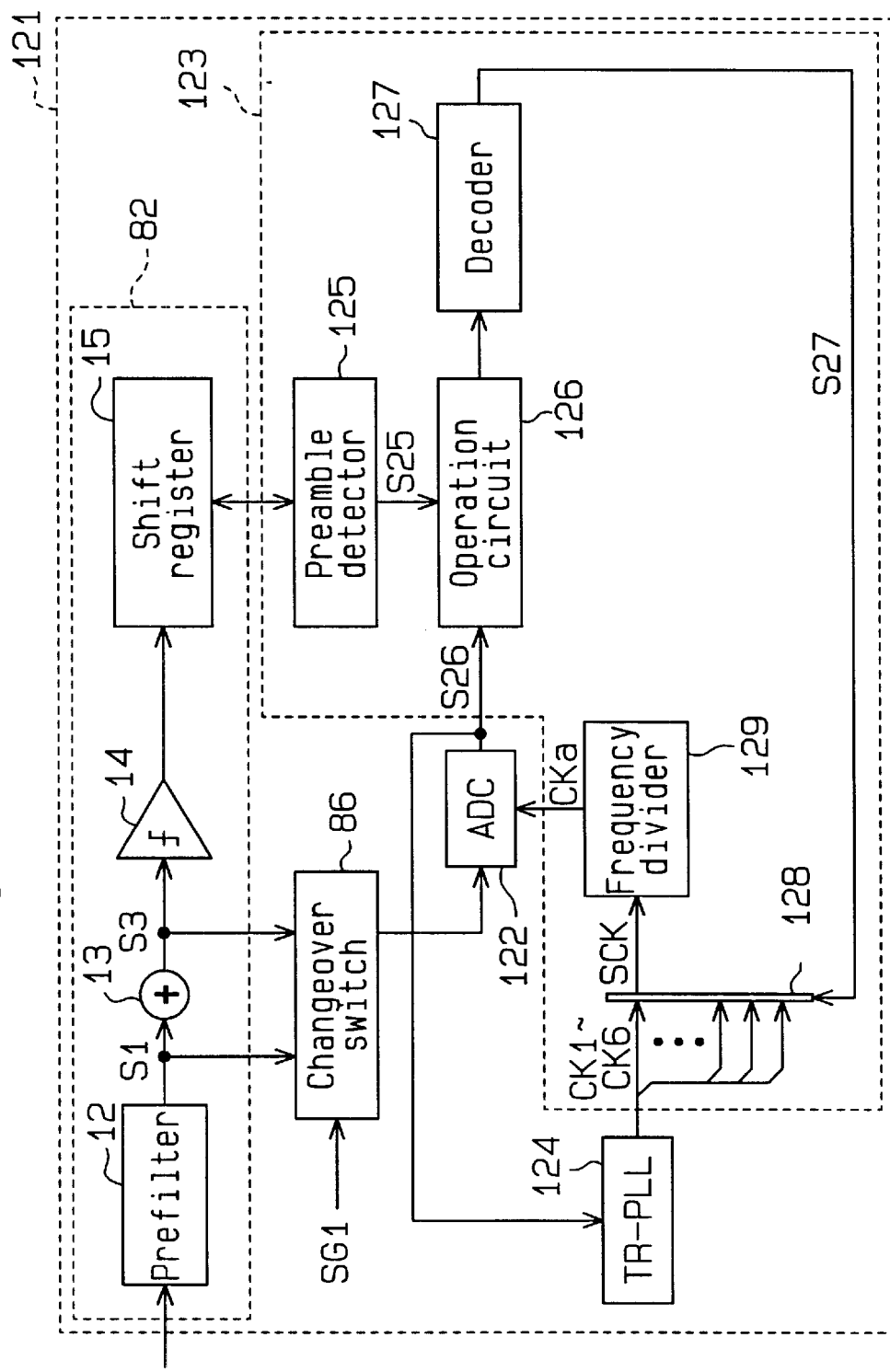
FIG. 38 is a schematic block diagram of a signal processor according to an eighth embodiment of the present invention.

FIG. 38 is a partial schematic block diagram of a signal processor 121 according to the eighth embodiment of the present invention. The signal processor 121 has a DFE 82, an ADC 122, a zero-phase restart circuit 123, and a timing recovery PLL circuit (TR-PLL) 124. In FIG. 38, a feedback filter 22 and a second switch 87 are omitted.

The ADC 122 converts the output signal S3 of the adder 13 to a digital signal having a predetermined number of bits (6 bits in this example) in accordance with a system clock signal CKa which has been frequency-divided by a frequency divider 129, and supplies the digital signal to the restart circuit 123.

The restart circuit 123 is associated with preamble data having a 6T pattern, which is a periodic pattern (111000111000. . . ) in which data with the same value appears every six periods (six clocks) of the reference clock signal SCK.

The restart circuit 123 includes a preamble detector 125, an operation circuit 126, a decoding circuit 127, a selector 128 and a frequency divider 129. The preamble detector 125 receives data stored in a shift register 15, and sends a detection signal S25 to the operation circuit 126 when detecting the preamble data of the read signal RD. When detecting the preamble signal, the preamble detector 125 also presets the shift register 15. This presets the feedback response of the DFE 82, thereby preventing divergence of the FB loop.

In response to the detection signal S25 from the preamble detector 125, the operation circuit 126 starts phase matching of the reference clock signal SCK using an output signal S26 from the ADC 122. Specifically, in response to the detection signal S25, the operation circuit 126 computes cross-correlation functions of the sampling data of the preamble signal and computes the phase difference between the preamble signal and the reference clock signal SCK using the cross-correlation functions. The operation circuit 126 then supplies a phase difference signal to the decoding circuit 127.

The decoding circuit 127 decodes the phase difference signal from the operation circuit 126, generating a select signal S27. The selector 128 receives the select signal S27 from the decoding circuit 127, and selects one of a plurality of clock signals CK1–CK6 as the reference clock signal SCK in accordance with the select signal S27. The clock signals CK1–CK6, which are generated by the TR-PLL 124, have different phases from one another. In this manner, the reference clock signal SCK whose phase substantially matches that of the preamble signal is generated. The TR-PLL 124 receives the preamble signal from the ADC 122, and performs finer phase matching of the reference clock signal SCK. This shortens the time needed for phase matching of the reference clock signal SCK.

The operation of the restart circuit 123 will now be described. The function of the preamble signal is expressed by $fc(\tau)$. The operation circuit 126 generates first and second reference signals of different phases from the reference clock signal SCK. The phase of the first reference signal leads the phase of the reference clock signal SCK by one symbol rate (one period of the reference clock signal SCK). The phase of the second reference signal lags the phase of the reference clock signal SCK by one symbol rate.

Figures 40, 41:
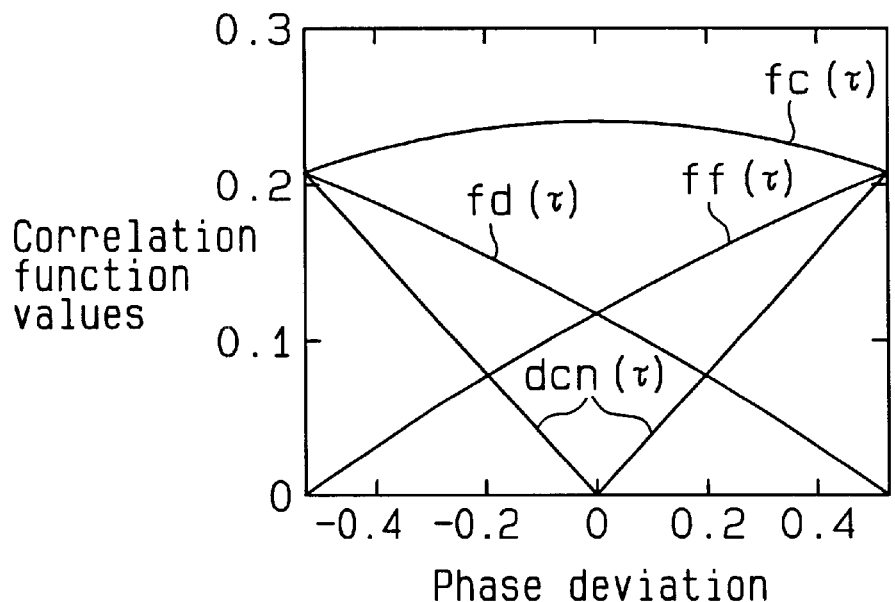
FIG. 40 is a characteristic diagram illustrating the relationship between correlation function values generated by the operation circuit of FIG. 39A and the phase deviation of the clock signal.
FIG. 41 is a diagram explaining the operations of adders of the operation circuit of FIG. 39A.

The operation circuit 126 then computes cross-correlation functions $ff(\tau)$ and $fd(\tau)$ for the preamble signal and the first and second reference signals, and computes the difference, $dcn(\tau)$ ($|ff(\tau)-fd(\tau)|$), between the two cross-correlation functions $ff(\tau)$ and $fd(\tau)$. As shown in FIG. 40, the value of the difference $dcn(\tau)$ (the value on the vertical scale in FIG. 40) is proportional to the phase difference (phase deviation) between the reference clock signal SCK and the preamble signal. Using the difference $dcn(\tau)$, therefore, one of the clock signals CK1–CK6 from the TR-PLL 124 whose phase is close to the phase of the preamble signal is selected. The restart circuit 123 implements phase matching of the reference clock signal SCK in this manner.

Figure 39A:
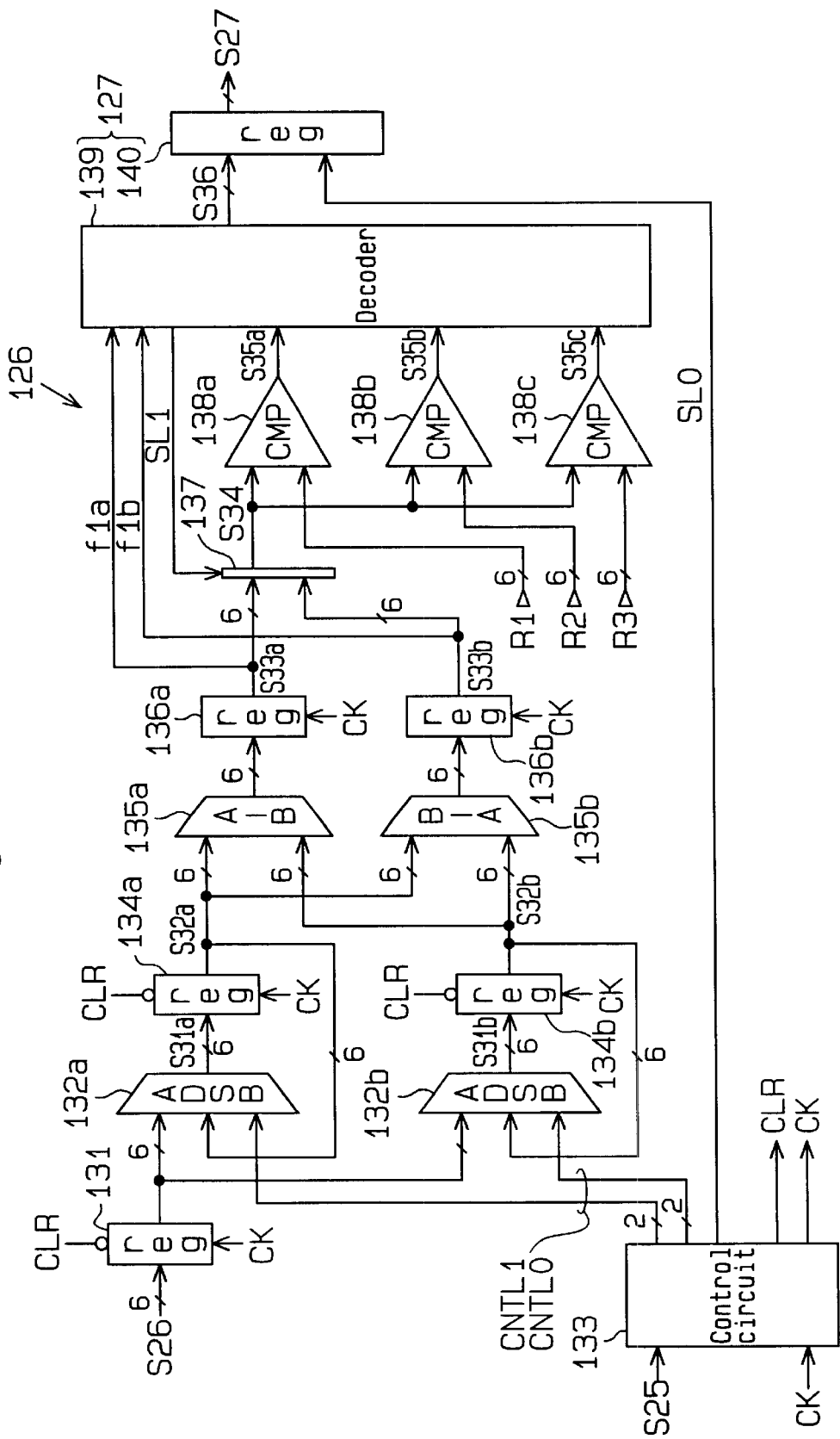
FIG. 39A is a schematic block diagram of an operation circuit and a decoder of the signal processor of FIG. 38.

FIG. 39A is a schematic block diagram of the operation circuit 126 and the decoding circuit 127. A first register 131 in the operation circuit 126 latches the output signal S26 of the ADC 122 in accordance with the clock signal CK, and supplies the latched signal to first and second adders 132a and 132b.

Figure 39B:
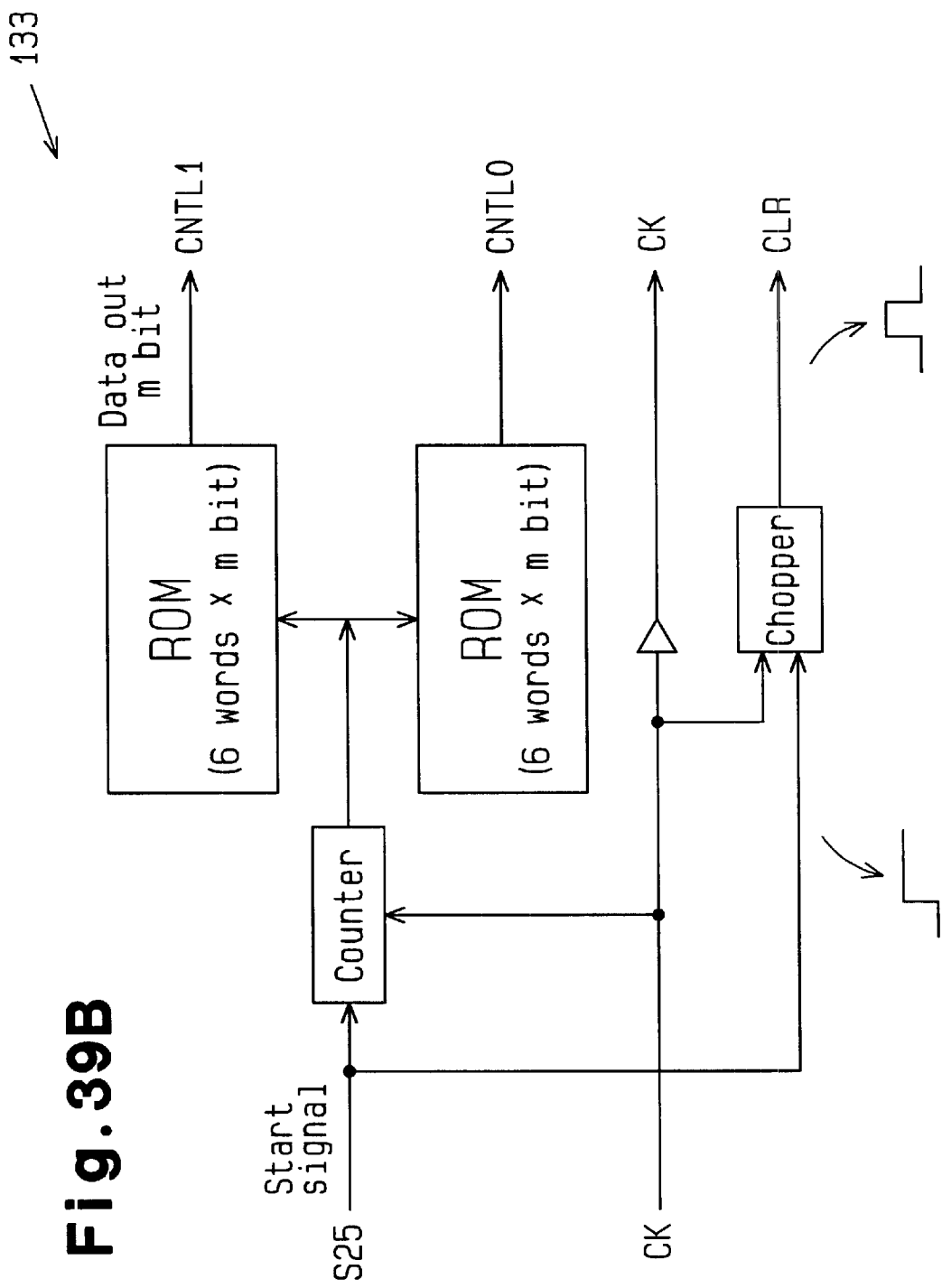
FIG. 39B is a schematic block diagram of a control circuit of the operation circuit of FIG. 39A.

A control circuit 133 receives the detection signal S25 from the preamble detector 125 and the clock signal CK, and generates control signals CNTL1 and CNTL0 in accordance with the clock signal CK, as shown in FIGS. 39A and 39B.

The first adder 132a receives the control signals CNTL1 and CNTL0 from the control circuit 133, the latched signal S26 from the first register 131 and an output signal S32a from a second register 134a, and adds the latched signal S26 and the output signal S32a together in accordance with the control signals CNTL1 and CNTL0. The second register 134a latches an output signal S31a of the first adder 132a in accordance with the clock signal CK.

As shown in FIG. 41, when the control signals CNTL1 and CNTL0 are "00", for example, the first adder 132a outputs a result x which is addition of input a (latched signal S26) and input b (output signal S32a). When the control signals CNTL1 and CNTL0 are "01", the first adder 132a outputs the sum of-(a) (inverted signal of the latched signal S26) plus input b (output signal S32a). Therefore, the first adder 132a and second register 134a form a first correlating unit which generates a reference signal whose phase differs from that of the preamble signal by one symbol rate and computes a cross-correlation function for the reference signal and the preamble signal.

The second adder 132b receives the control signals CNTL1 and CNTL0 from the control circuit 133, the latched signal S26 from the first register 131 and an output signal S32b from a third register 134b, and adds the latched signal S26 and the output signal S32b together in accordance with the control signals CNTL1 and CNTL0. The third register 134b latches an output signal S31b of the second adder 132b in accordance with the clock signal CK. Therefore, the second adder 132b and third register 134b form a second correlating unit which generates a reference signal whose phase differs from that of the preamble signal by one symbol rate and computes a cross-correlation function for the reference signal and the preamble signal.

A first subtracter 135a receives the output signals S32a and S32b of the second and third registers 134a and 134b and subtracts the output signal S32b from the output signal S32a. A fourth register 136a latches the subtraction result from the first subtracter 135a in accordance with the clock signal CK. A latched signal S33a is supplied to a selector 137, and a code bit f1a of the latched signal S33a is supplied to a decoder 139 in the decoding circuit 127.

A second subtracter 135b receives the output signals S32a and S32b of the second and third registers 134a and 134b and subtracts the output signal S32a from the output signal S32b. A fifth register 136b latches the subtraction result from the second subtracter 135b in accordance with the clock signal CK. A latched signal S33b is supplied to the selector 137, and a code bit f1b of the latched signal S33b is supplied to the decoder 139.

Figure 39C:
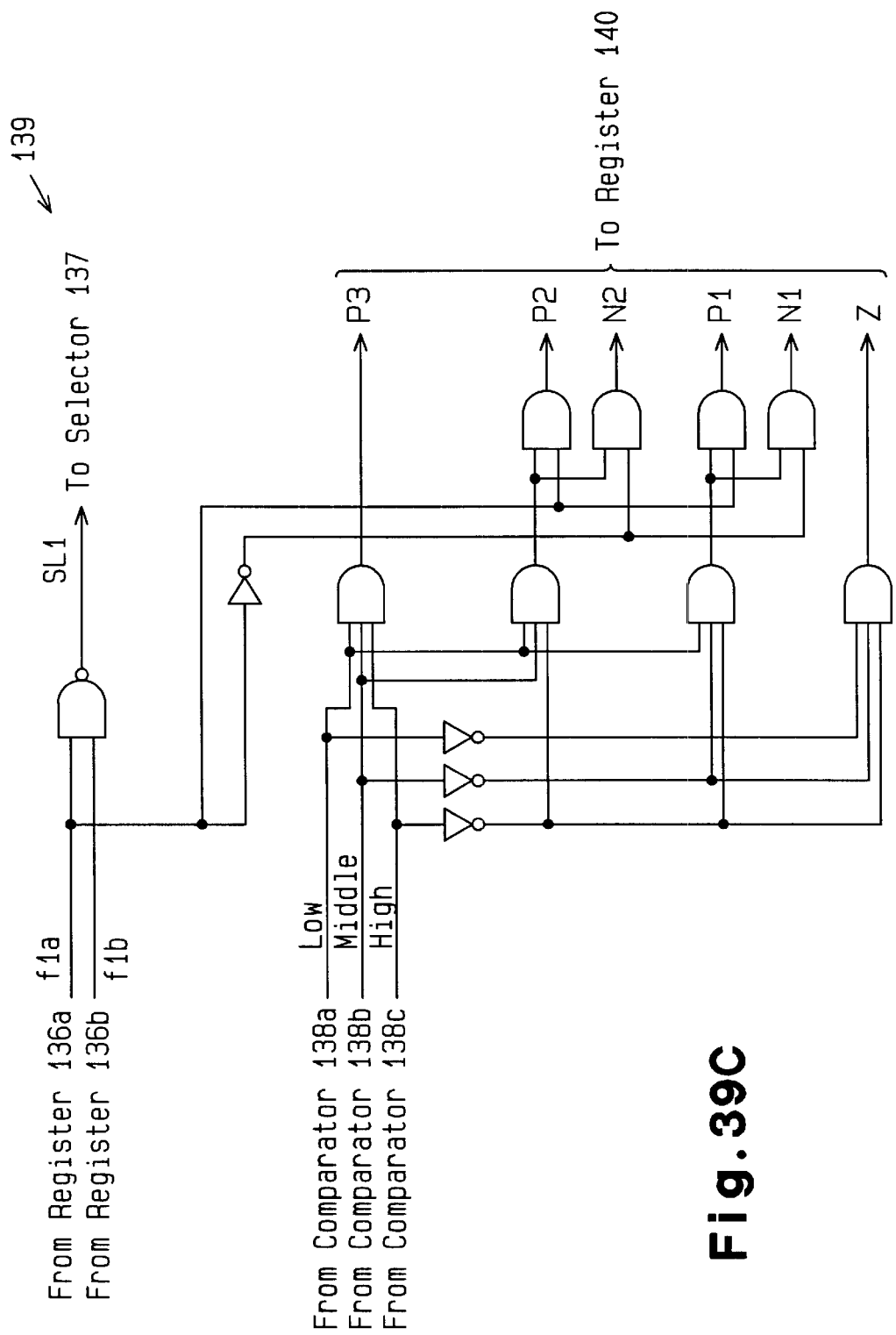
FIG. 39C is a schematic block diagram of the decoder.

The decoder 139 generates a select signal SL1 corresponding to a positive code bit based on the code bits f1a and f1b from the fourth and fifth registers 136a and 136b, and sends the select signal SL1 to the selector 137, as shown in FIGS. 39A and 39C. The selector 137 selects one of the latched signals S33a and S33b from the fourth and fifth registers 136a and 136b which has a positive value in accordance with the select signal SL1, and sends the selected signal S34 to first to third comparators 138a to 138c. The selection by the selector 137 causes the absolute value of the output signals of the first and second correlating units to be supplied to the first to third comparators 138a–138c.

Figures 42, 43:
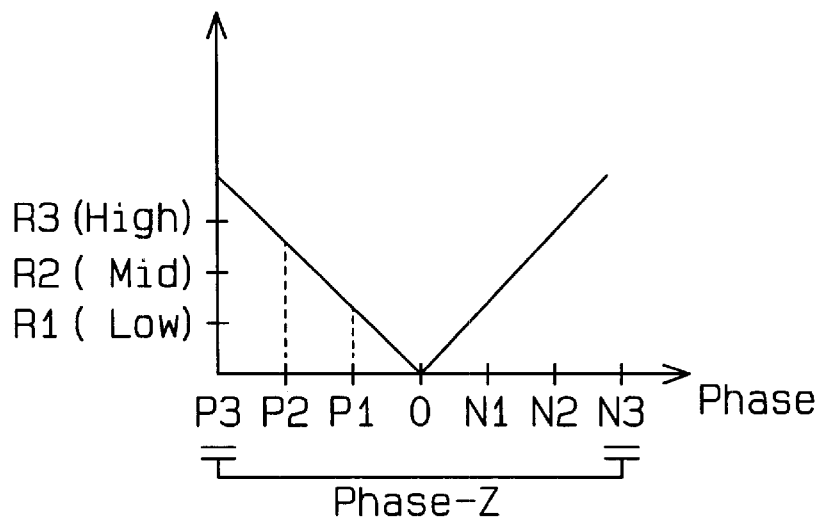
FIG. 42 is a graph illustrating the relationship between the phase difference between a preamble signal and a system clock signal, and the comparison level.
FIG. 43 is a diagram explaining the operations of comparators of the operation circuit of FIG. 39A.

The first to third comparators 138a–138c receive the output signal S34 from the selector 137 and first to third comparison signals R1 to R3, and compares the output signal S34 with the first to third comparison signals R1–R3. The first to third comparison signals R1–R3 respectively have first to third comparison levels Low, Mid and High set according to phases P3–P1, Z and N1–N3 shown in FIG. 42. The first to third comparison levels Low, Mid and High correspond to phase differences between the clock signal CK and the clock signals CK1–CK6 from the TR-PLL 124.

Specifically, the TR-PLL 124 equally divides one period of the first clock signal CK1 (into six segments), and generates the second to sixth clock signals CK2–CK6 whose phases are shifted from one another by the equal segment of the period (see FIG. 34). The phase of the fourth clock signal CK4 leads that of the first clock signal CK1 by 3/6 of the period. That is, the phase of the fourth clock signal CK4 lags that of the first clock signal CK1 by 3/6 of the period.

The first comparison level Low corresponds to the phase differences between the first clock signal CK1 and the second and sixth clock signals CK2 and CK6. The second comparison level Mid corresponds to the phase differences between the first clock signal CK1 and the third and fifth clock signals CK3 and CK5. The third comparison level High corresponds to the phase difference between the first clock signal CK1 and the fourth clock signal CK4.

The first to third comparators 138a–138c produces phase difference signals S35a to S35c having H levels (1) when the level of the preamble signal (output signal S34) is greater than those of the first to third comparison signals R1–R3, and produces the phase difference signals S35a to S35c having L levels (0) when the level of the preamble signal is smaller than those of the first to third comparison signals R1–R3.

When the phase difference between the preamble signal and the system clock signal (first clock signal) CK1 lies within 1/6 of the period (phase Z in FIG. 43), for example, the first to third comparators 138a–138c generate the phase difference signals S35a–S35c all of "0" When the phase difference between the preamble signal and the reference clock signal CK1 is equal to or greater than 1/6 of the period and within 2/6 of the period (phase P1 in FIG. 43), the first comparator 138a generates the phase difference signal S35a of "1" and the second and third comparators 138b and 138c generate the phase difference signals S35b and S35c of "0".

The decoder 139 receives the phase difference signals S35a–S35c from the first to third comparators 138a–138c and the code bit f1a of the latched signal S33a from the fourth register 136a, and generates a phase select signal S36. The code bit f1a of "0" indicates that the phase of the clock signal CK1 lags the phase of the preamble signal. The code bit f1a of "1" indicates the opposite state. The decoder 139 therefore generates the phase select signal S36 for the second to fourth clock signals CK2–CK4 in accordance with the code bit f1a of "0" and generates the phase select signal S36 for the second to fourth clock signals CK2–CK4 in accordance with the code bit f1a of "1". The decoder 139 further generates the phase select signal S36 for the sixth to fourth clock signals CK6–CK4 in accordance with the code bit f1a of "1".

When the output signals S35a–S35c are all "0", the decoder 139 generates the phase select signal S36 for the first clock signal CK1. When the output signals S35a–S35c are "100", the decoder 139 generates the phase select signal S36 for the second clock signal CK2 in accordance with the code bit of "0" and generates the phase select signal S36 for the sixth clock signal CK6 in accordance with the code bit of "1".

A sixth register 140 receives the phase select signal S36 from the decoder 139 and the zero-phase select signal SL0 from the control circuit 133, latches the phase select signal S36 at the rising edge of the zero-phase select signal SL0, and sends the latched phase select signal S36 to the selector 128.

In accordance with the select signal S27, the selector 128 selects one of the first to sixth clock signals CK1–CK6 from the TR-PLL 124 as the reference clock signal SCK. The frequency divider 129 divides the frequency of the system clock signal by 2, and supplies the clock signal CKa to the ADC 122.

Figure 44:
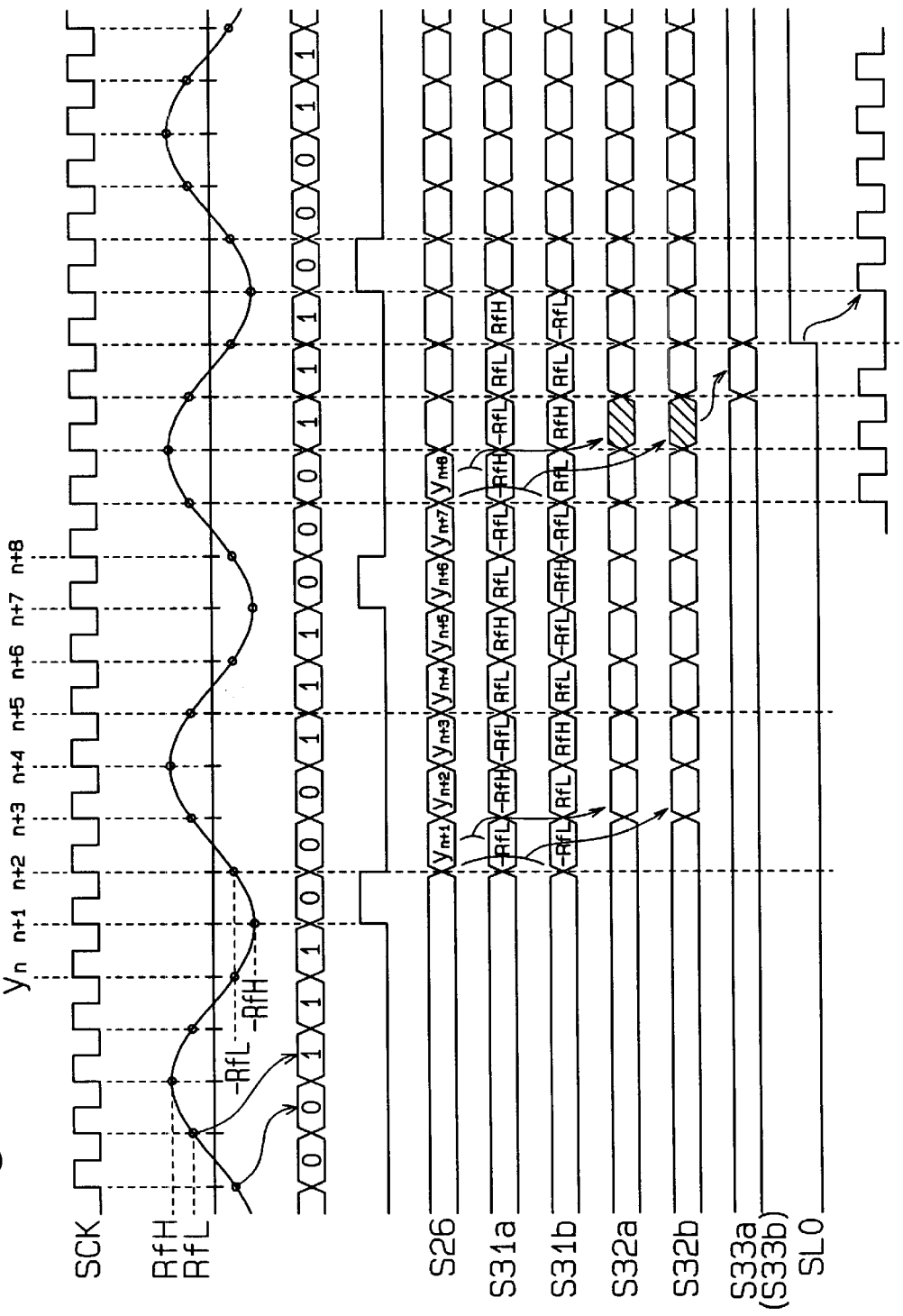
FIG. 44 is a signal waveform diagram illustrating the operation of a zero-phase restart circuit of the signal processor of FIG. 38.

In the eighth embodiment, as described above, the restart circuit 123 acquires cross-correlation functions for one period of the preamble signal from sampling points, which have been obtained by sampling the preamble signal of the 6T pattern in accordance with the reference clock signal SCK, as shown in FIG. 44. Then, the restart circuit 123 performs rough phase matching of the reference clock signal SCK using the cross-correlation functions. The TR-PLL 124 receives the output signal S26 from the ADC 122, and performs fine phase matching of the control circuit SCK. This makes it possible to quickly acquire the reference clock signal SCK whose phase substantially matches that of the preamble signal.

Figure 45:
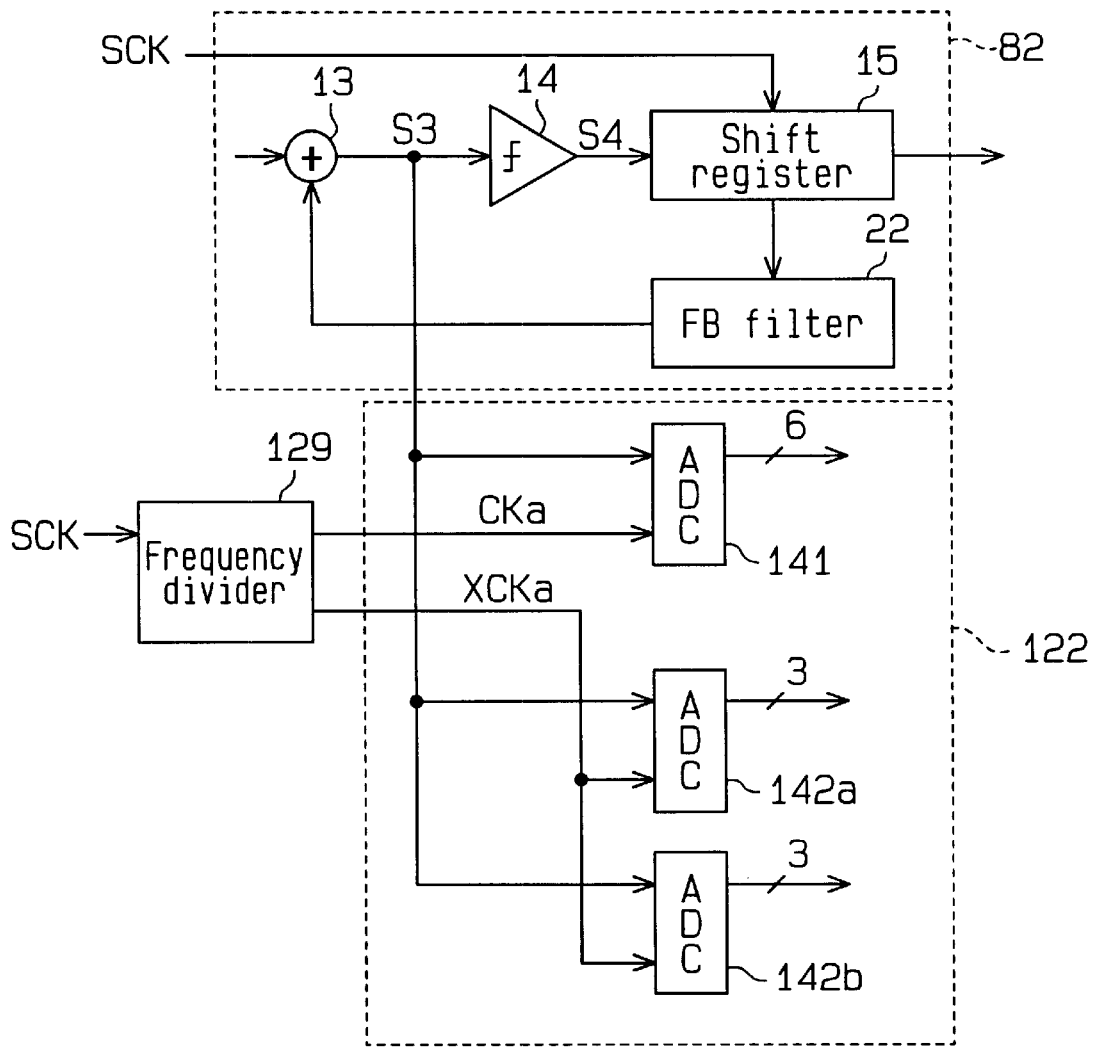
FIG. 45 is a schematic block diagram of a DFE and an ADC of the signal processor of FIG. 38.

FIG. 45 is a schematic block diagram of the DFE 82 and the ADC 122. The ADC 122 has a main ADC 141 and a plurality of (two in this example) sub ADCs 142a and 142b.

The main ADC 141, which has a signal input range around 0 V, converts the output signal S3 of the adder 13 to a 6-bit digital signal in accordance with the frequency-divided clock signal CKa from the frequency divider 129.

The 6-bit digital signal is supplied to the operation circuit 126 and TR-PLL 124.

Each of the sub ADCs 142a and 142b, which have signal input ranges around predetermined reference voltages and a narrower signal input range than the main ADC 141, converts the output signal S3 to a 3-bit digital signal in accordance with an inverted clock signal XCKa of the frequency-divided clock signal CKa. Each 3-bit digital signal is supplied to the operation circuit 126 and TR-PLL 124.

Figure 46:
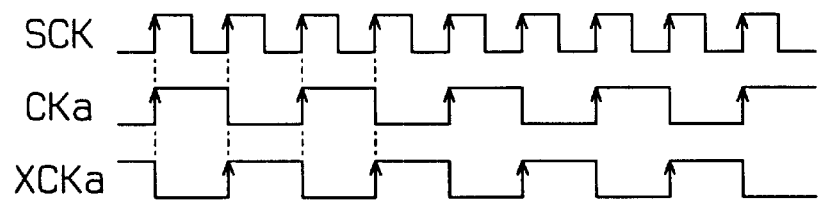
FIG. 46 is a signal waveform diagram showing the system clock signal and a frequency-divided clock signal supplied to the ADC of FIG. 45.

As shown in FIG. 46, the rising edges of the inverted clock signal XCKa and the frequency-divided clock signal CKa alternately appear at the rising edge of the reference clock signal SCK. The time between the rising edges of the inverted clock signal XCKa of the frequency-divided clock signal CKa is substantially equal to the time between the adjoining rising edges of the reference clock signal SCK. Therefore, the main ADC 141 and sub ADCs 142a and 142b alternately perform A to D conversion in synch with the rising edge of the reference clock signal SCK.

Figure 47:
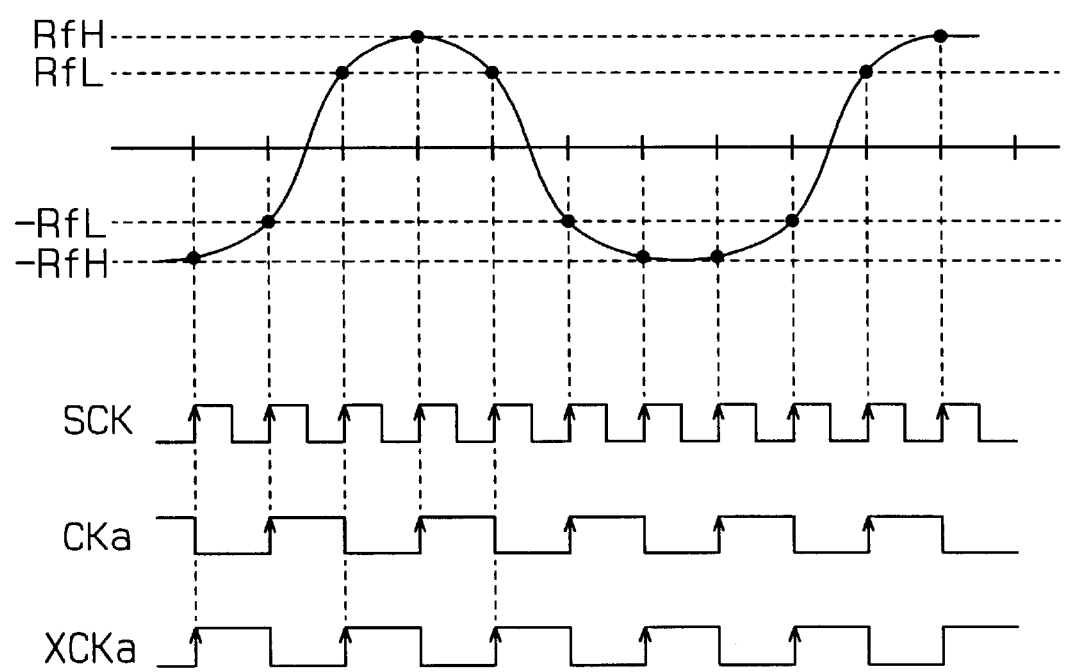
FIG. 47 is a signal waveform diagram illustrating the operation of the ADC of FIG. 45.
Figure 48:
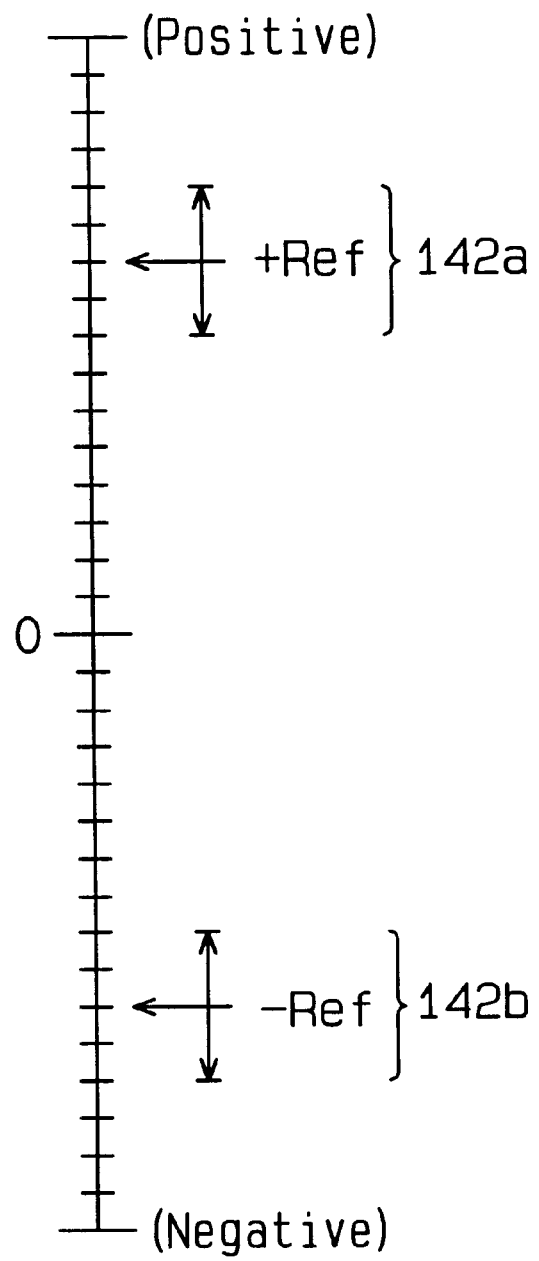
FIG. 48 is a diagram explaining the operational ranges of a main ADC and sub ADCs of the ADC of FIG. 45.

As shown in FIG. 48, the reference voltage of the first sub ADC 142a is a first reference voltage +Ref, and the reference voltage of the second sub ADC 142b is a second reference voltage −Ref. As shown in FIG. 47, the first reference voltage +Ref corresponds to a voltage RefL at one sampling point of the preamble signal and the second reference voltage −Ref corresponds to a voltage −RefL at another sampling point. When the preamble signal is sampled in accordance with the reference clock signal SCK, the sampling points have voltages close to voltages RefH, RefL, −RefL and −RefH. The TR-PLL 124 detects transitional points of the preamble signal from "positive to negative" and "from negative to positive" and matches the phases of the clock signals CK1–CK6 with the phase of the preamble signal based on the transitional points. The TR-PLL 124 thus requires voltages of sampling points around a transitional point. For this purpose, the main ADC 141 and the sub ADCs 142a and 142b operate alternately, thereby permitting the required voltages of the sampling points to the TR-PLL 124. This allows the TR-PLL 124 to implement phase matching equivalent to the phase matching that is carried out in a case of sampling the preamble signal in accordance with the reference clock signal SCK. In other words, lowering the sampling frequency prevents a reduction in the phase comparison gain of the TR-PLL 124. This prevents the phase matching time from becoming longer. Since the main ADC 141 operates in accordance with the clock signal CKa which has half the frequency of the reference clock signal SCK in the eighth embodiment, the power consumption is reduced to about half of what is needed at the time of using the reference clock signal SCK. Because the number of bits of the output signal of each sub ADC 142a or 142b is smaller than that of the main ADC 141, the circuit area is smaller than that of the main ADC 141. This prevents the area of a semiconductor device which forms the ADC 122 from being increased. Further, the sub ADCs 142a and 142b operate in accordance with the inverted clock signal XCKa having the same frequency as the clock signal for the main ADC. This makes the power consumption by the sub ADCs 142a and 142b less than the power consumption by the main ADC 141. Therefore, the power consumption by the ADC 122 is less than the power consumption by the main ADC 141 at the time of using the reference clock signal SCK.

According to the eighth embodiment, as described above, the zero-phase restart circuit 123 computes cross-correlation functions from the first and second reference signals whose phases respectively lag and lead the phase of the output signal S26 of the ADC 122, and acquires phase differences using the cross-correlation functions. This leads to quicker acquisition of the phase differences, resulting in faster phase matching of the system clock signal.

The selector 128 in the eighth embodiment may be replaced with the clock switch circuit 115 and the VCO 116 in the seventh embodiment. In this case, the TR-PLL 104 should be used instead of the TR-PLL 124.

Ninth Embodiment

Figure 49:
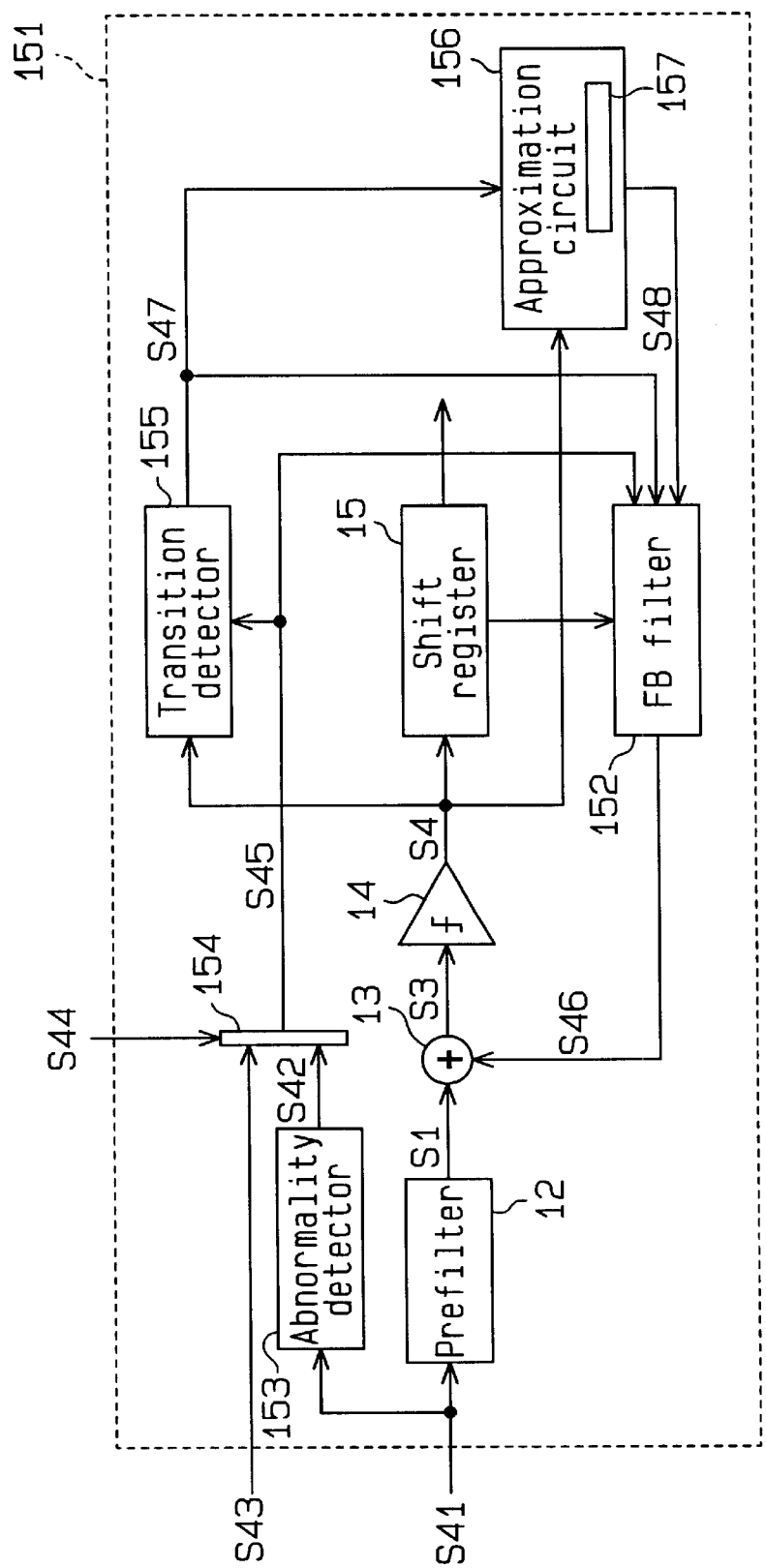
FIG. 49 is a schematic block diagram of a DFE according to a ninth embodiment of the present invention.

FIG. 49 is a schematic block diagram of a decision feedback equalizer (DFE) 151 according to the ninth embodiment of the present invention. The DFE 151 comprises a prefilter 12, an adder 13, a decision unit 14, a shift register 15, a feedback (FB) filter 152, an abnormality detector 153, a selector 154, a transition detector 155 and an approximation circuit 156.

The abnormality detector 153 receives an analog read signal S41 from a VGA 47, and detects if the analog read signal is normal. The abnormality detector 153 further detects a thermal asperity (TA), which induces an abnormality in a read signal. The abnormality detector 153 generates a detection signal S42 having an L level when a read signal S41 is normal and generates the detection signal S42 having a predetermined level (H level) when the read signal S41 is abnormal.

More specifically, the read signal S41 changes in accordance with the transfer code rule (RLL (1, 7) code) used in coding by an encoder 44. That is, the read signal S41 whose level is equal to or higher (or equal to or lower) than a predetermined level continues for a predetermined period according to the transfer code rule. The abnormality detector 153 therefore measures a period during which the read signal S41 whose level is equal to or higher (or equal to or lower) than the predetermined level is supplied, and detects if the read signal S41 is normal based on the measured period. When the level of the read signal S41 changes from a level equal to or higher (or equal to or lower) than the predetermined level to a level equal to or lower (or equal to or higher) than the predetermined level, the read signal S41 is detected as normal. When the read signal S41 whose level is equal to or higher (or equal to or lower) than the predetermined level is supplied for more than a predetermined period, the read signal S41 is detected as abnormal.

The selector 154 receives a detection signal S42 from the abnormality detector 153 and an external detection signal S43 from an external abnormality detector (not shown), which indicates abnormality in the read signal from the VGA 47, selects either the detection signal S42 or the external detection signal S43 in accordance with a select signal S44 supplied from an HDC 39, and generates a select signal (hold signal) S45. When the external detection signal S43 is not supplied from the external abnormality detector (not shown), the selector 154 may be eliminated. In this case, the detection signal S42 from the abnormality detector 153 is supplied as the hold signal S45 to the FB filter 152.

The FB filter 152 receives a signal having a plurality of bits from the shift register 15 in response to the hold signal S45 having an L level from the selector 154, computes a feedback response and supplies feedback response data S46 to the adder 13. That is, when the read signal is normal, the FB filter 152 performs the normal operation.

In response to the hold signal S45 having an H level from the selector 154, the FB filter 152 supplies a predetermined feedback response to the adder 13. It is preferable that the predetermined feedback response is set to an average value of feedback responses generated by the FB filter 152 when the read signal S41 is normal. The average value is smaller than the maximum value of the feedback response (or greater than the minimum value of the feedback response). That is, when the read signal S41 is abnormal, the FB filter 152 supplies the predetermined feedback response to the adder 13 in place of the feedback response data that has been generated from the abnormal read signal.

The transition detector 155 receives the hold signal S45 from the selector 154 and the decision signal S4 from the decision unit 14 and detects a transitional point of the decision signal S4 from 0 to 1 or from 1 to 0 after the H-level hold signal S45 is supplied. Upon detection of a transitional point, the transition detector 155 supplies a second detection signal S47 having an H level to the approximation circuit 156 for a predetermined period of time.

The H-level pulse width of the second detection signal S47 corresponds to a time (the number of clocks) until the normal decision signal S4 from the decision unit 14 is stored in the last-stage register in the shift register 15.

The approximation circuit 156 receives the decision signal S4 from the decision unit 14, and stores the decision signal S4 in a register 157 in response to the H-level second detection signal S47. The approximation circuit 156 generates approximated feedback response data using the decision signal S4 stored in the register 157, and supplies the approximated feedback response data S48 to the FB filter 152. In response to the H-level second detection signal S47, the FB filter 152 supplies the approximated feedback response data S48 to the adder 13. During the H-level duration of the second detection signal S47, therefore, the approximated feedback response data S48 is supplied to the adder 13. In response to the L-level second detection signal S47, the FB filter 152 generates feedback response data using the decision signal S4 stored in the shift register 15.

Figure 50:
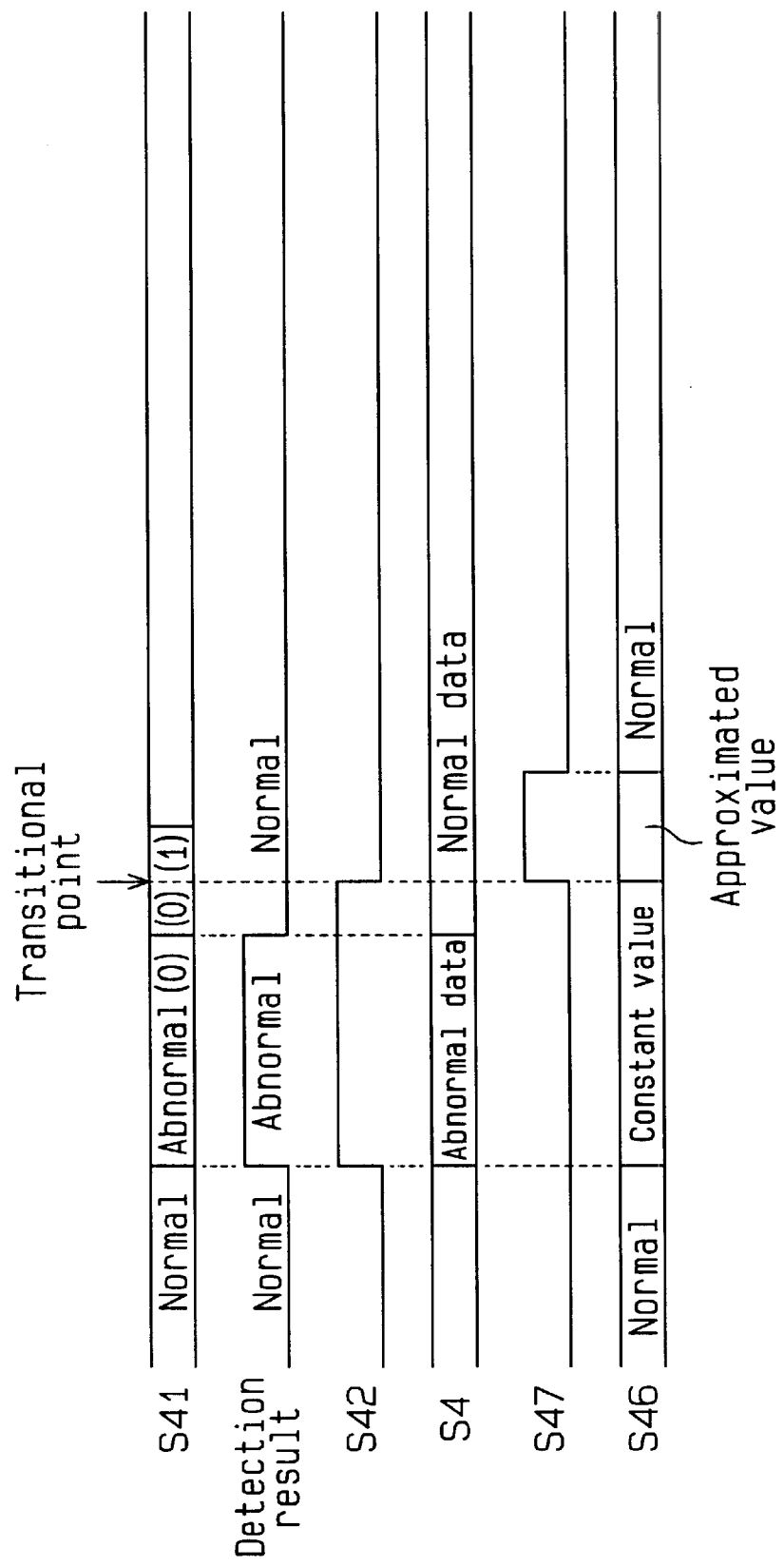
FIG. 50 is a signal waveform diagram illustrating the operation of the DFE of FIG. 49.

The operation of the DFE 151 will now be discussed referring to FIG. 50. When the abnormality detector 153 detects an abnormality in the read signal S41, the H-level first detection signal S42 is supplied to the selector 154. The selector 154 supplies the H-level first detection signal S42 (hold signal S45) to the FB filter 152 in accordance with the select signal S44. In response to the H-level hold signal S45, the FB filter 152 supplies a predetermined feedback response to the adder 13. At this time, the feedback response is smaller than the feedback response based on the abnormal read signal. Therefore, a feedback response close to the feedback response that is based on the normal read signal S41 is supplied to the adder 13. This prevents divergence of the FB loop caused by the feedback response that is based on the abnormal read signal. The supply of a predetermined feedback response at the abnormal time shortens the time for the FB loop to return to the normal state based on the feedback response that is generated on the basis of the normal read signal when the read signal S41 returns to the normal state. That is, as a feedback response at the abnormal time has an average value, the FB loop quickly returns to the normal state. Since a feedback response based on an abnormal read signal has a maximum value (or minimum value), however, it takes time for the FB loop to return to the normal state after the read signal returns to the normal state.

When the read signal S41 returns to the normal state, the abnormality detector 153 sends the L-level first detection signal S42 to the transition detector 155. The transition detector 155 detects a transitional point of the decision signal S4 output from the decision unit 14 and supplies the H-level second detection signal S47 to the approximation circuit 156 and FB filter 152 for a predetermined period of time. In response to the H-level second detection signal S47, the approximation circuit 156 stores the decision signal S4 in the register 157 and generates an approximated feedback response using the stored decision signal S4. The FB filter 152 receives the approximated feedback response data S48 and supplies the data S48 to the adder 13. The approximated feedback response is an approximation of the feedback response based on the normal decision signal S4. That is, the approximated feedback response is closer to the normal feedback response than the feedback response based on an abnormal read signal. In response to the L-level second detection signal S47, the FB filter 152 quickly forms the FB loop based on the normal read signal.

In the ninth embodiment, the abnormality detector 153 may be provided in a signal processor outside the DFE 151 or in the hard disk device 31. Further, the abnormality detector 153 may be provided in the MPU 37 or HDC 39.

Tenth Embodiment

Figure 51:
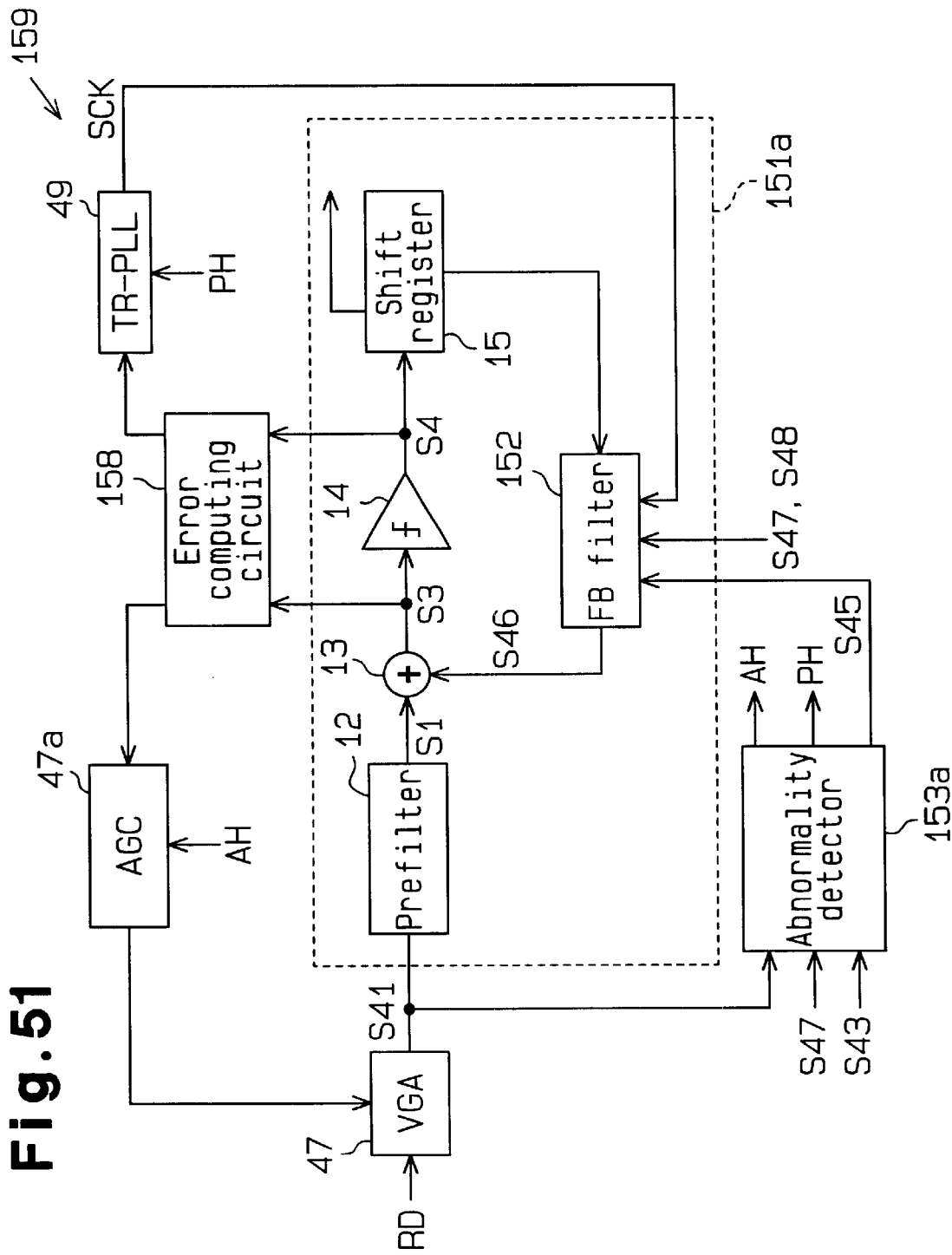
FIG. 51 is a schematic block diagram of a DFE according to a tenth embodiment of the present invention.

FIG. 51 is a partial schematic block diagram of a signal processor 159 according to the tenth embodiment of the present invention. The transition detector 155 and approximation circuit 156, which are actually included in a DFE 151a, are not shown in FIG. 51. An error computing circuit 158 receives the output signal S3 of an adder 13 and the decision signal S4 from a decision unit 14, computes an error between both signals, and supplies the computation result to an AGC 47a and TR-PLL 49.

The AGC 47a generates a control signal using the error computation result and sends the control signal to a VGA 47. The VGA 47 amplifies the read signal RD in accordance with the gain based on the control signal, and sends the amplified read signal S41 to the prefilter 12. The TR-PLL 49 performs phase matching of the reference clock signal SCK in accordance with the error computation result.

Figure 52:
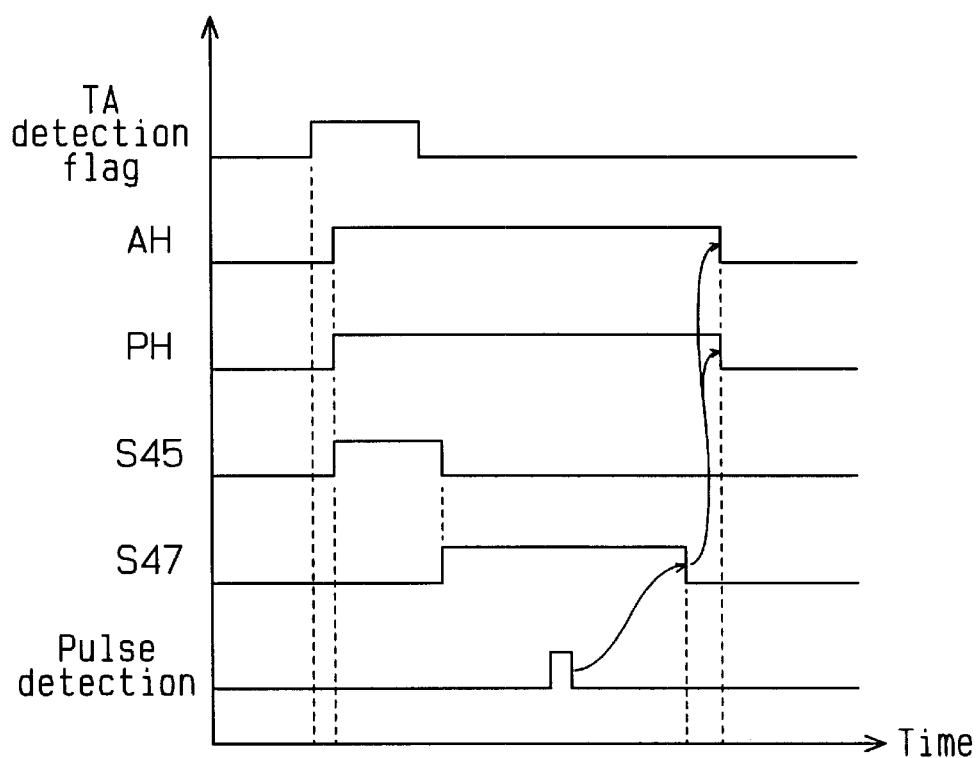
FIG. 52 is a signal waveform diagram illustrating the operation of the DFE of FIG. 51.

An abnormality detector 153a receives the amplified read signal S41 from the VGA 47 and an external detection signal S43, detects if the read signal S41 is normal, and also detects a thermal asperity. As shown in FIG. 52, when an abnormality in the read signal S41 is detected and a thermal-asperity detection flag is set, the abnormality detector 153a respectively supplies hold signals S45, AH and PH having H levels to an FB filter 152, the AGC 47a and the TR-PLL 49.

In response to the H-level hold signal S45, the FB filter 152 stops supplying feedback response data S46 to the adder 13. Stopping the feedback when the read signal is abnormal prevents divergence of the FB loop.

In response to the H-level hold signal AH, the AGC 47a stops supplying the control signal to the VGA 47. At this time, the VGA 47 amplifies the read signal RD in accordance with a predetermined gain. This prevents an abnormality from occurring in the read signal S41 due to the thermal asperity. In other words, divergence of the control loop formed by the VGA 47 and AGC 47a is prevented.

In response to the H-level hold signal PH, the TR-PLL 49 stops phase matching of the system clock signal, and holds the frequency and phase of the current reference clock signal SCK. This prevents divergence of the TR-PLL 49.

The transition detector 155 sends a second detection signal S47 having an L level to the FB filter 152 after a predetermined time elapses since detection of the first pulse of the read signal that has returned to the normal state. In response to the L-level second detection signal S47, the FB filter 152 generates feedback response data and supplies that data to the adder 13. After a predetermined period of time passes since the falling of the second detection signal S47, the abnormality detector 153a respectively supplies the hold signals AH and PH having L levels to the AGC 47a and the TRPLL 49. In response to the L-level hold signal AH, the AGC 47a sends a control signal to the VGA 47. In response to the L-level hold signal PH, the TR-PLL 49 controls the reference clock signal SCK.

Eleventh Embodiment

Figure 53:
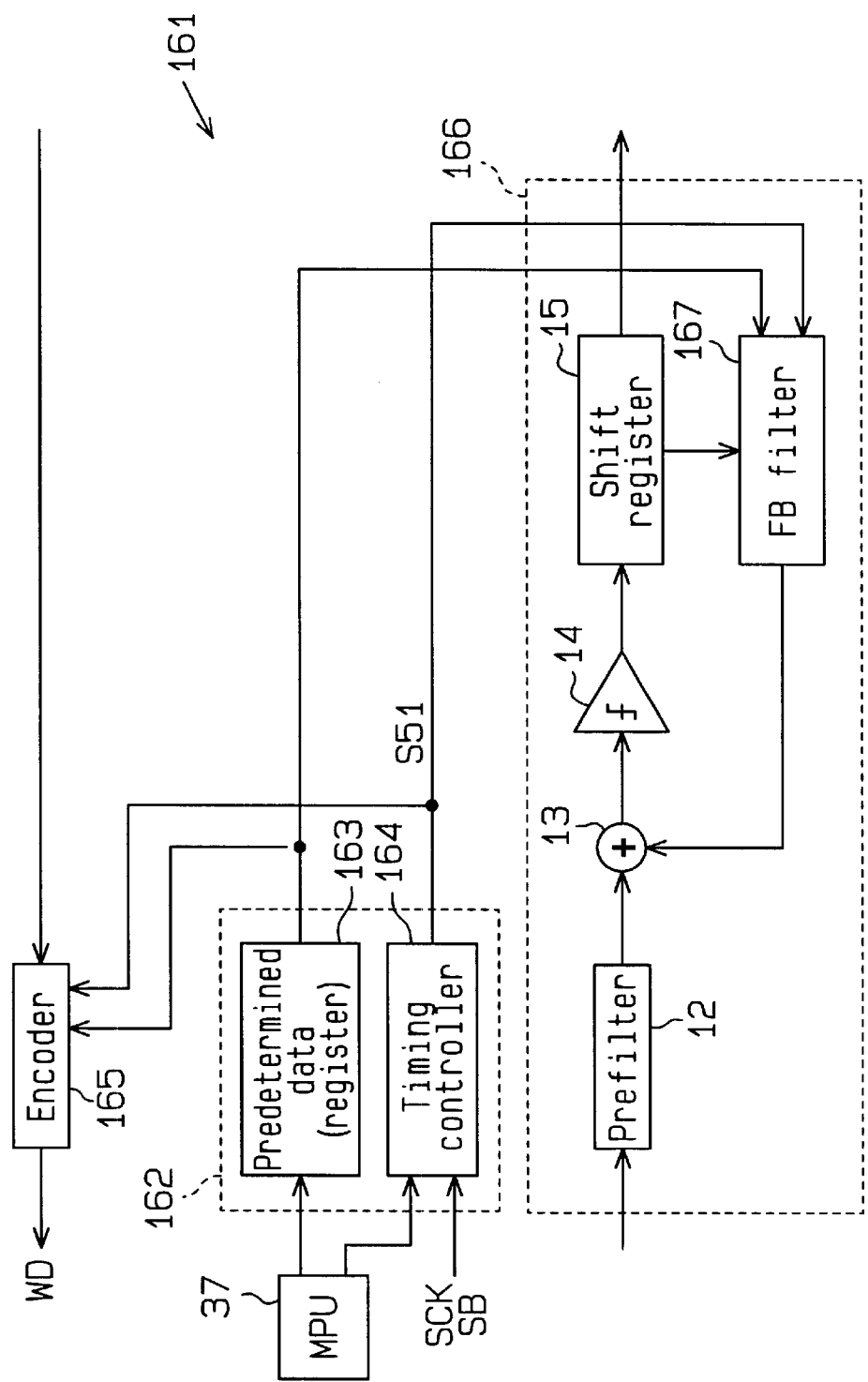
FIG. 53 is a schematic block diagram of a signal processor according t eleventh embodiment of the present invention.

FIG. 53 is a partial schematic block diagram of a signal processor 161 according to the eleventh embodiment of the present invention. Please see FIG. 7 for the other components of the signal processor 161 which are not shown in FIG. 53. The signal processor 161 comprises an encoder 165, a controller 162 and a DFE 166. The controller 162 includes a register 163 and a timing controller 164.

Predetermined detection data (e.g., DDh) supplied from an MPU 37 is stored in the register 163. The predetermined detection data in the register 163 is supplied to the encoder 165 and an FB filter 167 of the DFE 166.

The timing controller 164 receives a timing value from the MPU 37, the clock signal SCK from a PLL circuit 49 and the sync byte signal SB from a control data detector 53, and supplies an interrupt signal S51 based on the timing value to the encoder 165 and FB filter 167 every predetermined interval in accordance with the clock signal SCK. The interrupt signal S51 controls the encoder 165 at the time of writing data, and controls the DFE 166 at the time of reading data.

Data Write Mode

Figure 54A:
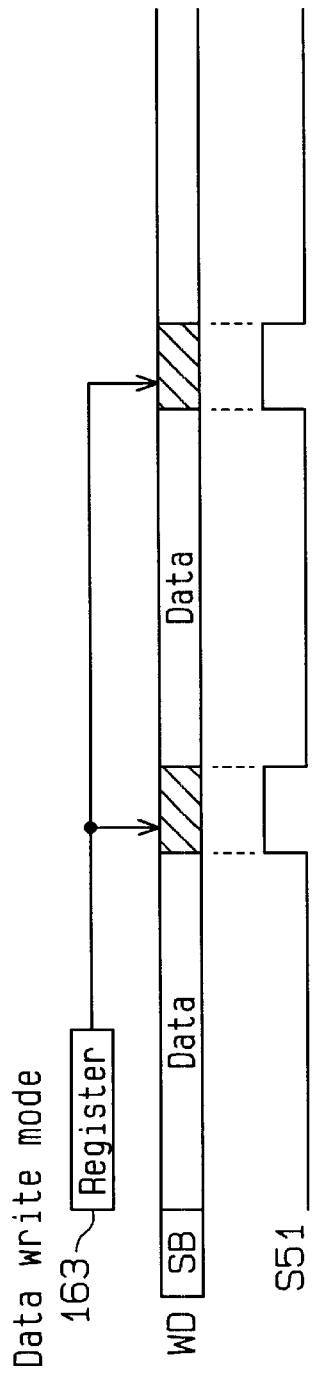
FIGS. 54A and 54B are signal waveform diagrams showing the operation of a timing controller of the signal processor of FIG. 53.

The controller 162 detects the output timing for the sync byte included in write data from the encoder 165. After the sync byte is output from the encoder 165 in accordance with the result of detecting the output timing for the sync byte, the timing controller 164 sends the interrupt signal S51 to the encoder 165. In accordance with the interrupt signal S51, the encoder 165 interrupts outputting of data every predetermined interval and outputs detection data from the register 163, as shown in FIG. 54A. This causes the detection data to be inserted in the write data every predetermined number of bits.

Data Read Mode

Figure 54B:
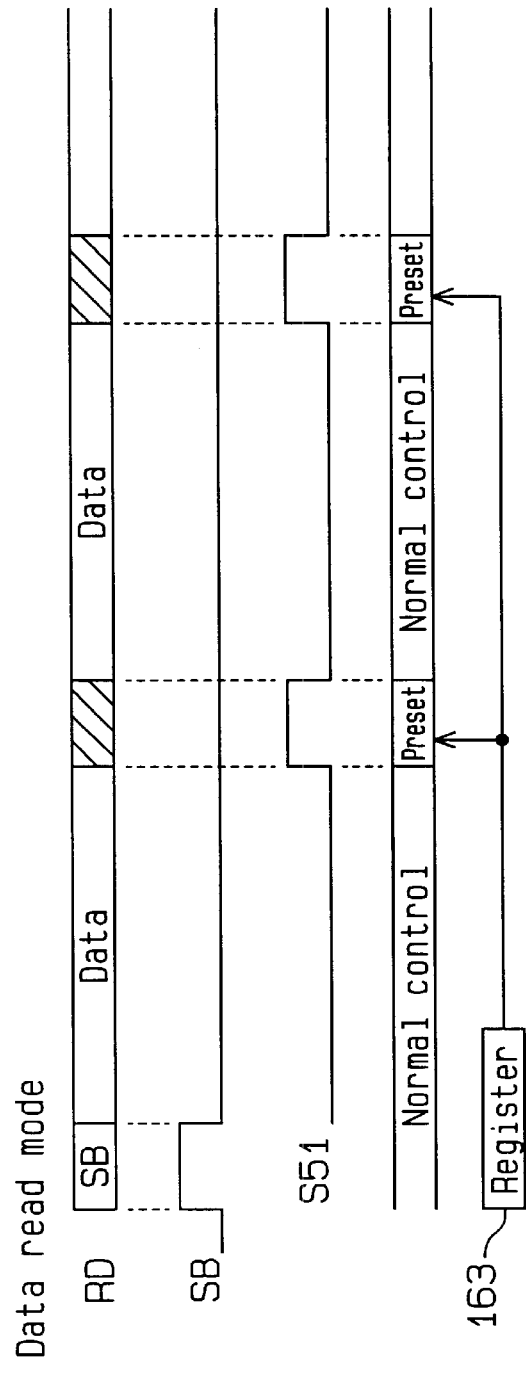

The controller 162 activates the timing controller 164 in response to the sync byte signal SB from the control data detector 53. In accordance with the sync byte signal SB, the MPU 37 detects the start of the data to establish synchronization of the data. As shown in FIG. 54B, the timing controller 164 sends the interrupt signal S51 to the FB filter 167 every predetermined interval using the timing value from the MPU 37 after the detection of the sync byte (i.e., after establishment of synchronization). Further, predetermined detection data stored in the register 163 is supplied to the FB filter 167 at the same time as the interrupt signal S51.

In response to the interrupt signal S51, the FB filter 167 computes a feedback response using the predetermined detection data from the register 163 and supplies the feedback response data to the adder 13. This permits the FB loop to be preset every predetermined interval. The predetermined detection data, which is supplied to the FB filter 167 from the register 163 at the same timing as the interrupt signal S51, has been supplied from the MPU 37 and has not been affected by the status of the magnetic disk 33 and the head unit 34. Thus, the predetermined detection data contains no errors. The FB filter 167 calculates the feedback response using the error-free detection data. This prevents divergence of the FB loop after synchronization has been established. That is, when the decision signal from the decision unit 14 is supplied to the FB filter 167 via the shift register 15 at the same timing as the interrupt signal S51 after presetting of the FB loop, transmission of an error to the feedback response based on the decision signal is avoided.

Twelfth Embodiment

Figure 55:
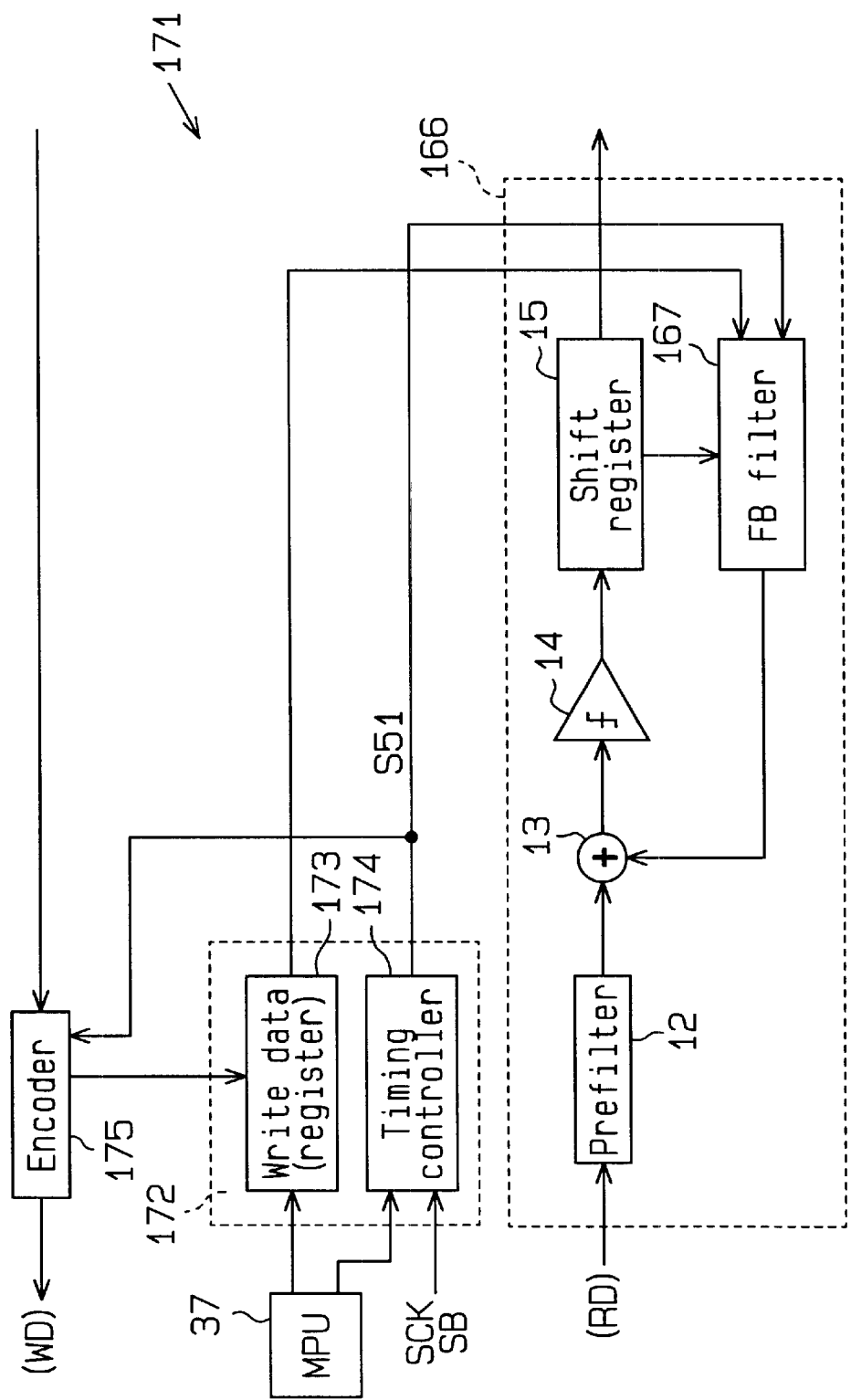
FIG. 55 is a schematic block diagram of a signal processor according to a twelfth embodiment of the present invention.

FIG. 55 is a partial schematic block diagram of a signal processor 171 according to the twelfth embodiment of the present invention. Please refer to FIG. 7 for the other components of the signal processor 171 which are not shown in FIG. 55. The signal processor 171 comprises an encoder 175, a controller 172 and a DFE 166. The controller 172 includes a register 173 and a timing controller 174.

The timing controller 174 supplies an interrupt signal S51 based on the timing value from a CPU 37 to the encoder 175 and FB filter 167 every predetermined interval in accordance with the clock signal SCK. The encoder 175 supplies output data to the controller 172 in response to the interrupt signal S51. The controller 172 stores the output data of the encoder 175 in the register 173 and supplies the stored output data to the FB filter 167.

Data Write Mode

After the sync byte is output from the encoder 175, the timing controller 174 sends the timing-value based interrupt signal S51 to the encoder 175. In accordance with the interrupt signal S51, the encoder 175 also supplies write data to the controller 172. Accordingly, the controller 172 stores the write data from the encoder 175 in the register 173 every predetermined interval as shown in FIG. 56A.

Data Read Mode

As shown in FIG. 56B, after the sync byte is detected, the timing controller 174 sends the timing-value based interrupt signal S51 to the FB filter 167 every predetermined interval, and supplies the write data stored in the register 173 to the FB filter 167 as detection data.

In response to the interrupt signal S51, the FB filter 167 computes a feedback response using the detection data supplied from the register 173, and supplies the feedback response data to the adder 13. This permits the FB loop to be preset every predetermined interval. As the detection data supplied from the register 173 is write data, it has not been affected by the status of the magnetic disk 33 and the head unit 34 at the time of reading. The detection data from the register 163 contains no errors. Therefore, generation of the feedback response using the error-free detection data prevents divergence of the FB loop after synchronization has been established. That is, transmission of an error to the feedback response based on the decision data read from the magnetic disk 33 is avoided.

The twelfth embodiment is particularly effective for a write/read test for checking if data written on the magnetic disk 33 is read correctly. When a write operation and read operation are performed on a single sector or a plurality of (two to about ten) sectors, the amount of data to be stored in the register 173 is relatively small. Therefore, a large-capacity register is not required, thus preventing the area of the signal processor 171 from becoming larger.

In the twelfth embodiment, the FB loop of the DFE 166 is preset in a data read mode using the write data stored in the register 173. It is therefore unnecessary to store predetermined detection data in the register 173. This simplifies the process of the HDC 39 and eliminates the need for a terminal for writing the detection data. This reduces the area of the signal processor .171 and simplifies the circuit structure thereof.

Thirteenth Embodiment

Figure 57:
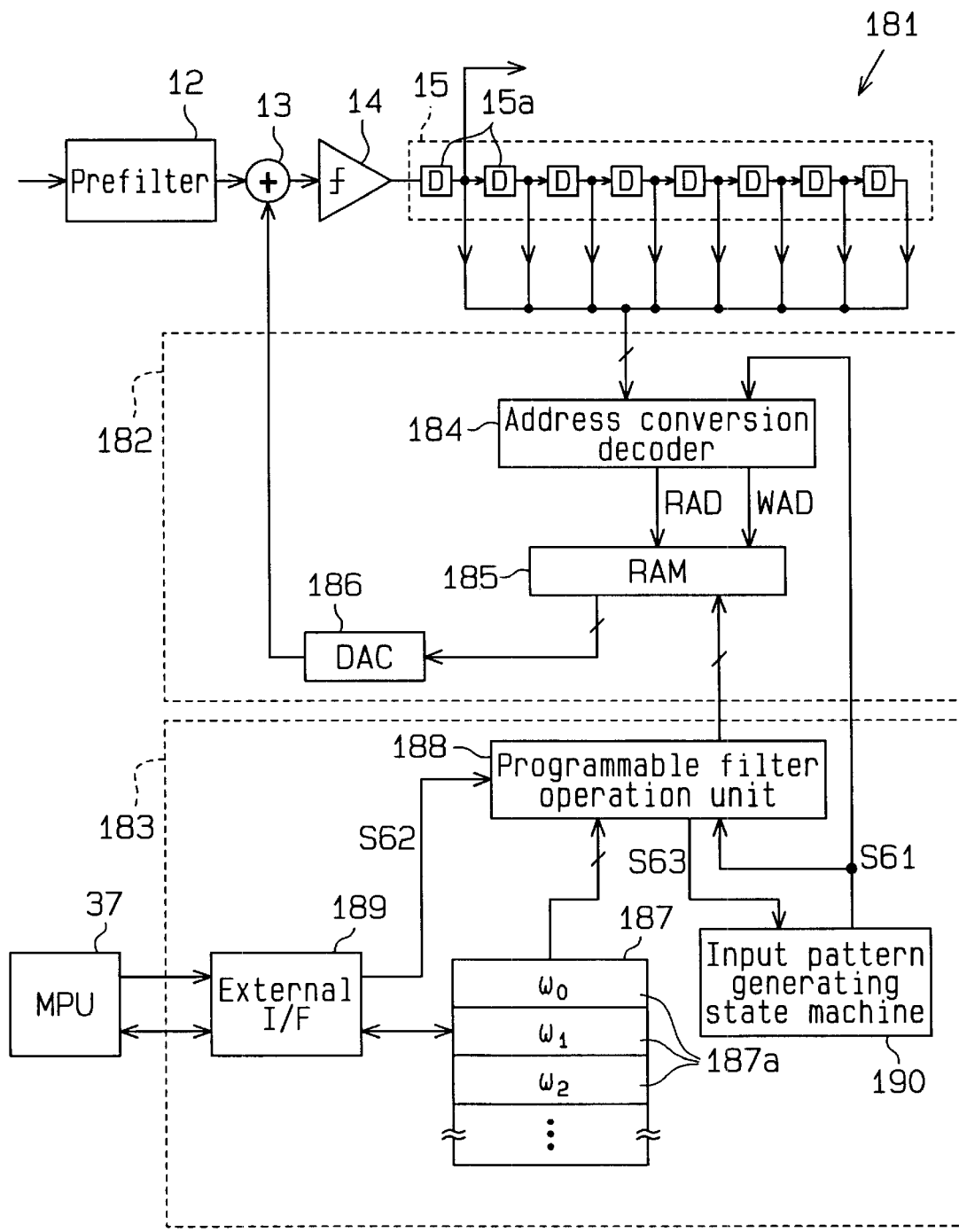
FIG. 57 is a schematic block diagram of a DFE according to a thirteenth embodiment of the present invention.

FIG. 57 is a schematic block diagram of a DFE 181 according to the thirteenth embodiment of the present invention. The DFE 181 includes a prefilter 12, an adder 13, a decision unit 14, a shift register 15, a feedback (FB) filter 182 and a feedback response rewriting circuit 183.

The prefilter 12 receives a read signal from a VGA 47 and filters the read signal to yield a filtered read signal having the maximum S/N ratio. The adder 13 adds the filtered read signal from the prefilter 12 and the output signal of the FB filter 182 together, and sends a signal indicative of the addition result to the decision unit 14. The decision unit 14 compares the voltage of the signal from the adder 13 with a predetermined reference voltage and supplies a decision signal S1 of "1" or "0" to the shift register 15. This ensures conversion of the output signal of the adder 13 to a digital signal.

The shift register 15 includes registers 15a which corresponds in number to the number of taps of the FB filter 182 (eight in this example). Sampling data, which are acquired by sampling the decision signal from the decision unit 14 in accordance with the clock signal, are stored in the registers 15a.

The FB filter 182 includes an address conversion decoder 184, a memory (RAM) 185, and a digital-analog converter (DAC) 186. The address conversion decoder 184 receives sampling data from the shift register 15 and decodes the sampling data. The decoded data is supplied to the RAM 185 as a read address RAD used to select one of a plurality of areas in the RAM 185. Feedback response data consisting of 8 bits, read from the selected area, is supplied to the DAC 186. The DAC 186 converts the feedback response data, read from the RAM 185, to an analog signal and sends the analog signal to the adder 13. The adder 13, the decision unit 14, the shift register 15, the address conversion decoder 184, the RAM 185 and the DAC 186 form a feedback (FB) loop.

The rewriting circuit 183 includes a coefficient register 187, a programmable filter operation unit 188, an external interface (I/F) circuit 189 and an input pattern generating state machine 190. The coefficient register 187 is preferably a readable and rewritable DRAM. Another type of memory like SRAM or EEPROM may be used as the coefficient register 187. The coefficient register 187 has a plurality of areas 187a for respectively storing filter coefficients ω0, ω1, ω2, etc. The individual filter coefficients ω0, ω1, ω2, etc. are rewritable by an MPU 37. Based on servo information read from a magnetic disk 33, the MPU 37 stores one of the filter coefficients ω0, ω1, ω2, etc., which corresponds to the zone where a head unit 34 is located, in the coefficient register 187.

The operation unit 188 receives read zone information from the MPU 37 via the I/F circuit 189 and reads the associated one of the filter coefficients ω0, ω1, ω2, etc. from the coefficient register 187 in accordance with the zone information. The zone information includes position information of the zone and attribute (transfer path characteristic) information of the read signal RD read from a sector located in the zone.

The state machine 190 supplies a state signal S61 corresponding to one of sampling data "00000000" (all 0) to "11111111" (all 1), stored in the shift register 15, to the operation unit 188 and the address conversion decoder 184.

The operation unit 188 receives a start trigger signal S62 from the MPU 37 via the I/F circuit 189, and executes a rewriting process rewriting the feedback response data in the RAM 185 in accordance with a predetermined sequence. Specifically, first, the operation unit 188 sends a start signal S63 to the state machine 190 and reads the associated filter coefficient ω0, ω1, ω2, . . . from the coefficient register 187. In response to the start signal S63, the state machine 190 sends the state signal S61 to the operation unit 188 and address conversion decoder 184. The operation unit 188 generates feedback response data corresponding to the state signal S61 using the state signal S61, the filter coefficient ω0, ω1, ω2, . . . and the zone information, and supplies the feedback response data to the RAM 185.

The address conversion decoder 184 decodes the state signal S61 from the state machine 190 and supplies the decoding result as a write address WAD to the RAM 185. In this manner, the feedback response data supplied from the operation unit 188 is stored in the area in the RAM 185 specified by the write address WAD, thereby rewriting the feedback response data in the RAM 185. The time of rewriting data by the operation unit 188 is shorter than the time of directly rewriting data by the MPU 37. In the thirteenth embodiment, the MPU 37 has only to transfer and rewrite the filter coefficients and to send out the start trigger signal S62. The time needed for this data transfer is shorter than the direct rewriting time. Further, as the amount of transfer data is small, the load on the external I/F circuit 189 is light. Thus, the data transfer speed of the external I/F circuit 189 is relatively fast. With those factors, the time of data rewriting by the operation unit 188 is shorter than the time of direct data rewriting by the MPU 37. This shortens the time of data rewriting in each zone, thus speeding up the reading of the read signal.

In a case where the contents of the RAM 185 are rewritten by the MPU 37 directly, the MPU 37 outputs the write address WAD and feedback response data repeatedly by the number of data stored in the RAM 185. In this case, the amount of output data of the MPU 37 is significantly larger than the amount of output data of the MPU 37 in the thirteenth embodiment (filter coefficients and start trigger signal S62). When reading is carried out over a plurality of zones, the MPU 37 should rewrite all the contents of the RAM 185 zone by zone. When the contents of the RAM 185 are rewritten by the MPU 37 directly, the amount of output data of the MPU 37 becomes significantly large, resulting in a longer data transfer time. Further, the increased amount of output data puts a considerable load on the external interface including the bus 41, lowering the data transfer speed. This increases the rewriting time, which stands in the way of speeding up the reading process.

Fourteenth Embodiment

Figure 58:
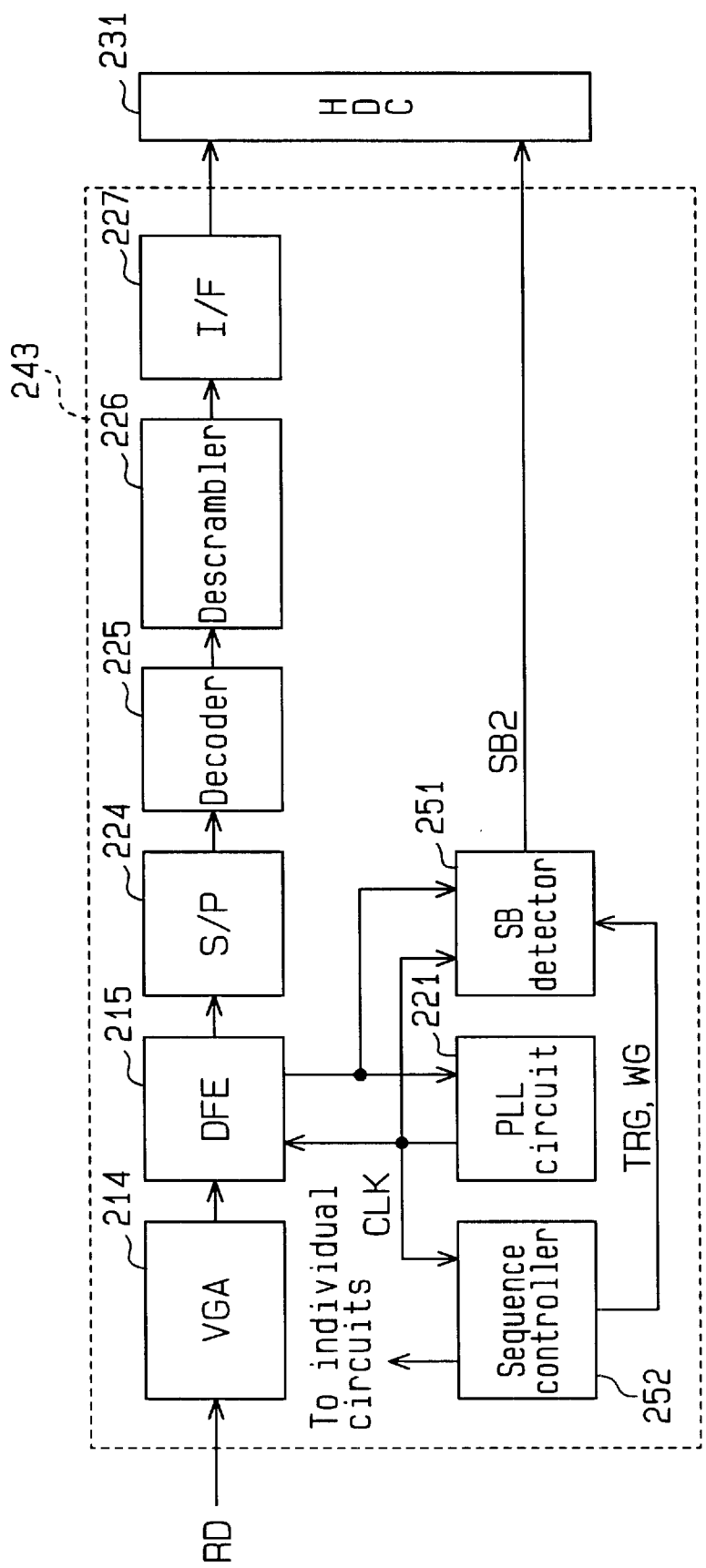
FIG. 58 is a schematic block diagram of a signal processor according to a fourteenth embodiment of the present invention.

FIG. 58 is a schematic block diagram of a signal processor 243 according to the fourteenth embodiment of the present invention. The signal processor 243 has a variable gain amplifier (VGA) 214, a decision feedback equalizer (DFE) 215, a serial-parallel (S/P) converter 224, a decoder 225, a descrambler 226, an interface (I/F) circuit 227, a timing recovery PLL circuit (TR-PLL) 221, a sync byte (SB) detector 251 and a sequence controller 252.

Figure 59:
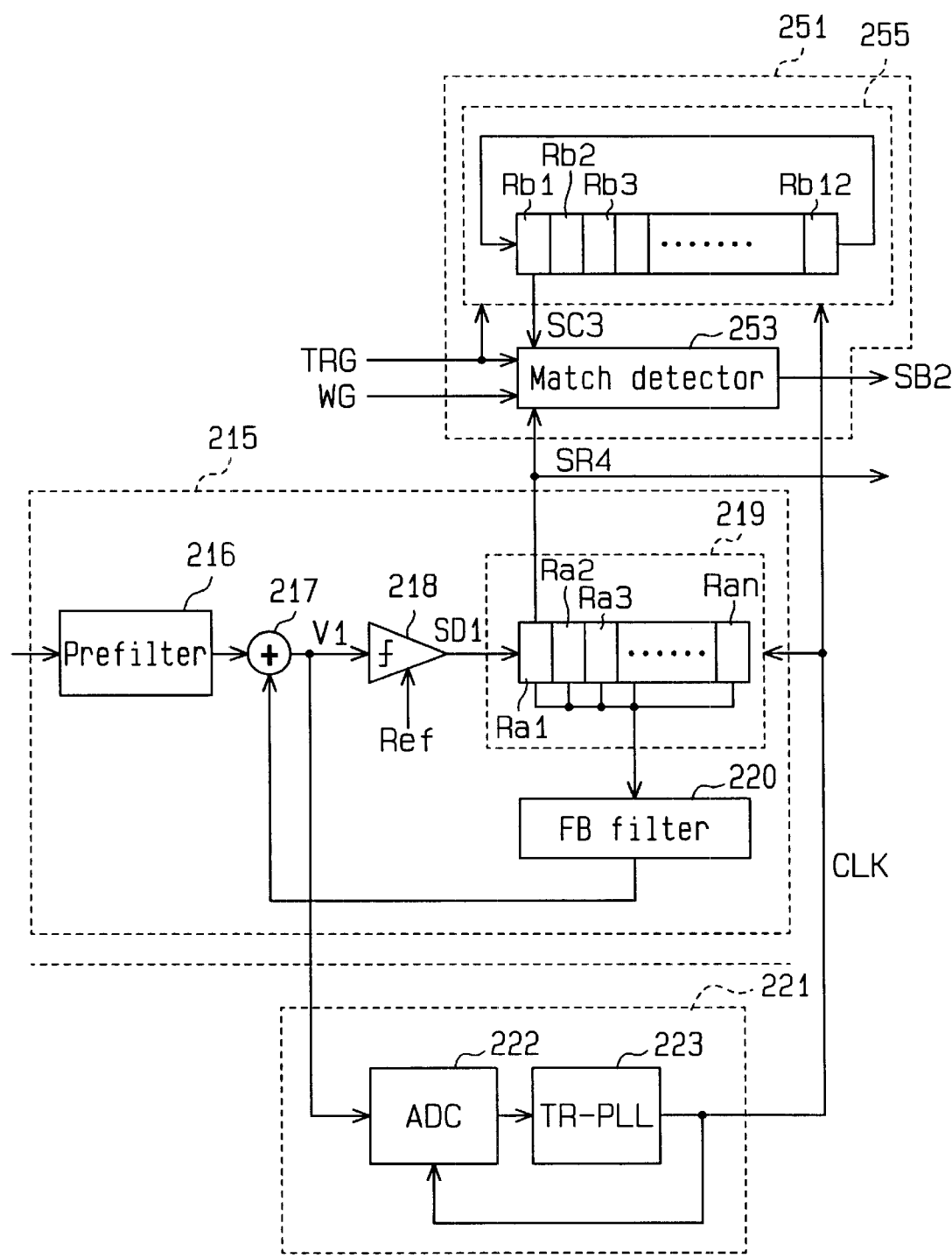
FIG. 59 is a schematic block diagram of a DFE, a TR-PLL and a SB detector of the signal processor of FIG. 58.

FIG. 59 is a schematic block diagram of the DFE 215, TR-PLL 221 and SB detector 251. The DFE 215 includes a prefilter 216, an adder 217, a decision unit 218, a shift register 219 and a feedback (FB) filter 220. The shift register 219 includes n stages of registers Ra1 to Ran corresponding in number to the number of taps (n) of the FB filter 220.

Figure 60:
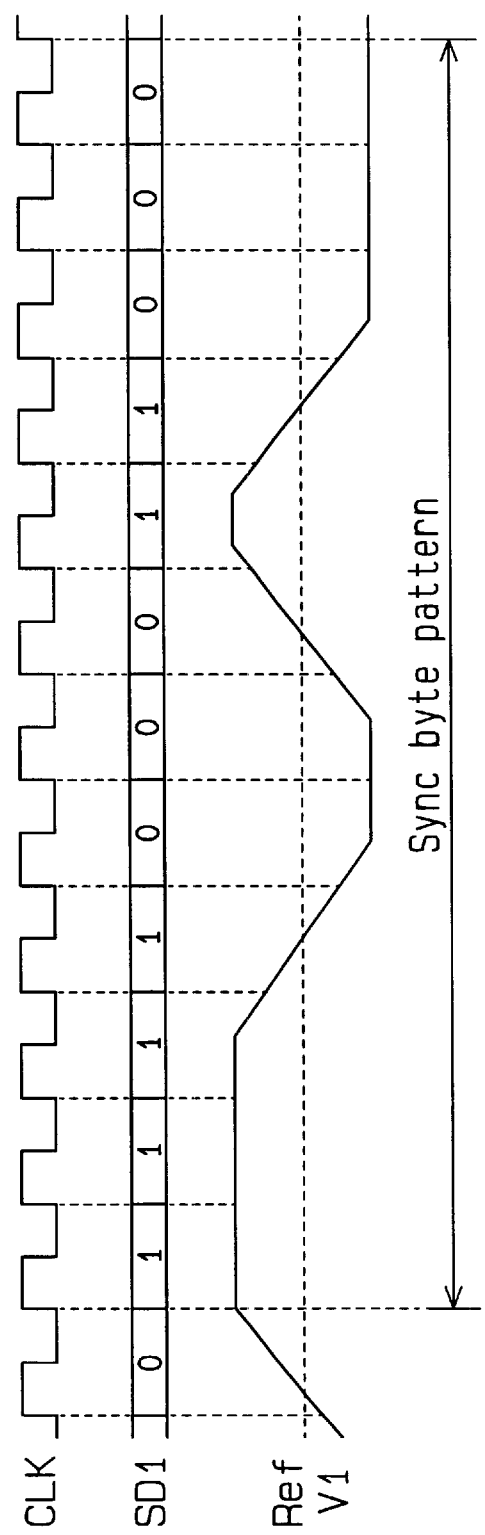
FIG. 60 is a diagram depicting the pattern of a sync byte used of the signal processor of FIG. 58.

As shown in FIG. 60, the decision unit 218 compares an output voltage V1 from the adder 217 with a predetermined reference voltage Ref and generates a decision signal SD1 of "1" or "0". That is, the decision unit 218 samples the output signal V1 of the adder 217 in accordance with the reference clock signal, thereby producing the decision signal (digital signal) SD1 of one bit.

The decision signal SD1 supplied from the decision unit 218 is sampled in accordance with a clock signal CLK, and the sampling data is stored in the first-stage register Ra1. The sampling data stored in the first-stage register Ra1 is sequentially shifted to the registers at the subsequent stages in synchronism with the clock signal CLK. This permits old sampled data of a plurality of (n) bits to be stored in the registers Ra1 to Ran.

The TR-PLL 223 receives the read signal of the preamble from the adder 217 via the ADC 222, and generates a clock signal whose phase substantially matches that of the preamble read signal. When the TR-PLL 223 receives the read signal of the sync byte following the preamble from the adder 217 via the ADC 222, the TR-PLL 223 performs frequency matching of the clock signal CLK at each point where the state of the sync byte read signal changes. The TR-PLL 223 compares the phase of the sync byte read signal with that of the clock signal CLK at each transitional point, and changes the frequency of the clock signal CLK based on the comparison result. In the fourteenth embodiment, therefore, the sync byte pattern is designed to include transitional points.

Specifically, as shown in FIG. 60, the sync byte includes points where the bit changes from "0 to 1" and "1 to 0" as in the bit sequence pattern of 12 bits "111100011000," for example. The sync byte pattern is formed by a combination of the pattern "11110" with a long bit inversion duration and the pattern "10110" with a short bit inversion duration. This bit inversion duration may be changed as needed. That is, the sync byte pattern is formed by a combination of a coarse pattern with a long signal-state transition duration and a dense pattern with a short signal-state transition duration. It is to be noted that the pattern of the preceding preamble ends with a bit "0". Therefore, a pattern with a long duration following the preamble is "011110".

The TR-PLL 223 also performs frequency matching of the clock signal CLK in the sync byte reading period which follows the preamble reading period. That is, the use of the sync byte elongates the period in which frequency matching by the TR-PLL 223 is possible. This allows the TR-PLL 223 to implement frequency matching of the clock signal CLK using the sync byte as well as the preamble even if the preamble reading period becomes shorter when the number of rotations of a magnetic disk 211 increases. Accordingly, the shift register 219 accurately samples the decision signal SD1 in accordance with the clock signal. This reduces the number of decision errors, thus preventing divergence of the FB loop. Further, forming the sync byte with coarse and dense patterns makes detection of the phase difference between the clock signal and the read signal easier than the case where the preamble is formed with the same patterns. This makes it possible to carry out effective frequency matching of the clock signal.

The SB detector 251 includes a circulator 255 and a match detector 253. The circulator 255 is preferably a cyclic register. The circulator 255 has registers Rb1 to Rb12 which correspond in number to the number of bits of the 12-bit sync byte. Comparison data having the same pattern as the sync byte is stored in the individual registers Rb1–Rb12. The circulator 255 receives a trigger signal TRG from the sequence controller 252 and performs a shift operation to circulate the bits of the comparison data stored in the registers Rb1–Rb12 in a predetermined direction in accordance with the clock signal CLK at the rising edge of the trigger signal TRG. At the rising edge of the clock signal CLK, the bits of the comparison data stored in the first to eleventh stages of registers Rb1–Rb11 are shifted to the second to last stages of registers Rb2–Rb12, and the bit stored in the last-stage register Rb12 is shifted to the first-stage register Rb1.

In accordance with the clock signal CLK, the sequence controller 252 supplies the H-level trigger signal TRG to the circulator 255 and match detector 253 for a predetermined period (e.g., one period of the clock signal CLK) in synchronism with the timing of reading the head bit of the sync byte. The sequence controller 252 counts the clock signal CLK since the head bit of the preamble has been read, and detects the read timing for the head bit of the sync byte. The number of bits of the preamble has been set to a predetermined number of bits in advance, and the head bit of a sector matches with the head of the preamble. The read timing for the head bit of the sync byte is therefore easily detected by counting the clock signal CLK at the same time as reading the preamble starts.

Figure 61:
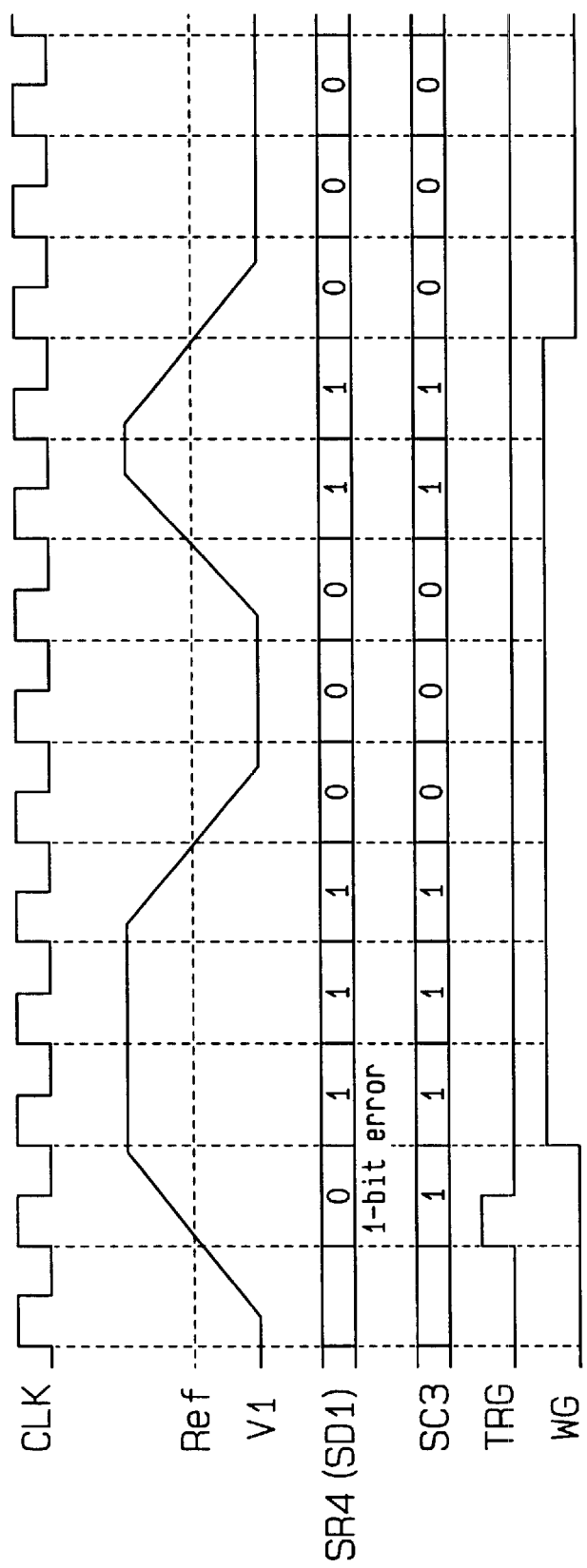
FIG. 61 is a signal waveform diagram explaining the operation of the signal processor of FIG. 58.

After a predetermined period (one period of the clock signal CLK) passes since the rising edge of the trigger signal TRG, the sequence controller 252 supplies a window signal WG having an H level to the match detector 253 for a predetermined period (eight periods in FIG. 61). The sequence controller 252 may output the H-level window signal WG after two or more periods of the clock signal CLK elapse since the rising edge of the trigger signal TRG. The output duration of the H-level window signal WG may be seven or less periods of the clock signal CLK, or nine or more periods thereof.

The match detector 253 receives 1-bit data from the first-stage register Ra1 in the shift register 219 as a reproduced bit signal SR4, and 1-bit data from the first-stage register Rb1 as a comparison bit signal SC3. In response to the rising of the trigger signal TRG, as shown in FIG. 61, the match detector 253 compares the 8-bit comparison bit signal SC3 with the 8-bit reproduced bit signal SR4 while the window signal WG is held at the H level. When the comparison bit signals SC3 all match the reproduced bit signals SR4 while the window signal WG is held at the H level, the match detector 253 outputs a sync byte detection signal SB2. This operation of the match detector 253 increases the probability of detecting the sync byte, thus ensuring easier establishment of byte synchronization.

Further, the number of bits to be compared by the match detector 253 is smaller than that in a case where 12-bit comparison data is compared with 12-bit decision data. Therefore, the probability that both data match each other is high. If the 8-bit comparison bit signal SC3 matches the 8-bit reproduced bit signal SR4, it is probable that the remaining four bits of both signals will match. Thus, the match detector 253 outputs the sync byte detection signal SB2 relatively quickly and easily.

It is preferable that comparison of the comparison bit signal SC3 with the reproduced bit signal SR4 is performed after a predetermined period passes since the rising of the trigger signal TRG. This is because when synchronization of the clock signal CLK is insufficient, the head bit of the sync byte or a plurality of bits from the head bit may contain an error, as shown in FIG. 61. By comparing the comparison bit signal SC3 with the reproduced bit signal SR4 after the head bit of the sync byte or a plurality of bits from the head bit pass, therefore, the match detector 253 detects the sync byte accurately and quickly. The HDC 231 receives the sync byte detection signal from the match detector 253 and processes user data which is supplied following the sync byte. The time for the HDC 231 to receive user data since reading has started therefore becomes relatively short.

When the comparison bit signal SC3 does not match with the reproduced bit signal SR4, the match detector 253 stores the comparison bit signal SC3 in the first-stage register Ra1 of the shift register 219. This causes the error-containing reproduced bit signal SR4 to be rewritten with the comparison bit signal SC3. This rewriting is possible because the sync byte of the reproduced bit signal SR4 is synchronized with the sync byte of the comparison bit signal SC3. That is, in response to the trigger signal TRG supplied from the sequence controller 252, the match detector 253 simultaneously receives the head bit of the sync byte (reproduced bit signal SR4) and the head bit of comparison data (comparison bit signal SC3). When a bit error occurs, writing the correct comparison bit signal SC3 in the register Ra1 prevents divergence of the FB loop of the DFE 215 which originated from error transmission during the sync byte reading period.

Figure 62:
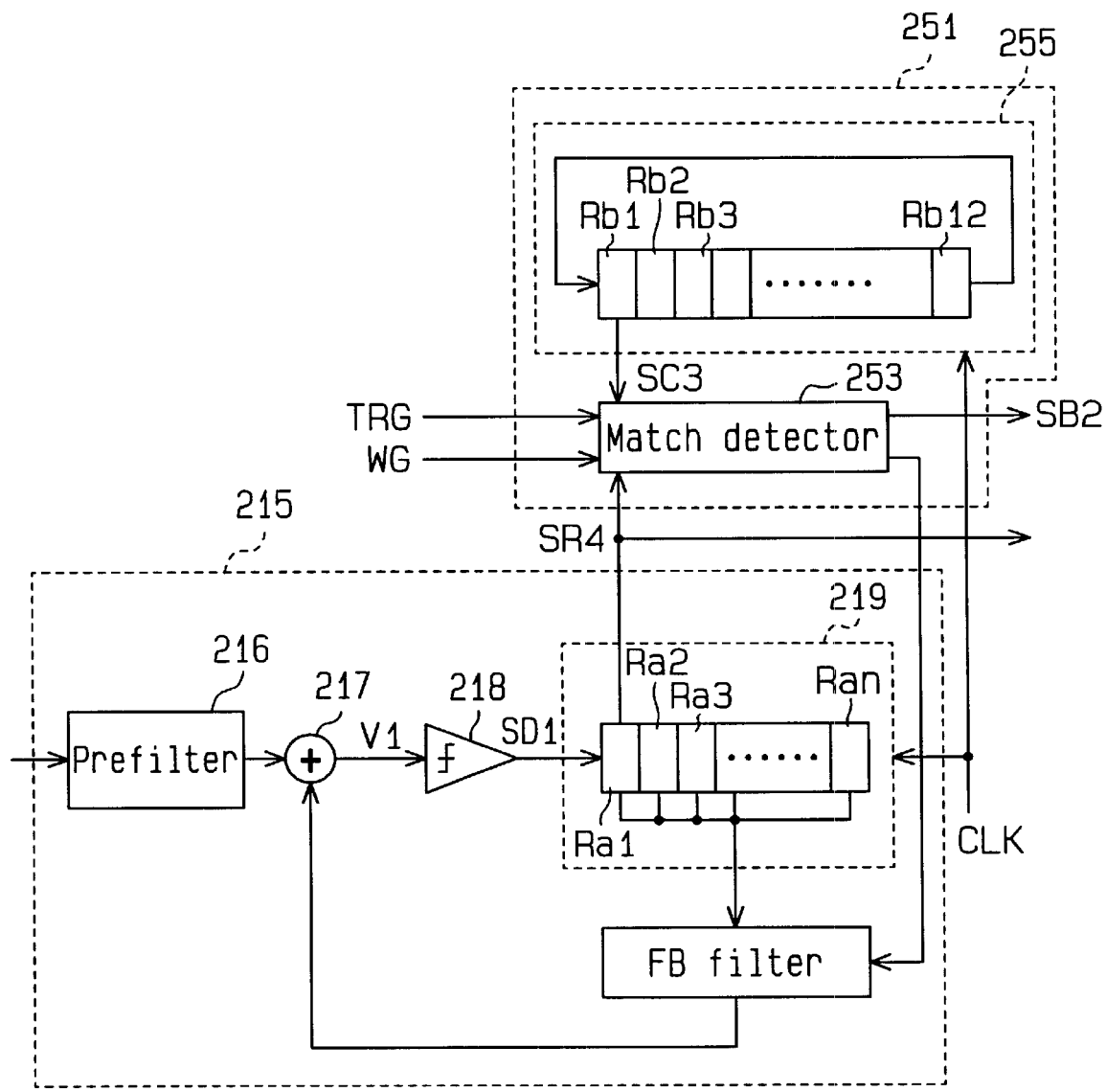
FIG. 62 is a schematic block diagram of a DFE and a SB detector according to a modification of the fourteenth embodiment of the invention.

FIG. 62 is a schematic block diagram of the DFE 215 and SB detector 251 according to a modification of the fourteenth embodiment of the invention. When the reproduced bit signal SR4 does not coincide with the comparison bit signal SC3, the match detector 253 directly supplies the comparison bit signal SC3 to the FB filter 220. The FB filter 220 generates feedback response data using the comparison bit signal SC3 and the remaining sampling data from the shift register 219.

Fifteenth Embodiment

Figure 63:
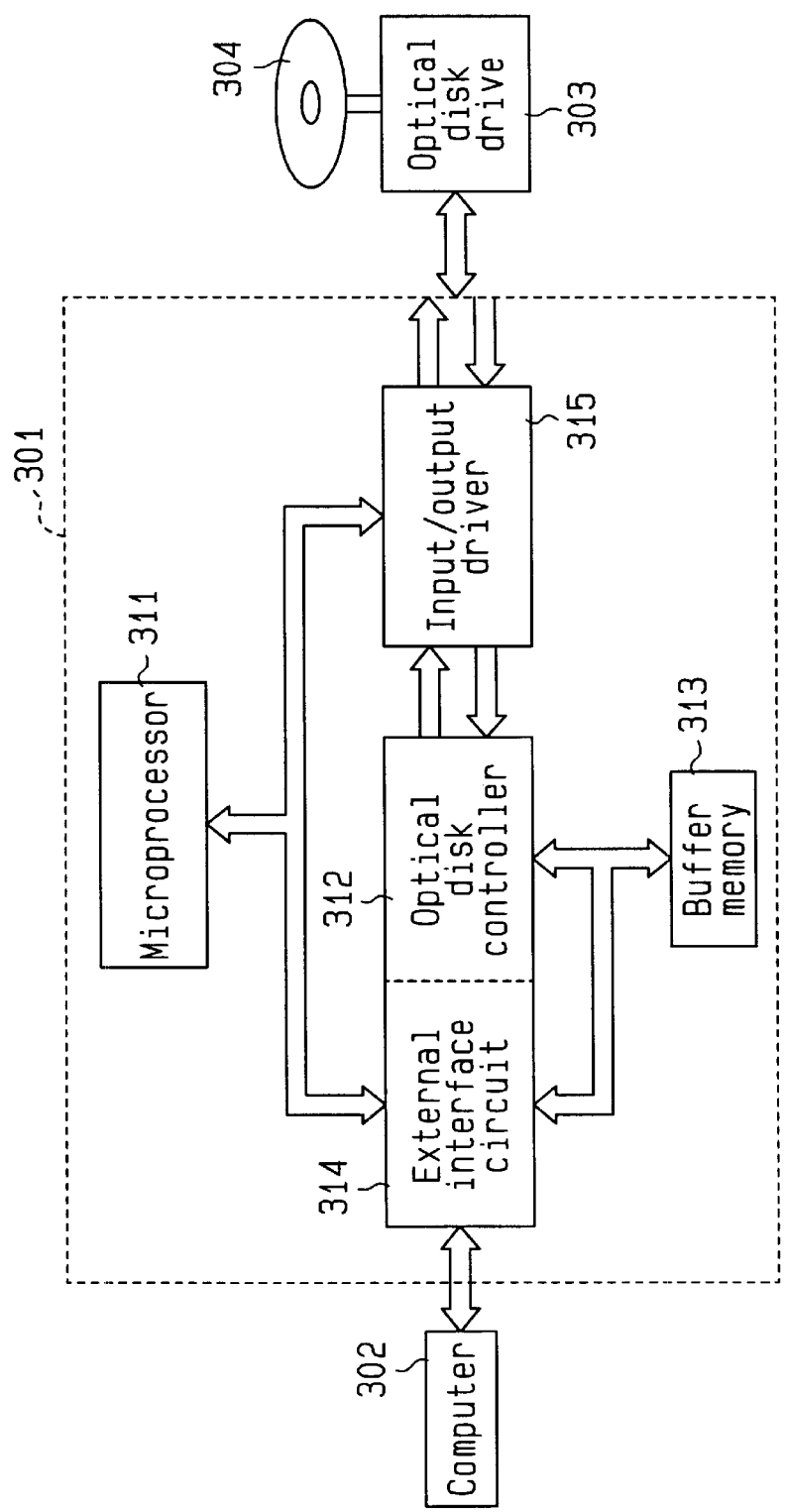
FIG. 63 is a schematic block diagram of an optical disk control apparatus according to a fifteenth embodiment of the present invention.

FIG. 63 is a schematic block diagram of an optical disk control apparatus 301 according to the fifteenth embodiment of the present invention. The optical disk control apparatus 301, connected between a processor or computer 302 and an optical disk drive 303, processes signals read from an optical disk 304 which is rotated at a predetermined speed by the optical disk drive 303, and sends read data to the computer 302. The optical disk control apparatus 301 has a microprocessor 311, an optical disk controller 312, a buffer memory 313, an external interface circuit 314 and an input/output driver 315. The optical disk controller 312 is connected to the computer 302 via the external interface circuit 314. The optical disk controller 312 is further connected to the optical disk drive 303 via the input/output driver 315. The microprocessor 311 controls the optical disk controller 312, the buffer memory 313, the external interface circuit 314 and the input/output driver 315 to supply data recorded on the optical disk 304 to the computer 302.

In response to a command from the microprocessor 311, the optical disk controller 312 sends a command to, and receives status from, the optical disk drive 303 via the input/output driver 315, thereby controlling the optical disk drive 303. The optical disk controller 312 receives a data signal (analog signal), read from a predetermined sector by the optical disk drive 303, via the input/output driver 315 and performs a format decoding process on the data signal. Specifically, the read data signal (analog signal) in a predetermined sector, output from the optical disk drive 303, is converted to a digital signal by the input/output driver 315. When the input/output driver 315 receives an abnormal analog signal from the optical disk drive 303 due to fast rotation of the optical disk 304 or rotational fluctuation of the optical disk 304, the input/output driver 315 sends read information indicating such to the optical disk controller 312. The optical disk drive 303 supplies the optical disk controller 312 with read information indicating that a seek operation for reading data is being carried out.

The optical disk controller 312 removes the sector address and sync pattern from one sector of the read data, and demodulates the remaining user data to a predetermined format. The optical disk controller 312 temporarily stores the demodulated user data in a predetermined area in the buffer memory 313.

Figure 68:
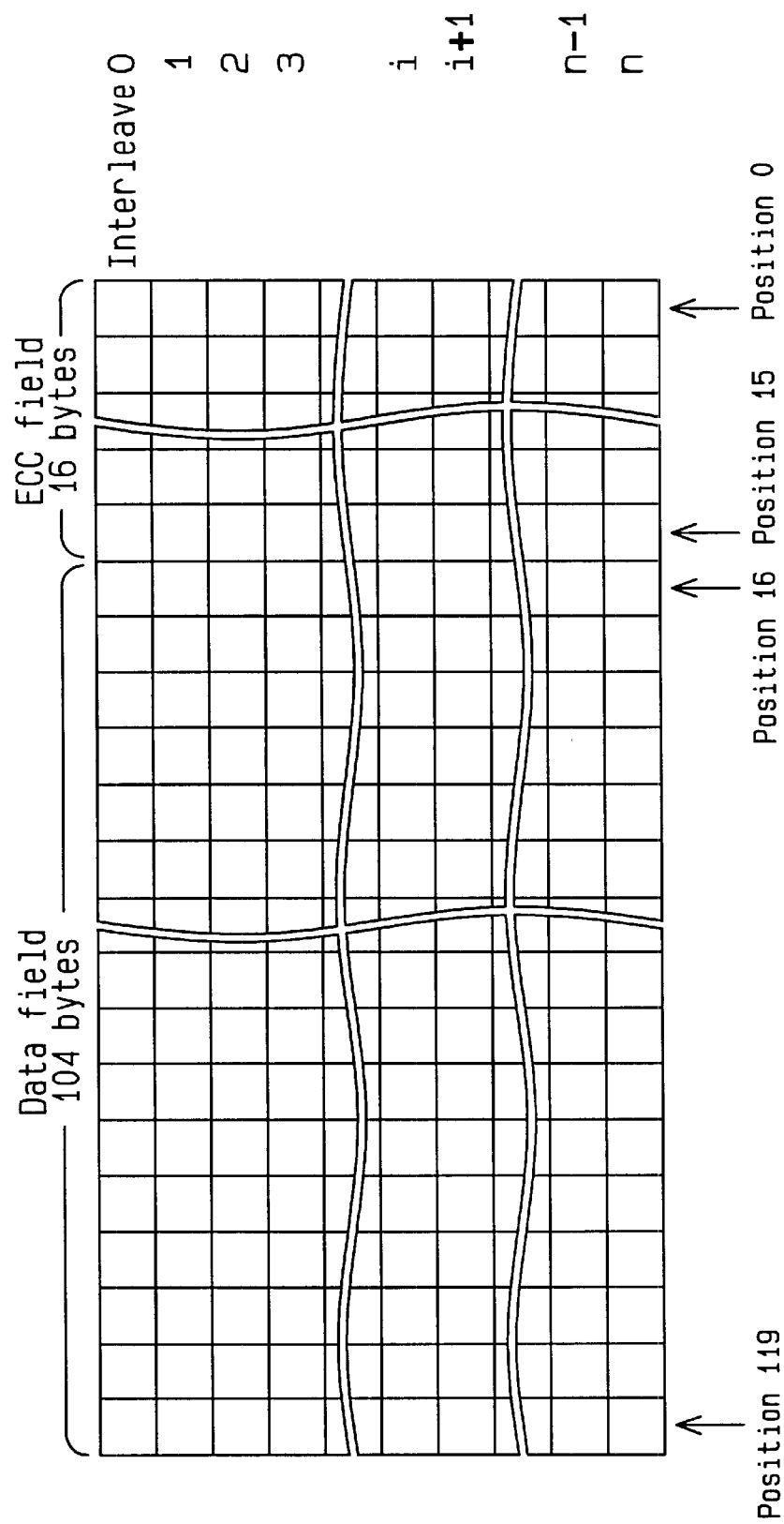
FIG. 68 is a diagram showing the data layout of one sector of optical disk data.

Data coded with a Reed Solomon code according to interleaving is recorded on the optical disk 304 of the fifteenth embodiment. FIG. 68 shows one sector of optical disk data. One sector consists of a plurality of (n) rows (code words) 1 to n called interleaves each consisting of an error correction code (ECC field) and information code (data field). Error correction is executed for each of the interleaves 1 to n. Each of the interleaves 1–n has a code length of 120 bytes of which the lower 16 bytes (i.e., position 0 to position 15) are the ECC field and the upper 104bytes (position 16 to position 119) are the information code (data field). The positions 0 to 119 in each of the interleaves 1 to i are the information code (data field), and the positions 0 to 119 in each of the interleaves (i+1) to n are the error correction code (ECC field) with respect to the information code (data field).

The optical disk controller 312 reads one sector of data from the buffer memory 313 and performs error correction interleave by interleave. Error correction includes (1) a step of generating a syndrome from one sector of data using the error correction code ECC, (2) a step of generating error position/value polynomials in accordance with the Euclidean algorithm using the syndrome, (3) a step of acquiring a solution for the error position/value polynomials by performing chien search, (4) a step of computing error positions and error values based on the solutions, and (5) a step of correcting errors based on the error positions and error values.

When there is an uncorrectable interleave with many errors, the optical disk controller 312 stops error correction on that interleave and corrects an error in the next interleave. When error correction at the positions 0 to 15 in the interleaves 1 to n is completed, it is determined if there is at least one error-uncorrectable interleave. When there is an error-uncorrectable interleave, error correction at the positions 0 to 119 in the interleaves (i+1) to n is carried out using the error correction code (ECC field) at the positions 0 to 119 in the interleaves (i+1) to n. That is, error correction is sequentially implemented on values at the positions 0 to 119 in the interleaves 1 to n. An error in each uncorrectable interleave is corrected in this way. When there is no uncorrectable interleave, error correction is terminated immediately, and error correction on the next, new sector data will be implemented. If there is still an error-uncorrectable interleave, the same error correction is performed again. If there is an error-uncorrectable interleave even after error correction is performed a plurality of times (e.g., three times), error correction on that sector is terminated and the data in the buffer memory is marked as having errors. Thereafter, error values in the sector data stored in the buffer memory 313 are rewritten with correct values in accordance with the error positions of each interleave. In response to a command from the microprocessor 311, the optical disk controller 312 supplies the corrected data, temporarily stored in the buffer memory 313, to the computer 302 via the external interface circuit 314.

Figure 64:
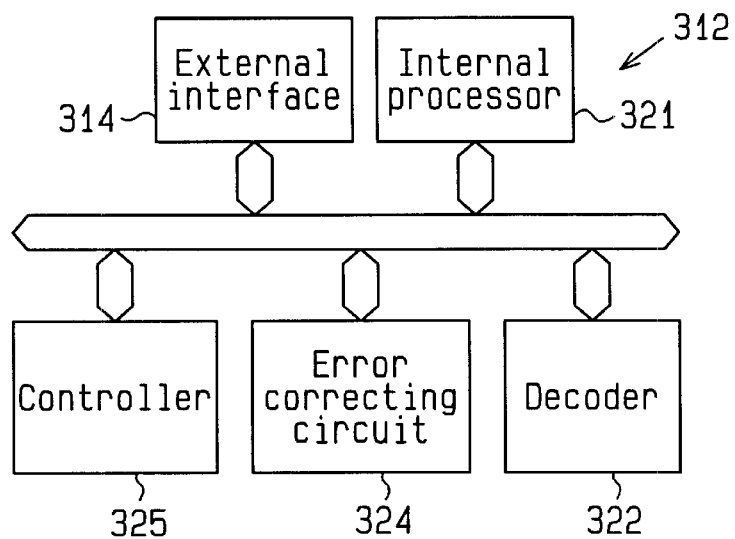
FIG. 64 is a schematic block diagram of an optical disk controller of the optical disk control apparatus of FIG. 63.

FIG. 64 is a schematic block diagram of the optical disk controller 312. The optical disk controller 312 includes an internal processor 321, a decoder 322, an error correcting circuit section 324, an error correcting performance controller section 325 and the external interface circuit 314.

The internal processor 321 exchanges commands with the microprocessor 311 to control the decoder 322, the error correcting circuit section 324, the error correcting performance controller section 325 and the external interface circuit 314. The internal processor 321 also controls the optical disk drive 303 via the input/output driver 315 in response to a command from the microprocessor 311. In response to a command from the microprocessor 311, the internal processor 321 supplies the corrected data stored in the buffer memory 313 to the computer 302 via the external interface circuit 314.

The decoder 322 receives sector data from the input/output driver 315 and decodes the pattern of the sector data to remove ID data, such as the sector address and sync pattern, and the sync pattern in user data from that sector data. The decoder 322 demodulates the remaining user data to a predetermined format, and temporarily stores the formatted data in the buffer memory 313.

Figure 65:
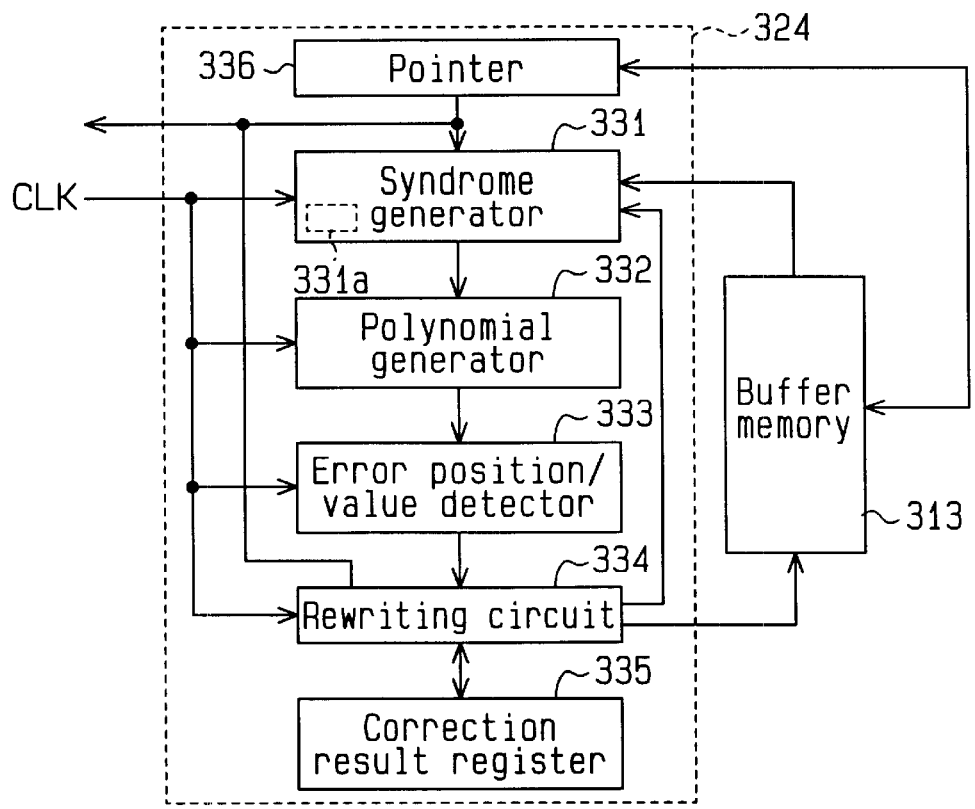
FIG. 65 is a schematic block diagram of an error correcting circuit section of the optical disk controller of FIG. 64.

FIG. 65 is a schematic block diagram of the error correcting circuit section 324. The error correcting circuit section 324 includes a syndrome generator 331, an error position/value polynomial generator (hereinafter called polynomial generator) 332, an error position/value detector (hereinafter called detector) 333, a rewriting circuit 334, a correction result register 335 and a pointer 336.

The syndrome generator 331 acquires a syndrome interleave by interleave (120 bytes) using the sector data stored in the buffer memory 313. The syndrome generator 331 adds a byte at a lower position or a higher position of one interleave (120 bytes) to the individual terms in the syndrome polynomial in accordance with the clock signal CLK. The syndrome generator 331 further acquires a solution of the generated polynomial using the error correcting code in accordance with the clock signal, and substitutes the solution to variables in the individual terms in the syndrome polynomial, thereby generating a syndrome. When there is no error, the syndrome is zero.

The syndrome generator 331 includes a plurality of flip-flop circuits and a multiplier. The multiplier multiplies each byte of one interleave by the solution of the polynomial generated using the error correcting code, and the multiplication results are latched in the individual flip-flops in accordance with the clock signal CLK. The multiplication results latched in the individual flip-flops are supplied as a syndrome to the polynomial generator 332. When the clock signal CLK has a high frequency, therefore, the speed of generating a syndrome is relatively fast.

The polynomial generator 332 receives the syndrome from the syndrome generator 331 and computes a coefficient for the error position polynomial and a coefficient for the error value polynomial by the Euclidean algorithm in accordance with the clock signal CLK using the syndrome. The error position polynomial is used to obtain an error position in an interleave, and the error value polynomial is used to acquire an error value at an error position. When the clock signal CLK has a high frequency, therefore, the speed of calculating the individual coefficients is relatively fast.

The detector 333 receives the coefficients for the error position polynomial and error value polynomial from the polynomial generator 332 and computes solutions of the error position polynomial and error value polynomial by the chain search method using the coefficients. The detector 333 checks one byte (position) in an interleave after each pulse of the clock signal CLK, and corrects an error value, if present, to a correct value. When the clock signal CLK has a high frequency, therefore, the speed of checking the individual bytes in an interleave is relatively fast.

The rewriting circuit 334 receives the error position (byte) and the correct value from the detector 333, and temporarily stores the error position and the correct value in the correction result register 335 in accordance with the clock signal CLK. Based on the error position stored in the register 335 according to the clock signal CLK, the rewriting circuit 334 rewrites the error value in a sector to be subjected to error correction, stored in the buffer memory 313, with the correct value. When the clock signal CLK has a high frequency, therefore, the rewriting speed is relatively fast.

When there is an uncorrectable interleave and error correction has not yet been performed three times, the rewriting circuit 334 instructs the syndrome generator 331 to repeatedly execute error correction. When there is still an uncorrectable interleave even after error correction has been performed three times, the rewriting circuit 334 supplies the internal processor 321 with information indicating that the target sector data cannot be corrected. In accordance with that information, the internal processor 321 instructs re-reading of data from the optical disk 304.

Figure 67:
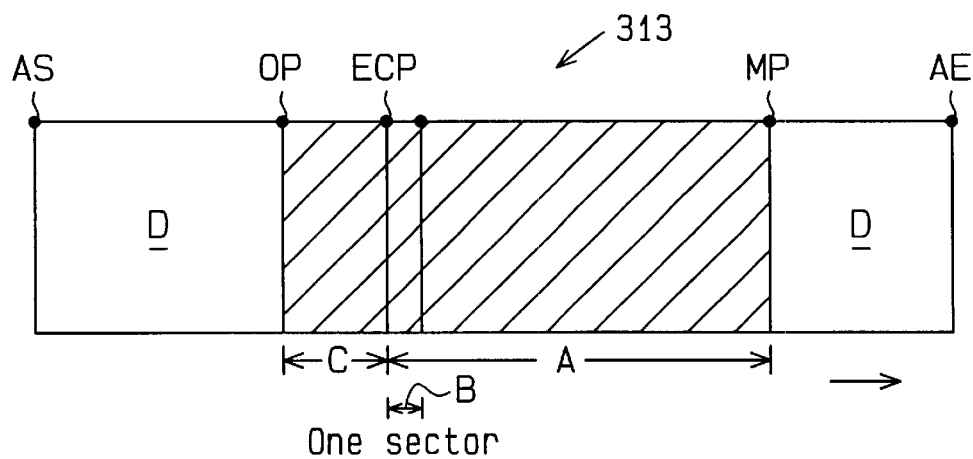
FIG. 67 if a diagram showing the memory area of a memory buffer of the disk controller of FIG. 64.

The pointer 336 stores an address of the data stored in the buffer memory 313. Suppose that an uncorrected data area A, a data-in-correction area B, a corrected data area C, and an empty data area D are defined in the buffer memory 313 as shown in FIG. 67. The data address stored in the pointer 336 includes the next address (write start address MP) to the first or head address of the uncorrected data area A, the last address (check start address ECP) of the data-in-correction area B and the last address (output start address OP) of the corrected data area C.

The decoder 322 stores uncorrected data in the empty data area D in the buffer memory 313 from the write start address MP in the pointer 336. The syndrome generator 331 reads out one sector data from the buffer memory 313 from the check start address ECP. The external interface circuit 314 reads corrected data from the buffer memory 313 in accordance with the output start address OP, and supplies the corrected data to the computer 302.

Data is written in the buffer memory 313 from a first or head address AS to a last address AE. When new uncorrected data is supplied from the decoder 322 to the buffer memory 313 with uncorrected data already written there, the new uncorrected data is written from the write start address MP. When the address of the uncorrected data reaches the last address AE, the uncorrected data is written from the head address AS. Therefore, the write start address MP is updated to the latest write address every time uncorrected data is written.

At the time error correction is initiated, first, one sector of data is read from the buffer memory 313 from the check start address ECP. That is, the uncorrected data that has been written first in the buffer memory 313 is read out first. When one sector of data is rewritten after error correction, the check start address ECP is incremented by an address for one sector. Thus, the area from the check start address ECP to the write start address MP is the uncorrected data area A.

The area from the check start address ECP in the uncorrected data area A to the address for one sector is the data-in-correction area B.

Corrected data is read from the output start address OP of the data that has been corrected first, and is supplied to the external interface circuit 314. Thus, the area from the output start address OP to the check start address ECP is the corrected data area C. The output start address OP is incremented to the next address of the read address of the last data. The corrected data is erased after being read, thus forming the empty data area D. Therefore, the area from the write start address MP to the output start address OP is the empty data area D.

Figure 66:
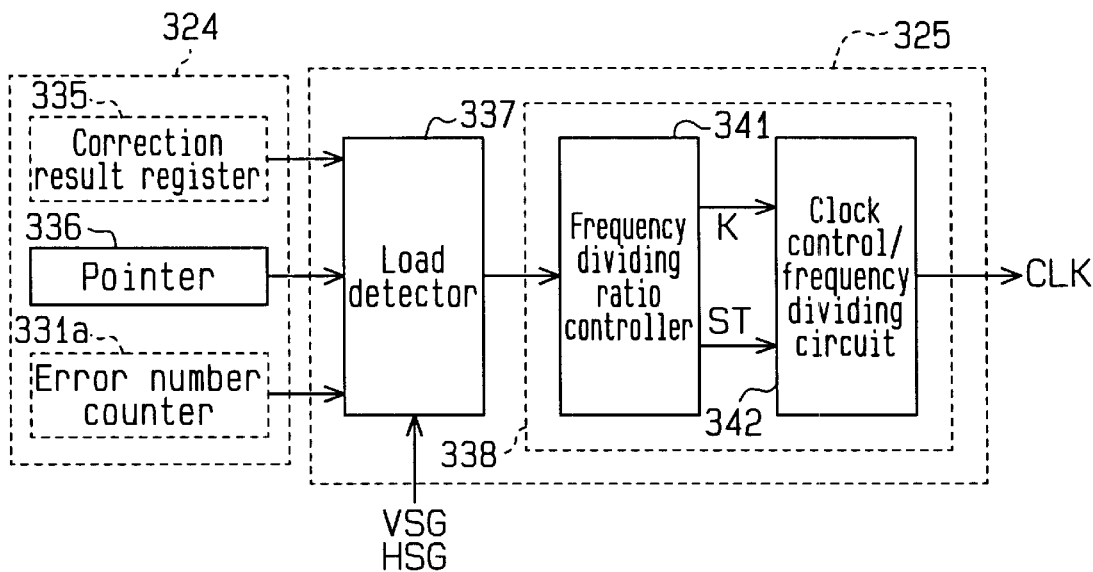
FIG. 66 is a schematic block diagram of a correction performance controller section of the optical disk controller of FIG. 64.

FIG. 66 is a schematic block diagram of the correction performance controller section (hereinafter called controller section) 325. The controller section 325 includes a load detector 337 and a performance controller 338. The load detector 337 detects a load on the error correcting circuit section 324.

The load detector 337 receives the write start address is MP, check start address ECP and output start address OP from the pointer 336, detects a load on the error correcting circuit section 324 and generates a control amount (adjustment signal). When the load is heavy, the control amount ΔTd for increasing the processing speed of the error correcting circuit section 324 is supplied to the performance controller 338. When the load is light, the control amount ΔTu for decreasing the processing speed of the error correcting circuit section 324 is supplied to the performance controller 338. The performance controller 338 shortens the period T of the clock signal CLK (or increases the frequency) in accordance with the control amount ΔTd, and elongates the period T of the clock signal CLK (or decreases the frequency) in accordance with the control amount ΔTu. The processing speed of the error correcting circuit 324 is therefore adjusted in accordance with the load. As a result, the amount of data in the uncorrected data area A and the corrected data area C of the buffer memory 313 are kept at substantially constant sizes. This prevents the capacity of the buffer memory 313 from increasing and prevents occurrence of an overflow originated from reduction in memory capacity.

The load detector 337 further receives external load factor signals including a rotational speed signal VSG and a read disabled signal HSG from the internal processor 321. The rotational speed signal VSG is information about the rotational speed (data reading speed) of the optical disk 304 rotated by the optical disk drive 303. The read disabled signal HSG is information indicating that the input/output driver 315 cannot read data for some reason. When supplied with a high-speed rotation signal VSG, the load detector 337 supplies a signal of the shortest period (first basic period Ta) of the clock signal CLK to the performance controller 338. When supplied with a low-speed rotation signal, the load detector 337 supplies the performance controller 338 with a signal whose period is longer than the shortest period (second basic period Tb) of the clock signal CLK. In this manner, the period T (frequency) of the clock signal CLK or the processing speed of the error correcting circuit section 324 is controlled in accordance with the rotational speed signal VSG. As a result, the uncorrected data area A and the corrected data area C are kept at substantially constant occupying sizes.

When supplied with the read disabled signal HSG, the load detector 337 supplies the performance controller 338 with a stop signal STP for stopping the clock signal CLK.

This prevents unnecessary generation of the clock signal CLK, thus reducing the power consumption. When abnormal read data (analog signal) is output from the optical disk drive 303 due to fast rotation of the optical disk 304 or fluctuation of the optical disk 304, the error correcting circuit section 324 stops operating.

The load detector 337 acquires an occupying size L1 (MP—ECP) of the uncorrected data area A and an occupying size L2 (ECP—OP) of the corrected data area C in the buffer memory 313 using the individual addresses MP, ECP and OP, and performs the following arithmetic operations using the occupying sizes L1 and L2 and predetermined reference values L1k and L2k. The reference value L1k represents the limit of the occupying size of the uncorrected data area A, and corrected data to be stored in the buffer memory 313 would be affected if the occupying size L1 exceeds the reference value L1k. The reference value L2k represents the limit of the occupying size of the corrected data area C, and uncorrected data to be stored in the buffer memory 313 would be affected if the occupying size L2 exceeds the reference value L2k.

$$L1 > L1k, L2 < L2k \qquad (1)$$

The load detector 337 determines that there are many pieces of uncorrected data and the load on the error correcting circuit section 324 is heavy. In this case, error correction takes more time, so that corrected data is reduced. To shorten the period of the clock signal CLK, the load detector 337 supplies a predetermined control amount ΔTd (−ΔT1) to the performance controller 338.

$$L1 < L1k, L2 > L2k \qquad (2)$$

The load detector 337 determines that there are many pieces of corrected data and the load on the error correcting circuit section 324 is light. In this case, the time for error correction is short, so that uncorrected data is reduced and corrected data is increased. To make the period of the clock signal CLK longer, the load detector 337 supplies a predetermined control amount ΔTu (ΔT1) to the performance controller 338.

$$L1 < L1k, L2 < L2k \qquad (3)$$

The load detector 337 determines that the error correcting circuit section 324 has the proper load and the amount of change in uncorrected data and corrected data are adequate. To maintain the period of the clock signal CLK, the load detector 337 supplies a predetermined control amount ΔT0 (0) to the performance controller 338.

$$L1 > L1k, L2 > L2k \qquad (4)$$

The load detector 337 determines that there are many pieces of uncorrected data and corrected data and the load on the error correcting circuit section 324 is abnormal. In this case, both uncorrected data and corrected data are increased. To stop the clock signal CLK, the load detector 337 sends the stop signal STP to the performance controller 338. The supply of the stop signal STP prevents uncorrected data and corrected data, previously stored, from being overwritten by an overflow.

The performance controller 338 includes a frequency dividing ratio controller (hereinafter called controller) 341 and a clock control/frequency-dividing circuit (hereinafter called frequency-dividing circuit) 342. The controller 341 receives the first basic period Ta (or the second basic period Tb), stop signal STP, and control amount ΔTd, ΔTu or ΔT0 from the load detector 337. When receiving the first basic period Ta, the controller 341 computes a frequency dividing ratio K using the first basic period Ta and the control amount ΔTd, ΔTu or ΔT0. When receiving the second basic period Tb, the controller 341 computes the frequency dividing ratio K using the second basic period Tb and the control amount ΔTd, ΔTu or ΔT0.

The computation will now be discussed specifically. When the first basic period Ta is supplied, the period T of the clock signal CLK is first set to the first basic period (the shortest period) Ta. Subsequently, the period T of the clock signal CLK is adjusted in accordance with the control amount ΔTd, ΔTu or ΔT0 (T+ΔTd, ΔTu or ΔT0). It is to be noted however that since the period T of the clock signal CLK is initially the first basic period, the control amount ΔTd (−ΔT1) to make the period shorter is not supplied. When the second basic period Tb is supplied, the period T of the clock signal CLK is first set to the second basic period Tb. Subsequently, the period T of the clock signal CLK is adjusted in accordance with the control amount ΔTd, ΔTu or ΔT0 (T+ΔTd, ΔTu or ΔT0). The period T of the clock signal CLK is updated in this manner every time the control amount ΔTd, ΔTu or ΔT0 is supplied. The controller 341 sets the frequency dividing ratio K for generating the clock signal CLK which has the adjusted period T, and supplies the frequency dividing ratio K to the frequency-dividing circuit 342. When supplied with the stop signal STP, the controller 341 sends a deactivate signal ST to the frequency-dividing circuit 342.

The frequency-dividing circuit 342 receives the frequency dividing ratio K from the controller 341 and generates the clock signal CLK whose period T correlates to the frequency dividing ratio K. The clock signal CLK is supplied to the circuits 331 to 334 in the error correcting circuit section 324. Thus, the error correction speed of the error correcting circuit section 324 is adjusted by the period T of the clock signal CLK. That is, the clock signal CLK which has a relatively short period T increases the error correction speed, and the clock signal CLK which has a relatively long period T lowers the error correction speed. When receiving the deactivate signal ST, the frequency-dividing circuit 342 stops generating the clock signal CLK. Therefore, the clock signal CLK is not supplied to the circuits 331 to 334 in the error correcting circuit section 324. Consequently, the error correcting circuit section 324 stops the error correcting operation.

The operation of the optical disk controller 312 will now be discussed. When recorded data is read from the optical disk 304, the decoder 322 stores uncorrected data in the buffer memory 313. The error correcting circuit section 324 reads the uncorrected data, performs error correction on the read data, and rewrites the uncorrected data with corrected data. The external interface circuit 314 reads the corrected data from the buffer memory 313 and supplies the corrected data to the computer 302. It is assumed that at this time, the controller section 325 has supplied the clock signal CLK with the shortest period T (first basic period Ta) to the error correcting circuit section 324. Thus, error correction is performed at the maximum speed. In this situation, when uncorrected data is reduced and corrected data is increased due to the fast processing or few errors, the state of L1<L1k and L2>L2k occurs.

The load detector 337 determines that the time needed for the error correcting circuit section 324 to implement error correction is relatively short (i.e., the load is light), and supplies the control amount ΔTu for reducing the error correction speed (making the period of the clock signal CLK longer) to the controller 341. The controller 341 updates the period T to the period T+ΔTu using the control amount ΔTu, and sends the frequency dividing ratio K corresponding to the new period T+ΔTu to the frequency-dividing circuit 342. In accordance with the frequency dividing ratio K, the frequency-dividing circuit 342 supplies the clock signal CLK having the period T+ΔTu to the error correcting circuit section 324. This lowers the error correction speed of the error correcting circuit section 324.

When L1<L1k and L2>L2k, even when the period of the clock signal CLK becomes longer, the load detector 337 supplies the control amount ΔTu for lowering the error correction speed of the performance controller 338. Thereafter, the control amount ΔTu is repeatedly supplied until the state comes to L1<L1k and L2<L2k. This process prevents the amount of corrected data in the buffer memory 313 from being increased due to the fast error correction.

When an increase in the number of errors leads to longer error correction, the occupying size L1 of the uncorrected data area A gradually increases and the occupying size L2 of the corrected data area C gradually decreases. When the situation of L1>L1k and L2<L2k occurs, the load detector 337 determines that the load of the error correcting circuit section 324 has increased and the error correction speed should be increased, and supplies the control amount ΔTd to the controller 341. The controller 341 updates the period T to the period T+ΔTd using the control amount ΔTd, and sends the frequency dividing ratio K corresponding to the new period T+ΔTd to the frequency-dividing circuit 342. In accordance with the frequency dividing ratio K, the frequency-dividing circuit 342 supplies the clock signal CLK having the period T+ΔTd to the error correcting circuit section 324. This increases the error correction speed of the error correcting circuit section 324. Thereafter, the control amount ΔTd is repeatedly supplied until the state becomes L1<L1k and L2<L2k. This process prevents the amount of uncorrected data in the buffer memory 313 from being greatly increased due to the slow error correction caused by an increase in the number of errors.

When the internal processor 321 supplies the low-speed rotational signal VSG to the load detector 337 during error correction, the load detector 337 sends the second basic period Tb to the performance controller 338. The performance controller 338 acquires the frequency dividing ratio K corresponding to the second basic period Tb and generates the clock signal CLK having the period T (second basic period Tb) according to the frequency dividing ratio K. This clock signal CLK has a relatively long period corresponding to the low rotational speed. Thus, the error correction speed becomes lower in association with the low rotational speed. Thereafter, the control amount ΔTd, ΔTu or ΔT0 is computed using the occupying sizes L1 and L2 and the reference values L1k and L2k, and adjusts the period T (or the clock signal CLK) based on that control amount. Even at a low rotational speed, the error correction speed is adjusted to control the amounts of uncorrected data and corrected data to be stored in the buffer memory 313.

When the internal processor 321 sends the read disabled signal HSG to the load detector 337 during error correction and the state of L1>L1k and L2>L2k occurs, the load detector 337 sends the stop signal STP to the performance controller 338. In accordance with the stop signal STP, the performance controller 338 stops generating the clock signal CLK. Accordingly, error correction is terminated.

In the fifteenth embodiment, to detect the size of the load, the rate of an increase and the rate of a decrease in the occupying sizes L1 and L2 of the data areas A and C, and predetermined reference increasing rate and reference decreasing rate may be used instead of the occupying sizes L1 and L2 and the predetermined reference values L1k and L2k. Further, the number of times an increase or a decrease in the occupying size L1 of the uncorrected data area A occurs consecutively may be counted, so that an increase or decrease in the load can be detected when the count value exceeds a predetermined number.

Only the occupying size L1 of the uncorrected data area A or the occupying size L2 of the corrected data area C may be used to detect the size of the load. In a case where only the occupying size L1 is used, when the occupying size L1 is smaller than the predetermined reference value L1k, it is detected that the load is light. When the occupying size L1 is greater than the predetermined reference value L1k, on the other hand, it is detected that the load is heavy. In a case where the occupying size L2 alone is used, when the occupying size L2 is greater than the predetermined reference value L2k, it is detected that the load is light. When the occupying size L2 is smaller than the predetermined reference value L2k, on the other hand, it is detected that the load is heavy. The size of the load may be detected by computing the rate of an increase and the rate of a decrease in one of the occupying sizes L1 and L2, or counting the number of times an increase or a decrease in one of the occupying sizes L1 and L2 occurs consecutively.

The size of the load may be detected using the occupying size of the empty data area D. In this case, when the occupying size of the empty data area D exceeds a reference value, it is determined that the load is light and error correction is being carried out at a high speed, so that the clock signal CLK having a relatively long period T is generated. When the occupying size of the empty data area D is equal to or smaller than the reference value, it is determined that the load is heavy and error correction is slowed down, so that the clock signal CLK having a relatively short period T is generated. Further, the size of the load may be detected by computing the rate of an increase and the rate of a decrease in the occupying size of the empty data area D, or counting the number of times an increase or a decrease in the occupying size of the empty data area D occurs consecutively.

Time measuring means like a timer may be used instead of the pointer 336 in detecting the size of the load. In this case, the time measuring means measures the time needed for the error correcting circuit section 324 to execute one-sector of error correction, so that the size of the load is detected based on the processing time. That is, when the processing time is longer than a predetermined reference time, the size of the load is determined as heavy. When the processing time is shorter than the predetermined reference time, the size of the load is determined as light.

The size of the load may be detected using an error number counter 331a (indicated by a broken line in FIG. 65), connected to the syndrome generator 331, instead of the pointer 336. In this case, the error number counter 331a counts the number of syndromes generated by the syndrome generator 331 and supplies the count value to the load detector 337. The load detector 337 detects the size of the load based on the count value. When data is error-free, the count value for the syndromes is zero. As the number of errors increases, the count value for the syndromes increases. The greater the count value is, therefore, the heavier the load of the error correcting circuit section 324 gets. When the count value is greater than a predetermined count value, therefore, the load is determined as heavy. When the count value is smaller than the predetermined count value, on the other hand, the load is determined as light. Furthermore, the size of the load may be detected using the addresses in the pointer 336 and the count value of the error number counter 331a.

The size of the load may be detected by supplying the error positions (byte) and correct values stored in the correction result register 335 (indicated by a broken line in FIG. 66) to the load detector 337. In this case, when the numbers of the error positions and correct values are greater than predetermined values, the load is considered as heavy, and when the former values are smaller than the latter values, the load is considered as light.

The size of the load may be detected using a combination of the addresses in the pointer 336, the count value of the error number counter 331a and the error positions and correct values stored in the correction result register 335.

The clock signals CLK having different periods T may be supplied to the individual circuits 31 to 34 in the error correcting circuit section 324 from the frequency-dividing circuit 342. In this case, the same control amount ΔTd or ΔTu may be used to control all of the clock signals CLK or different control amounts ΔTd or ΔTu may be used to control the respective clock signals CLK. Further, the individual circuits 31 to 34 may be separated into a plurality of groups and the clock signals CLK having different periods T may be supplied to the respective groups. In this case too, the same control amount ΔTd or ΔTu may be used to control all of the clock signals CLK or different control amounts ΔTd or ΔTu may be used to control the respective clock signals CLK.

The clock signals CLK which are supplied just to the polynomial generator 332 and the detector 333 whose operation times are relatively long may be changed in accordance with the load, and the clock signal CLK having a constant period may be supplied to the other circuits 31, 33 and 34 regardless of the size of the load.

When there is an uncorrectable interleave even after error correction on one sector of data has been performed three times, it is considered that the load is heavy and error correction is slow, so that the period T of the clock signal CLK should be made shorter. When there is an uncorrectable interleave even after error correction has been performed three times, error correction on the target sector is temporarily terminated, and the same sector data is read again from the optical disk 304. To recover the delay in the error correction, therefore, the period T of the clock signal CLK is shortened. The number of error corrections on one sector of data is not limited to three, but it may be set to 0, 1, 2, or 4 or greater. Further, the number of error corrections may be altered by the internal processor 321. When the number of error corrections increases, the error correcting time increases. It is thus preferable to set the basic periods Ta and Tb shorter in accordance with the number of error corrections.

The load detector 337 may detect the size of the load based on the period of the reproduced clock signal. The reproduced clock signal is generated by the decoder 322 using the read data signal and indicates the data reading speed. That is, as the period of the reproduced clock signal gets shorter, the amount of uncorrected data becomes greater and the load becomes greater. As the period of the reproduced clock signal gets longer, the amount of uncorrected data and the load become smaller. The period T of the clock signal CLK is controlled by detecting the period of the reproduced clock signal. When a reproduced clock cannot be generated, which means that read data is not read for some reasons, generation of the clock signal CLK is stopped.

Furthermore, the load detector 337 may detect the size of the load based on a servo error signal supplied from the optical disk drive 303. In this case, it is determined that the amount of uncorrected data is reduced by the servo error signal, making the load lighter. The servo error signal indicates seek information of the optical disk drive 303.

The load detector 337 may detect the size of the load using the read data signal supplied from the optical disk drive 303. In this case, the greater the amount of read data, the larger the amount of uncorrected data, so that the load becomes heavier. As the amount of read data becomes smaller, the amount of uncorrected data gets smaller, thus reducing the load.

Figure 69:
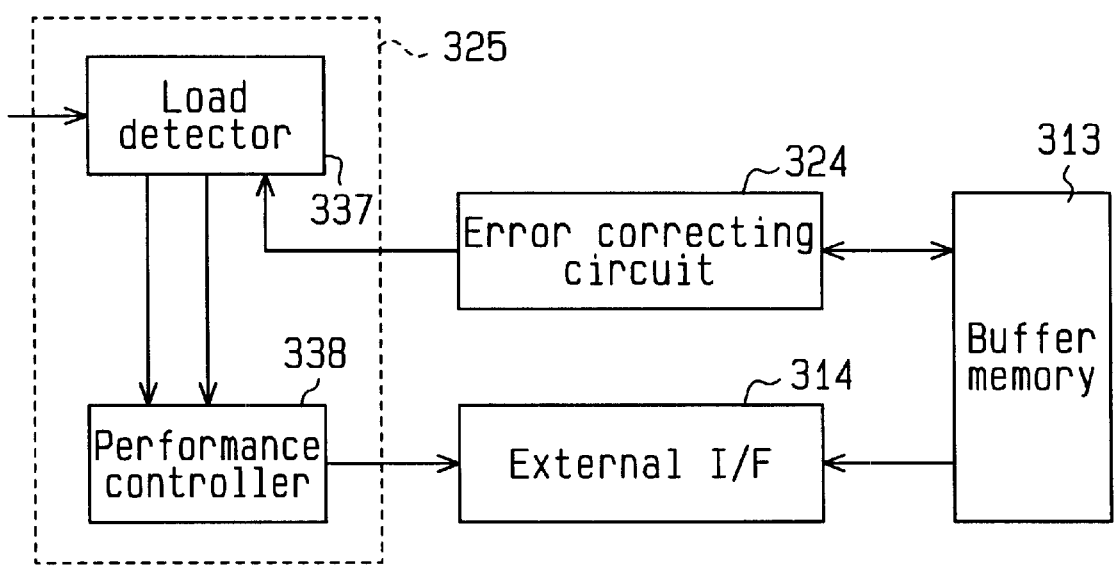
FIG. 69 is a schematic block diagram of a correction performance controller section according to a modification of the fifteenth embodiment of the invention.

FIG. 69 is a schematic block diagram of an optical disk controller according to a modification of the fifteenth embodiment of the invention. The performance controller 338 controls the reading speed of the external interface circuit 314 to read corrected data in accordance with the load detection signal from the load detector 337. Since the external interface circuit 314 reads corrected data from the buffer memory 313 in accordance with the clock signal, the performance controller 338 alters the period of the clock signal that is to be supplied to the external interface circuit 314 in accordance with the load detection signal. When error correction takes time, the amount of corrected data is small. As it is necessary to reduce the reading speed, therefore, the clock signal having a relatively long period is supplied to the external interface circuit 314. When error correction is relatively fast, on the other hand, the amount of corrected data increases. It is therefore necessary to increase the reading speed, so that the clock signal having a relatively short period is supplied to the external interface circuit 314. The reading speed of the external interface circuit 314 and the processing speed of the error correcting circuit section 324 may be controlled.

The periods T of a plurality of clock signals CLK may be set in advance in accordance with the load, and the clock signal CLK which corresponds to the detected load may be selected from those clock signals CLK.

Instead of storing uncorrected data and corrected data in one buffer memory 313, uncorrected data and corrected data may be separately stored in two buffer memories. Further, when a single buffer memory is used, the memory area for uncorrected data and the memory area for corrected data may be predetermined.

The present invention is not limited to error correction of data recorded on the optical disk 304, but may be adapted to an error correcting apparatus which corrects errors in data recorded on a magnetic disk or other types of recording media.

The present invention is not limited to the error correcting process which acquires error positions and values according to the Euclidean algorithm using syndromes, but may be adapted to other types of error correcting apparatuses.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for controlling a decision feedback equalizer, comprising the steps of:
generating an operation signal using an input signal and a feedback signal;
analyzing the operation signal in accordance with a predetermined criterion to generate a decision signal;
storing the decision signal in a shift register;
generating the feedback signal using the decision signal;
monitoring a content of the shift register; and
changing the criterion based on the monitoring result.

2. The method of claim 1, wherein the monitoring step facilitates analyzing the operation signal having a sign different from that of the decision signal.

3. The method of claim 1, wherein the monitoring step includes monitoring whether the decision signal of the shift register has one fixed value.

4. The method of claim 1, further comprising a step of selecting one of a plurality of criteria based on the monitoring result.

5. A decision feedback equalizer comprising:
a prefilter for filtering an input signal to generate a filtered input signal;
an adder, connected to the prefilter, for adding the filtered input signal and a feedback signal to generate an added signal;
a decision unit, connected to the adder, for analyzing the added signal in accordance with a predetermined criterion to generate a decision signal;
a shift register, connected to the decision unit, for storing the decision signal;
a feedback signal generator, connected to the shift register, for generating the feedback signal using the decision signal;
a monitor circuit, connected to the feedback signal generator, for monitoring a content of the shift register; and
a criterion setting circuit, connected between the monitor circuit and the decision unit, for changing the criterion based on the monitoring result and supplying the changed criterion to the decision unit.

6. The equalizer of claim 5, wherein based on a monitoring result indicating that the decision signal has one fixed value, the criterion setting circuit changes the criterion to facilitate analyzing the added signal originated from an input signal having a sign different from that of the fixed decision signal generated by the decision unit.

7. The equalizer of claim 5, wherein the criterion setting circuit includes:
a criterion generator for generating a plurality of criteria; and
a selector; connected between the criterion setting circuit and the decision unit, for receiving the monitoring result from the monitor circuit, selecting one of the plurality of criteria based on the monitoring result, and supplying the selected criterion to the decision unit.

8. The equalizer of claim 7, wherein the shift register has register length corresponding to a transfer code rule of the input signal.

9. The equalizer of claim 7, wherein the shift register includes:
a first register section including a necessary number of registers for the feedback signal generator to generate the feedback signal; and
a second register section including a necessary number of registers for the monitor circuit to monitor the content of the shift register.

10. The equalizer of claim 5, further comprising a feedback signal controller, connected between the monitor circuit and the feedback signal generator, for receiving the monitoring result from the monitor circuit and supplying the feedback signal generator with a signal for changing the feedback signal based on the monitoring result.

11. The equalizer of claim 10, wherein the feedback signal controller includes:
- an offset signal generator for generating a plurality of offset signals, and
- a selector, connected between the offset signal generator and the feedback signal generator, for receiving the monitoring result from the monitor circuit, selecting one of the plurality of offset signals based on the monitoring result, and supplying the selected offset signal to the feedback signal generator; and
- wherein the feedback signal generator includes an adder, connected to the selector, for receiving the selected offset signal and adding the feedback signal and the selected offset signal to generate an offset feedback signal.

12. The equalizer of claim 11, wherein the shift register has a register length equal to or longer than a transfer code rule for the input signal.

13. The equalizer of claim 11, wherein the shift register includes:
- a first register section including a necessary number of registers for the feedback signal generator to generate the feedback signal; and
- a second register section including a necessary number of registers for the monitor circuit to monitor the content of the shift register.

14. The equalizer of claim 5, further comprising a feedback signal controller, connected between the monitor circuit and the feedback signal generator, for receiving the monitoring result from the monitor circuit and supplying the feedback signal generator with a signal for changing the feedback signal based on the monitoring result.

15. The equalizer of claim 14, wherein the feedback signal generator includes:
- a circuit for generating a first digital feedback signal using the decision signal; and
- a D/A converter for generating an analog feedback signal; and
- wherein the feedback signal controller includes:
  - a digital feedback signal generator for generating a plurality of second digital feedback signals; and
  - a selector, connected between the digital feedback signal generator and the D/A converter, for receiving the monitoring result from the monitor circuit, selecting one of the plurality of the second digital feedback signals and the first digital feedback signal based on the monitoring result, and supplying the selected digital feedback signal to the D/A converter.

16. The equalizer of claim 14, further comprising an error detector for detecting whether the decision signal has a local decision error, wherein the feedback signal controller supplies the signal for changing the feedback signal to the feedback signal generator based on a detection result from the error detector.

17. The equalizer of claim 14, wherein the shift register has a register length corresponding to a transfer code rule for the input signal.

18. The equalizer of claim 14, wherein the shift register includes:
- a first register section including a necessary number of registers for the feedback signal generator to generate the feedback signal; and
- a second register section including a necessary number of registers for the monitor circuit to monitor the content of the shift register.

19. The equalizer of claim 5, wherein the monitor circuit monitors whether the decision signal of the shift register has one fixed value.

20. A method for controlling a decision feedback equalizer, comprising the steps of:
- generating an operation signal using an input signal and a feedback signal;
- analyzing the operation signal in accordance with a predetermined criterion to generate a decision signal;
- storing the decision signal in a shift register;
- generating the feedback signal using the decision signal; and
- monitoring whether the decision of the shift register has sequence of fixed values.

21. A method for controlling a decision feedback equalizer, comprising the steps of:
- generating an operation signal using an input signal and a feedback signal;
- analyzing the operation signal in accordance with a predetermined criterion to generate a decision signal;
- storing the decision signal in a shift register;
- generating the feedback signal using the decision signal;
- monitoring whether the decision signal of the shift register has one fixed value; and
- changing the criterion based on the monitoring result.

22. A decision feedback equalizer comprising:
- a prefilter for filtering an input signal to generate a filtered input signal;
- an adder, connected to the prefilter, for adding the filtered input signal and a feedback signal to generate an added signal;
- a decision unit, connected to the adder, for analyzing the added signal in accordance with a predetermined criterion to generate a decision signal;
- a shift register, connected to the decision unit, for storing the decision signal;
- a feedback signal generator, connected to the shift register, for generating the feedback signal using the decision signal; and
- a monitor circuit, connected to the feedback signal generator, for monitoring whether the decision signal of the shift register has sequence of fixed values.

23. A decision feedback equalizer comprising:
- a prefilter for filtering an input signal to generate a filtered input signal;
- an adder, connected to the prefilter, for adding the filtered input signal and a feedback signal to generate an added signal;
- a decision unit, connected to the adder, for analyzing the added signal in accordance with a predetermined criterion to generate a decision signal;
- a shift register, connected to the decision unit, for storing the decision signal;
- a feedback signal generator, connected to the shift register, for generating the feedback signal using the decision signal; and
- a monitor circuit, connected to the feedback signal generator, for monitoring whether the decision signal of the shift register has one fixed value, wherein the monitor circuit facilitates analyzing the operation signal having a sign different from that of the decision signal.

24. A method for controlling a decision feedback equalizer, comprising the steps of:

generating an operation signal using an input signal and a feedback signal;

analyzing the operation signal in accordance with a predetermined criterion to generate a decision signal;

storing the decision signal in a shift register;

generating the feedback signal using the decision signal;

monitoring of a content of the shift register, including the decision signal;

changing the criterion based on the monitoring result; and wherein the criterion changing step includes changing the criterion based on the monitoring result indicating that the decision signal has one fixed value, in order to facilitate analyzing the operation signal originated from an input signal having a sign different from that of the fixed decision signal.

25. A decision feedback equalizer comprising:

a prefilter for receiving an input signal and filtering the input signal to generate a filtered input signal;

an adder, connected to the prefilter, for receiving a feedback signal and the filtered input signal and adding the filtered input signal and the feedback signal to generate an added signal;

a decision unit, connected to the adder, for receiving the added signal and analyzing the added signal in accordance with predetermined criterion to generate a decision signal;

a shift register, connected to the decision unit, for storing the decision signal;

a feedback signal generator, connected to the shift register, for generating the feedback signal using the decision signal;

a monitor circuit., connected to the feedback signal generator, for monitoring a content of the shift register, including the decision signal; and a criterion setting circuit, connected between the monitor circuit and the decision unit, for receiving a monitoring result from the monitor circuit, changing the criterion based on the monitoring result, and supplying the changed criterion to the decision unit.

* * * * *